(12) United States Patent
Dunn et al.

(10) Patent No.: US 12,007,517 B2
(45) Date of Patent: Jun. 11, 2024

(54) SIGNAL TAPE

(71) Applicant: EAS IP, LLC, Charlottesville, VA (US)

(72) Inventors: Ryan C. Dunn, Charlottesville, VA (US); Bryan D. Wright, Charlottesville, VA (US); Robert A. Ross, Charlottesville, VA (US); Joshua M. Parman, Palmyra, VA (US); Donald A. Tubbs, Charlottesville, VA (US); Paul A. Bell, Cantonville, MD (US)

( * ) Notice: Subject to any disclaimer, the term of this patent is extended or adjusted under 35 U.S.C. 154(b) by 324 days.

(21) Appl. No.: 16/331,525

(22) PCT Filed: Sep. 7, 2017

(86) PCT No.: PCT/US2017/050405
§ 371 (c)(1),
(2) Date: Apr. 24, 2019

(87) PCT Pub. No.: WO2018/048986
PCT Pub. Date: Mar. 15, 2018

(65) Prior Publication Data
US 2020/0003931 A1 Jan. 2, 2020

Related U.S. Application Data

(60) Provisional application No. 62/385,246, filed on Sep. 8, 2016, provisional application No. 62/470,185, filed on Mar. 10, 2017.

(51) Int. Cl.
C09J 7/22 (2018.01)
F16L 1/11 (2006.01)
(Continued)

(52) U.S. Cl.
CPC ............... *G01V 15/00* (2013.01); *C09J 7/22* (2018.01); *F16L 1/11* (2013.01); *G09F 19/22* (2013.01); *G06K 19/0723* (2013.01)

(58) Field of Classification Search
CPC .... G01V 15/00; C09J 7/22; F16L 1/11; G09F 19/22; G06K 19/0723
(Continued)

(56) References Cited

U.S. PATENT DOCUMENTS 3,568,626 A * 3/1971 Southworth, Jr. ..... H02G 9/025
174/37
3,581,703 A * 6/1971 Hosack .................... G08B 5/40
102/281

(Continued)

*Primary Examiner* — Michael G Lee
*Assistant Examiner* — David Tardif
(74) *Attorney, Agent, or Firm* — Paul A. Bell

(57) ABSTRACT

The invention apparatus for and a method of creating a localized warning to prevent damage to buried pipeline and other buried infrastructure using a new type of marker tape with the trade name signal tape® [hereinafter referred to as "Signal Tape"]. The disclosed Signal Tape may incorporate tracer wire and RFID technology to aid in the remote location of the Signal Tape and, thus, the buried infrastructure. Signal Tape may also incorporate Litz wire for use as tracer wire within the Signal Tape. The Signal Tape is designed to be buried just below the surface of the ground and directly over a buried infrastructure such as a pipeline. The Signal Tape incorporates a strong core material which permits the Signal Tape to be bodily removed from the soil when it is struck by excavation equipment.

28 Claims, 43 Drawing Sheets

(51) Int. Cl.
*G01V 15/00* (2006.01)
*G09F 19/22* (2006.01)
*G06K 19/07* (2006.01)

(58) Field of Classification Search
USPC .......................................................... 116/200
See application file for complete search history.

(56) References Cited

U.S. PATENT DOCUMENTS

| | | | | |
|---|---|---|---|---|
| 3,718,113 | A * | 2/1973 | Schertler | ................ F16L 55/00 |
| | | | | 116/214 |
| 5,116,654 | A * | 5/1992 | Cosman | ................ G02B 6/447 |
| | | | | 324/67 |
| 10,329,463 | B2 * | 6/2019 | Chou | ..................... C09J 107/00 |
| 2005/0112368 | A1* | 5/2005 | Hamer | ..................... C09J 7/243 |
| | | | | 428/343 |
| 2005/0249791 | A1* | 11/2005 | Hobbs | ..................... A61L 15/46 |
| | | | | 424/443 |
| 2009/0320383 | A1* | 12/2009 | Taylor | ..................... E04D 5/149 |
| | | | | 52/745.06 |
| 2020/0003931 | A1* | 1/2020 | Dunn | ........................ F16L 1/11 |

\* cited by examiner

SIGNAL TAPE

CROSS-REFERENCE TO RELATED APPLICATIONS

This application claims priority to the following commonly owned U.S. Provisional patent applications: 62/385,246, filed on 8 Sep. 2016, entitled Passive Signal Tape; and, 62/470,185, filed on 10 Mar. 2017, entitled Litz Wire as Tracer Wire and Litz Wire Marker Tape.

SEQUENCE LISTING

Not Applicable.

FIELD OF THE INVENTION

The present invention relates generally to the field of creating a localized warning to prevent damage to buried pipeline and other buried infrastructure using an underground marker tape with the trade name signaltape® [hereinafter referred to as "Signal Tape"]. The disclosed Signal Tape incorporates a high strength core material. The disclosed Signal Tape may also incorporate tracer wire, foil and/or RFID technology to aid in the remote location of the Signal Tape and, thus, the buried infrastructure. Signal Tape may also incorporate Litz wire for use as tracer wire within the Signal Tape. The invention also involves the use of Litz wire as tracer wire independent of the inventive signal tape. Litz wire may also be incorporated into a fabric tape and used as marker wire in a conventional horizontal boring utility-laying operation. The invention also involves the use of conventional tracer wire embedded within a high strength woven tape product to provide Tuff Trace which applicants use as tracer wire in horizontal boring pullback operations.

BACKGROUND OF THE INVENTION

As of 2014, the Pipeline and Hazardous Materials Safety Administration [PHMSA] estimates that there were more than two million miles of natural gas and petroleum transmission and distribution pipelines in the United States.[1] According to PHMSA, the total cost of significant pipeline incidents between 1994 and 2014 is estimated at almost 370 billion dollars. Historically, of the damage to natural gas pipelines, approximately 35% is due to damage from excavation[2]. Obviously, protecting petroleum and natural gas pipelines from finished marker tape 10' which color is selected to contrast with the earth soil can be effected in the same manner indicated in connection with the embodiment shown in FIG. 1.

[1] Pipeline and Hazardous Materials Safety Administration: A Study on the Impact of Excavation Damage on Pipeline Safety; Washington (DC): PHMSA
[2] C-Fer Technologies, Risk and Reliability Analysis for Pipelines, in: $CO_2$ Capture and Storage Workshop presentations, 2006 Jan. 27; Calgary, Alberta, p. 8

Marker Tape Technology:

There are many passive systems used to provide a warning of imminent excavation damage to underground infrastructure such as pipelines, buried power lines, buried communication lines and any other type of buried infrastructure. Currently, marker tape is the standard protective measure used in new installations of buried infrastructure. Burying marker tape, a passive visual indicator, directly above a buried infrastructure is well-known and easily done by infrastructure installation crews. It is normally laid directly over the buried infrastructure such that the marker tape will be struck first by excavation machinery working near the buried infrastructure. Marker tape comes in a variety of widths and flexible materials. Some contain metallic components such as tracer wire or foil, the purpose of which is to aid in remotely locating—from the surface—the marker tape [and thus the infrastructure] after it has been installed [i.e., buried underground and above the infrastructure]. Some marker tapes are designed to stretch under the theory that when struck by excavation machinery [usually an excavator bucket], they can be pulled to or near the surface where they can be seen. Obviously, if pulled to the surface, it would be possible for the marker tape to be seen by the excavation crew but it might also be possible for the marker tape to be seen if pulled nearly to the surface. For example, if the marker tape was pulled up into an open trench [but still below the ground surface] it might be possible for the marker tape to be seen in the open trench by a spotter [the excavation crew member charged with keeping an eye on the trench and alerting the backhoe operator to stop digging if anything suspicious is spotted in the trench]. Thus the visible marker tape could alert the excavation crew to the presence of buried infrastructure. Unfortunately, sad experience in the field indicates that none of the marker tapes on the market today can be reliably pulled from the ground without breaking so that they can be seen by an excavator operator in order to prevent damage to buried infrastructure.

Description of Related Marker Tape Art:

The following patents disclose inventions which involve marker tape and are related to the inventive Signal Tape.

| 3,115,861 | Allen | Dec. 31, 1963 |
| 3,282,057 | Prosser | Nov. 1, 1966 |
| 3,568,626 | Southworth, Jr. | Mar. 9, 1971 |
| 3,633,533 | Allen | 11 Jan. 1972 |
| 3,908,582 | Evett | Sep. 30, 1975 |
| 4,623,282 | Allen | Nov. 18, 1986 |
| 4,654,639 | De Courville | Mar. 31, 1987 |
| 4,767,237 | Cosman et al. | Aug. 30, 1988 |
| 4,988,236 | Ramsey et al. | Jan. 29, 1991 |
| 5,017,415 | Cosman et al. | May 21, 1991 |

Extensive testing of marker tapes currently on the market has shown that none of the these marker tapes can be consistently and reliably seen by the operator of an excavator during the course of normal excavation. The tested marker tapes break, tear, or stretch, in such small portions or at such places so as to be very difficult, if not impossible, to be seen from the excavator operator's perspective—or even from a spotter's perspective. None of the marker tapes on the market today can be reliably pulled from the ground without breaking so that they can be seen by the excavator operator.

One example of prior art marker tape is U.S. Pat. No. 3,633,533 issued in 1972 to Gordon H. Allen et al. [hereinafter Allen '533]. Allen '533 disclosed an early example of marker tape comprising a thin plastic film which may be made, for example, of polyethylene or polypropylene or polyvinylidene chloride [e.g. Saran™] or a fluorocarbon. As shown in FIG. 1 [taken from Allen '533], marker tape 10 may comprise a film 1 which may have a thickness of about 0.001 to 0.002 inch [or $2.54 \times 10^{-3}$ cm to $5.08 \times 10^{-3}$ cm]. Each side of film 1 will carry a more or less continuous metallic coating 2, 2'. The metallic coating 2, 2' may, for example, be made of aluminum which may be deposited as a thin film, of the order of a thickness of 0.00005 to 0.00007 inch [or $1.27 \times 10^{-4}$ cm to $1.778 \ 10^{-4}$ cm] by conventional vacuum deposition techniques. On each of the outside surfaces of the metal-coated film 1 there is a protective coating or film 3, 3' of synthetic plastic which may, again, be of polyethylene or polypropylene or polyvinylidene chloride [e.g. Saran™] or a fluorocarbon.

The finished marker tape 10 should have a color which contrasts with the color of the earth soil surrounding or adjacent to the buried infrastructure. To this end the film 3, 3' may have a color such as red, green, yellow, or any suitable other color which would contrast to the color of the earth soil in which the buried infrastructure is emplaced. Alternatively, if the film 3, 3' is transparent, then the color of the metallic coating 2, 2' itself may serve the purpose of providing to the finished marker tape 10 with a color contrasting to that of the earth soil. Other procedures, which would be known to one of ordinary skill in this art, may also be used to provide the necessary contrasting color to marker tape 10.

Allen '533 also teaches a marker tape 10' as shown in FIG. 2 [also taken from Allen '533] comprising two thin metallic layers 4, 4' each of which may have a thickness in the range of about 0.0005 inch [or $1.27 \cdot 10^{-3}$ cm], and which are firmly laminated together by a thin film 5 of a laminating adhesive which may be a catalyzed epoxy cement. A thin film 6, 6' such as the film 3, 3' shown in FIG. 1 is laminated to each outside surface of the metallic layers 4, 4'. The provision of a color to the finished marker tape 10' which color is selected to contrast with the earth soil can be effected in the same manner indicated in connection with the embodiment shown in FIG. 1.

Allen '533 also teaches a marker tape 10" as shown in FIGS. 3 and 4 [also taken from Allen '533] comprising a colored polyethylene or other moisture and soil-resistant synthetic plastic tape 7 which has on its surface a tracer wire 8, for example, made of copper, nickel or a ferrous alloy, in the form of a zigzag arrangement laying in channel 11 cut into the upper surface of plastic tape 7. Laminated to the upper surface of tape 7 is another tape 9 of colored polyethylene or synthetic plastic. A variant of this embodiment is initially to coat the metallic wire with a protective synthetic plastic of similar material, as by passing the metallic wire through a hot melt of such plastic or material, and then bond said coated wire directly to the marker tape 10" by a passage through heated rollers. The purpose of tracer wire 8 is to enable the marker tape 10" to be detected while buried underground using conventional techniques. It is noted that Allen '533 does not teach that his wire 8 is anything other than an electric conductor useful for locating his marker tape while it is still underground. There is absolutely no teaching in Allen '533 that this wire 8 might be a strong core material as provided in the applicants' invention. The tape is colored and has soil contrasting reflective stripes to aid in tape detection. Allen teaches that the tape will be color coded in the accepted coding for the type of underground infrastructure or utility line being protected. The uniform color code generally accepted in the industry to identify underground facilities is as follows: Red—electric power lines; Yellow—gas, oil or steam lines; Orange—telephone, police and fire communications and cable television; Blue—water lines; and Green—sewer lines.

The purpose of the metallic foil in marker tapes 10 and 10' is to permit the marker tapes to be detected while buried underground by conventional techniques. The purpose of the metallic wire 8 in marker tape 10" is also to permit the marker tape to be detected using conventional techniques while buried. In effect, metallic wire 8 is functioning as tracer wire in marker tape 10". It is noted that Allen '533 does not teach the use of a strong core material as provided in the applicants' invention—that is, a strong core material that is capable of being consistently pulled out of the ground without breaking while also, consistently, bringing some, at least, of the remainder of the marker tape to the surface.

Allen, in U.S. Pat. No. 4,623,282 [hereinafter "Allen '282"] is concerned with keeping the indicia and coloring legible on the buried tapes. It was found that the cautionary printing on the tape surface of the previous Allen marker tapes was vulnerable to being removed by erasure, rubbing off, chemical activity under the ground by hydrocarbons, and by underground electrolysis. Thus, after a period of time, the cautionary printing disappears from his previous marker tapes due to scratching or rubbing off, and also due to natural causes from the effects of hydrocarbons or petroleum present under the ground and this renders the supplied cautionary printing indicia useless as a means of identifying the type of utility element supposedly being protected. As shown in FIG. 5 [taken from Allen '282], volume of soil 12 or break the tape and the tape will be ripped from the earth and pulled loose for several feet along its length.

So Allen '282 provides a contrasting color coding with stripes 22 to make marker tape 16 easy to see. It is possible and even likely that the coded tape color corresponding to the associated utility line or element of construction does not form a contrast with the surrounding earth soil sufficient to reliably caution one digging in the soil. For example, when a red colored locating tape associated with electric power lines, etc. is placed in red-colored soil such as sandstone or reddish clay, the desired contrast between the locating tape color and the surrounding soil is not present. Similarly, orange coded tapes often do not provide sufficient contrast in desert soils, and green coded and blue coded tapes are often problems in heavily forested or shaded areas. In such instances, the utility line may be damaged before one views the cautionary locating tape.

Cautionary printed indicia 18 is repeated on the tape so that it extends the full length of utility line 14. Marker tape 16 also included cautionary coded indicia 20 in the form of colored stripes extending across marker tape 16. In the illustrated example of FIGS. 5-7, line 14 is assumed to be a water line, therefore according to the uniform industry code, cautionary stripes 20 would be blue stripes. Tape 16 further includes cautionary contrast stripes 22 extending across the tape and forming a contrast in color with color coded stripes 20 as well as with the color of the surrounding soil 10. Contrast stripes 22 provide a high visibility and high light reflective characteristic to marker tape 16 so that the tape can readily be seen when placed in earth soils whose color is close to the color of color coded stripes 20. As shown in FIG. 7, cautionary indicia 18 is reverse printed on the underside of clear polyester plastic film 24 thus protecting the cautionary indicia from scratching or rubbing off. A flexible metal foil 26 [for example Aluminum] with a highly reflective surface is provided with color coded stripes 20 so that highly visible and reflective stripes 22 are formed on the surface of Aluminum foil 26. The printed surface of foil 26 is then placed adjacent the printed surface of clear plastic film 26 and the two are bonded together with adhesive 29. To protect the bottom of Aluminum foil layer 26 another clear polyester film is bonded to the undersurface of foil 26 by adhesive 30.

Allen '282 discloses what he means by a "frangible" marker tape as follows: the strength of the locating tape is such that in conventional digging into the soil, in connection with excavating, laying utility lines or elements of construction or cutting into the earth for any other reason by means of mechanical or similar digging or excavating equipment such as back hoes or trenchers, if the locating tape is engaged and pulled up by such equipment, the teeth or the like on the equipment will sheer, sever or break the tape and the tape will be ripped from the earth and pulled loose for several feet along its length.

Unfortunately, even the improved Allen '282 marker tape tends to be quickly severed by the excavator bucket and little visible material is left in the thus exposed trench to be seen by an observer. The material severed by the bucket is contained within the soil in the bucket and is also not visible to an observer or the equipment operator. It is noted that Allen '282 does not teach the use of a strong core material as provided in the applicants' invention—that is, a strong core material that is capable of being consistently pulled out of the ground without breaking while also, consistently, bringing some, at least, of the remainder of the marker tape to the surface.

Southworth Jr., in U.S. Pat. No. 3,568,626 [hereinafter "Southworth '626"], discloses an indicator assembly [i.e. marker tape] which is designed to be pulled from the soil when contacted by the bucket or scoop of excavation equipment. FIGS. 8 and 9 [taken from Southworth '626] show a volume of earth 35 containing a buried pipeline 37 or other buried infrastructure which is to be protected from excavation damage by marker tapes 38 and 38' which are buried respectively a few feet under the surface of earth 35 and a few feet above pipe 37. Marker tapes 38 and 38' are identical and shown in more detail in FIG. 10 [also taken from Southworth '626].

Marker tape 38, 38' are an elongated extensible vinyl sheet 40 folded about two nylon cords 42 and 44 of approximately one-quarter inch in diameter. The vinyl may, for example, be polyethylene and have the ability to stretch to up to eight times its length before breaking. The nylon cords are preferable stretchable up to three or four times their length. Such materials are described in "The Handbook of Chemistry and Physics," 41st Edition, published by Chemical Rubber Publishing Company of Cleveland, Ohio. The cords 42 and 44 fit into the longitudinal folds in the sheet 40 so as to form elongated ridges at the edges of the ribbon 38, 38'. A suitable adhesive on one face of the sheet material 40 secures the cords 42 and 44 in place and holds the edges of the sheet 40 against the central portion of the sheet 40 so as to form the substantially unitary assembly of FIG. 10. When the ribbon 38, 38' constitutes the assembly and is buried above a utility line, an operator of automatic excavating equipment, a plow, or a laborer with a shovel, upon hitting the ribbon 38, 38', starts to bring it up with his implement. In doing so, he can notice the resistance afforded by the ribbon. The latter, in response to the effort of the implement, yields elastically so that a portion of it becomes visible above the portion of the soil being dug. A suitable legend 46 at multiple locations on the surface of the ribbon then apprises the operator of the existence of the utility. The legend 46 in FIG. 10 also includes an indication that the ribbon 38, 38' has applied thereto magnetic coding signals 48 and radioactive coding signals 50. It instructs the operator that the path of the utility line may be followed by sensing the successive coding signals along its path with suitable sensing equipment above ,ground.

Southworth '626 teaches that the ribbons 38, 38' of his marker tape, instead of having the nylon cords 42 and 44 sandwiched only at the edges, may have similar cords 52 sandwiched throughout the ribbon width as shown in FIG. 11. These cords 52 may be in a regular or random pattern. Southworth, Jr. teaches that these cords may also constitute fiberglass or steel strands.

Southworth '626 teaches that his ribbon cords 42 and 44 are strong enough to cause the ribbon to be pulled to the surface when encountered by excavation machinery. However, Evett, U.S. Pat. No. 3,908,582 teaches that the Southworth tape, while intended to be infrangible and of such strength and sufficiently stretchable that a substantial portion of the Southworth tape will be pulled by the excavation machinery to a more observable position, will have portions of the tape adjacent the trench dug by the excavation equipment sheer before being pulled from highly compacted soil—thus preventing the Southworth tape from being stretched to a readily observable longitudinal extent. In other words, the prior art recognizes and teaches that Southworth '626 does not provide a marker tape with a core material that is capable of being consistently pulled out of the ground, without breaking, while also, consistently, bringing some, at least, of the remainder of the marker tape to the surface.

Allen, U.S. Pat. No. 3,115,861 [hereinafter "Allen '861"] is a very early [1963] effort to protect buried infrastructure teaches the use of colored soil layers buried a few feet above and running contiguously with and over a buried infrastructure such as a sewer, gas, water, electrical line, etc. The color of the colored soil is chosen to contrast with the color of the soil in which the infrastructure is buried in. Allen '861 teaches that the color of the colored soil may indicate the type of buried infrastructure and that [in particular for a deep burial—such as 30 feet [or 9.14 m], two colored layers of soil may be used—one as a depth of a few [two by example] feet [or 0.61 m] above the buried infrastructure and the other being laid down a few feet [two by example—or 0.61 m]] below the surface of the soil so that one gets an immediate indication of the location of the buried infrastructure. Each layer [which may be 2[or 0.61 m] or fewer feet thick and 5 or 6 feet wide—or approximately 1.5 m to 1.8 m wide] will follow the path of the underground infrastructure. Where there is a valve or other feature which is important to locate along the length of the buried infrastructure, Allen teaches burying a separate layer of colored soil [of a different color than that chosen for the other layers] a few feet [i.e., two feet [0.61 m] ]or more above the low layer of colored soil. The separate layer would be perhaps 6 feet by 6 feet [or approximately 1.8 m by 1.8 m] and two feet [or approximately 0.61 m] above the lower layer. It is also possible to incorporate this layer into the first layer and just change the color to signify the presence of the valve or other feature of importance. In use, it is intended that the Allen '861 colored soil layers will be brought to the surface by excavation equipment and seen by the excavation crew, thus warning the excavation crew of the presence of buried infrastructure. Clearly, Allen '861 neither provides nor teaches the use of a marker tape with a strong core material as provided in the applicants' invention—that is, a marker tape with a strong core material that is capable of being consistently pulled out of the ground, without breaking, while also, consistently, bringing some, at least, of the remainder of the marker tape to the results, Allen '503 teaches against annealing the cold-rolled foil as this adversely affects the desired flexibility of the finished foil. To protect and color his steel foil, Allen '503 teaches that it can be painted on one or both sides with a long lasting moisture and oxidation resistant polyester paint. Allen '503 teaches that the painted steel foil can then be imprinted with warning indicia as desired. The thus painted steel foil is then coated or covered on one or both sides by extrusion, laminating or other known coating techniques with a thin film [typically 0.001 in—or $2.54 \times 10^{-3}$ cm] of a substantially transparent plastic which is resistant to deterioration in contact with moisture and other materials known to be present in soil. Polyethylene is noted as being a particularly desirable coating material. Allen '503 also teaches that, in lieu of painting a color upon the steel foil, it can be applied by using a colored or pigmented synthetic plastic of any desired color. He notes that this plastic film may also be imprinted with any desired warning indicia. Allen '503 teaches that his foil sheet or tape may be from 3 to 12 inches—or 7.62 cm to 30.5 cm—[or more] in width and may be buried from 4 inches—or 10.2 cm to 2 feet or more [61 cm or more] under the surface and at an appropriate height above the buried infrastructure. Clearly Allen '503 fails to teach or suggest the use of a marker tape as provided in the applicants' invention—that is, a marker tape with a strong core material that is capable of being consistently pulled out of the ground, without breaking, while also capable of, consistently, bringing some, at least, of the remainder of the marker tape to the surface so that it can be seen by an excavation crew and thus warn the crew of the presence of a buried infrastructure. Note that Allen '503 even in the embodiments using a steel foil teaches against annealing the steel foil [which would give much greater strength to the foil] because he desires the flexibility of the non-annealed foil.

Prosser, U.S. Pat. No. 3,282,057 [hereinafter "Prosser '057"] another early effort to protect buried infrastructure, teaches burying an indicating means [hereinafter "marker tape"] comprising a colored plastic layer marker tape directly over the buried infrastructure. The marker tape is emplaced above the buried infrastructure so as to be contacted by the bucket of an excavator before the buried infrastructure can be damaged. The intent is that a portion of the colored plastic marker tape will be brought to the surface by the excavator bucket—thus warning the excavation crew of the presence of the buried infrastructure. To facilitate bringing a portion of the marker tape to the surface, the colored plastic film may be perforated at short intervals to aid rupture and separation of the plastic. It may also be pleated to cause it to stretch. Prosser '057 also teaches the placement of warning indicia on the film to indicate the type of buried infrastructure.

FIG. 12 [taken from Prosser '057] shows a sectional view of a partially completed underground line installation generally indicated by the reference numeral 55. The installation comprises the earth or ground 56, having formed therein an excavation 58. Within the excavation 58 is a buried infrastructure 60 [in this case a pipe] covered by a small layer of backfill 62 over which is placed a plastic marker tape 64. Over the marker tape 64 is placed the remainder of the required backfill designated by reference numeral 66. Marker tape 64 is a continuous strip of plastic.

FIG. 13 [also taken from Prosser '057] illustrates an alternate form of the marker tape 64 shown in FIG. 12 and designated in FIG. 13 by the reference numeral 66. Marker tape 66 comprises a continuous strip 67 of plastic film which has a plurality of weakened areas 68 extending transversely to the length dimension.

An alternative arrangement of the Prosser '057 marker tape is shown in FIG. 14 [also taken from Prosser '057] where marker tape 70 is formed from a plurality of overlapping sheets 72. Overlapping sheets 72 are attached together by low strength heat seals [not illustrated] or by low strength adhesive bonds [not illustrated] in order that marker tape 70 can be wound into a large supply roll. When struck by an excavation means, the sheets separate and a portion of the marker tape is intended to come to the surface.

The Prosser '057 marker tape may also be provided in an extensible embodiment by having each separate sheet joined by a plurality of pleats or folds. This is shown in FIG. 15 [also taken from Prosser '057] where marker tape 74 comprises a plurality of connected sheets 72' which are connected by folds or pleats 76. With this embodiment, the pleats or folds 76 will aid the marker tape by unfolding if the marker tape is disturbed by an excavation tool.

In use, the Prosser '057 marker tape is buried slightly about the buried infrastructure as shown in FIG. 12. Then the remaining backfill is used to fill the excavation 58. When an excavating means such as a backhoe, digs near the buried infrastructure, portions of the marker tape will be ripped off and trapped in the excavator bucket and can be seen when the soil is emptied from the bucket thus warning the excavation crew of the presence of the buried infrastructure. Unfortunately, in practice, it is very difficult to see the severed portion of the Prosser '057 marker tape in the excavation bucket and the portions of the Prosser '057 marker tape remaining in the undisturbed soil tend to sheer off before any of the undamaged marker tape can be pulled into the excavation trench. Thus, it is often very difficult for even a spotter [whose job is to watch the open trench for marker tape] to see the Prosser '057 marker tape. This foregoing information regarding the performance of the Prosser '057 marker tape comes from Evett, U.S. Pat. No. 3,908,582 as discussed infra. Clearly, Prosser '057 fails to teach or suggest the use of a marker tape as provided in the applicants' invention—that is, a marker tape with a strong core material that is capable of being consistently pulled out of the ground, without breaking, while also capable of, consistently, bringing some, at least, of the remainder of the marker tape to the surface so that it can be seen by an excavation crew and thus warn the crew of the presence of a buried infrastructure.

Allen, U.S. Pat. No. 3,504,503 [hereinafter "Allen '503"], teaches an improvement of the Prosser '057 plastic indicating means. Since the Prosser '057 plastic indicating means is non-metallic and thus cannot be detected, and the buried infrastructure is also often non-metallic, Allen '503 teaches that it would be desirable to have the plastic indicating means be remotely detectable. He notes that this suggestion was made in the prior art which made the Prosser '057 plastic tape remotely detectable [from the surface] by marking it electromagnetically such that it was remotely detectable using known detection means.

Allen '503 states that this simply did not work out well and that this approach had "not come into any use." Allen '503 uses his improved sheet or tape in the same manner that Prosser '057 does. Allen '503 provides a frangible, flexible metal foil, in the form of a sheet or tape, carrying a color to contrast with the color of the soil adjacent the buried infrastructure so that said colors are readily visually distinguishable from each other. The metallic foil sheet or tape is protected against moisture and/or oxidation or other deterioration when buried in the soil and thus its location can readily be remotely detected [from the surface] using conventional detection devices. Thus, before any digging or excavation occurs, the presence and general location of the buried sheet or tape [and hence, the location of the buried infrastructure] can be determined and the operator of the digging or excavation equipment can be forewarned.

Allen '503 teaches that while copper, aluminum, nickel and tin may be used to make his foil sheets or tapes—he prefers to use foils made from steel and, in particular, tin-coated steel foil. Allen '503 uses a foil approximately 0.001 to 0.002 inch [or approximately $2.54 \times 10^{-3}$ cm to $5.1 \times 10^{-3}$ cm] in thickness which he makes by cold rolling a conventional tin-coated mill gauge cold rolled steel. For best results, Allen '503 teaches against annealing the cold-rolled foil as this adversely affects the desired flexibility of the finished foil. To protect and color his steel foil, Allen '503 teaches that it can be painted on one or both sides with a long lasting moisture and oxidation resistant polyester paint. Allen '503 teaches that the painted steel foil can then be imprinted with warning indicia as desired. The thus painted steel foil is then coated or covered on one or both sides by extrusion, laminating or other known coating techniques with a thin film [typically 0.001 in—or $2.54 \times 10^{-3}$ cm] of a substantially transparent plastic which is resistant to deterioration in contact with moisture and other materials known to be present in soil. Polyethylene is noted as being a particularly desirable coating material. Allen '503 also teaches that, in lieu of painting a color upon the steel foil, it can be applied by using a colored or pigmented synthetic plastic of any desired color. He notes that this plastic film may also be imprinted with any desired warning indicia. Allen '503 teaches that his foil sheet or tape may be from 3 to 12 inches—or 7.62 cm to 30.5 cm—[or more] in width and may be buried from 4 inches—or 10.2 cm to 2 feet or more [61 cm or more] under the surface and at an appropriate height above the buried infrastructure. Clearly Allen '503 fails to teach or suggest the use of a marker tape as provided in the applicants' invention—that is, a marker tape with a strong core material that is capable of being consistently pulled out of the ground, without breaking, while also capable of, consistently, bringing some, at least, of the remainder of the marker tape to the surface so that it can be seen by an excavation crew and thus warn the crew of the presence of a buried infrastructure. Note that Allen '503 even in the embodiments using a steel foil teaches against annealing the steel foil [which would give much greater strength to the foil] because he desires the flexibility of the non-annealed foil.

Southworth '626 teaches that his ribbon cords [42 and 44 in FIG. 10 of this application] are strong enough to cause the buried marker tape 38, 38' to be pulled to the surface when encountered by excavation machinery. However, Evett, U.S. Pat. No. 3,908,582 [hereinafter Evett '582] teaches that the Southworth tape [38, 38' in FIG. 10 of this application], while intended to be infrangible and of such strength and sufficiently stretchable that a substantial portion of the Southworth tape 38, 38' will be pulled by the excavation machinery to a more observable position, will, in actual practice, have portions of the tape 38, 38' adjacent the trench dug by the excavation equipment sheer before being pulled from highly compacted soil thus preventing the Southworth tape 38, 38' from being stretched to a readily observable longitudinal extent.

Prosser '057 teaches that his colored plastic marker tape 64, 66, 70 and 74 in FIGS. 12-15 of this application, is to be buried a few inches [2 inches or more ~5.1 cm or more] above a buried infrastructure such that excavation equipment, when digging near the buried infrastructure, will contact the colored plastic marker tape before contacting the buried infrastructure and that the excavation equipment will pull the marker tape [64, 66, 70 and 34 in FIGS. 12-15 of this application] to the surface to warn the excavation crew of the danger below. Prosser '057 teaches that his marker tape 70 may be made from overlapping sheets 72 [as shown in FIG. 14 of this application] attached together by low strength adhesive bonds or low strength heat seals. Thus, when marker tape 70 is struck by excavation equipment, sheets 72 may slide apart and be brought to the surface to provide a visible warning to the excavation crew. Prosser '057 also has an embodiment 74 of his marker tape which has sheets 72' connected by folds 76 so that upon contact with excavation equipment, the folds will provide some stretching and elongation of the marker tape 74 so that it may reach the surface to warn the excavation crew.

Evett '582 teaches that the Prosser '057 indicating means, when engaged and pulled by the digging or probing element [of excavation equipment] "will be unfolded to a longitudinal extent which may make the indicating means more easily observed; however, the extent to which the indicating means may be unfolded, and thus longitudinally extended, is quite limited, so that it may not be seen from ground level." Evett further states that although the "folded tape is initially laid between slip sheets, such sheets are decomposable in the ground in relatively short time periods, so that the tape is not protected from the ground in which it is buried." Also, depending upon the compacting of the ground where the tape is laid, "portions of the tape which are adjacent the trench dug by the digging or probing elements may shear before being pulled from the ground and thus unfolded." This is apparently more of a problem because the tape is not made from materials with an especially high tensile strength. [Evett '582, col. 1, lines 10-31].

Evett '582 shows in FIG. 16 [taken from Evett '582] a conventional tractor 80 with an engine 81 and an endless track 82 for movement over the ground surface level 83. A probing element 84 is mounted on the front of tractor 80 and a digging element 85 is mounted on the rear of tractor 80. Probing clement 84 is arranged to penetrate ground surface level 83 to a lesser depth than digging element 85. Also as shown in FIG. 16 pipe 86 is buried underground and runs in a direction transverse to the travel of tractor 80 and buried at such a depth that it would be engaged and damaged by digging element 85 if the latter were moved against it. However, marker tape 88 is disposed within the ground a short distance above pipe 86 and above the digging depth of digging element 85.

Evett '582 teaches that marker tape 88 will be engaged by probing element 84 before digging element 85 can be moved against and thus damage pipe 86. Additional forward movement of tractor 80 will cause marker tape 88 to be pulled out of soil 83 as shown in FIG. 17 [also taken from Evett '582] thus warning the operator of tractor 80 of the potential danger of damage to pipe 86.

Evett '582 provides a warning tape [marker tape] 88 as shown in FIG. 18 comprising a sheath 90 and a ribbon 92 enclosed within the sheath 90. The sheath and ribbon are of substantial longitudinal extent so as to facilitate being laid over an elongated buried infrastructure such as a pipeline. Sheath 90 may be made of two films of any suitable material which is non-decomposable upon being buried in the ground. The two films are laminated together along their side edges. Suitable materials for this purpose are polyethylene, polyvinylchloride, and cross-linked polyolefins. Ribbon 92 comprises a single narrow film folded upon itself as shown in FIG. 18 with the folds extending parallel to the longitudinal length of the tape 88. Another embodiment of the tape is shown in FIG. 19 where tape 94 comprises a sheath 96 constructed as is sheath 90 of FIG. 18. Ribbon 98 is enclosed within sheath 96 and is distinguished from the showing of FIG. 18 by the fact that the folds in ribbon 98 are perpendicular to the length of sheath 96.

Evett teaches that sheaths 90 and 96 are brightly colored and may have warning indicia imprinted on the outer surfaces thereof. The ribbon and sheath are disclosed as being made from materials that do not decompose readily under the conditions found in soil. Evett also teaches that a low coefficient of friction is desirable between ribbons 92, 98 and sheaths 90 and 96. This may be achieved by the selection of materials for the ribbon and sheath or, preferably, by providing a lubricant in the construction of the tape. Clearly Evett '582 fails to teach or suggest the use of a marker tape as provided in the applicants' invention—that is, a marker tape with a strong core material that is capable of being consistently pulled out of the ground, without breaking, while also capable of, consistently, bringing some, at least, of the remainder of the marker tape to the surface so that it can be seen by an excavation crew and thus warn the crew of the presence of a buried infrastructure.

Allen U.S. Pat. No. 4,623,282 is concerned with providing a frangible, flexible tape comprising a metallic foil as described in Allen U.S. Pat. No. 3,504,503 with warning indicia and contrasting color coding which will survive the conditions present in the soil in which a buried infrastructure is buried in. For example, Allen '503 teaches that warning indicia indicating the type of buried infrastructure is to be printed on the outer surface of the warning tape. It has been found that these warning indicia are vulnerable to being removed by erasure, rubbing off, chemical activity under the ground by hydrocarbons and by underground electrolysis. Thus after a period of time the warning indicia disappears from the tape due to scratching or rubbing off and also due to natural causes from the effects of hydrocarbons or petroleum present under the ground. Thus, the warning indicia of the '503 Allen patent tend to disappear in use. Allen '282 provides a tape where the warning indicia is reverse printed on the inside surface of a transparent tape film so that the warning indicia cannot be rubbed off of the surface. In addition, Allen '282 is concerned with providing a better contrasting color situation to the color of the soil.

DeCourville, U.S. Pat. No. 4,654,639 [hereinafter "DeCourville '639"] is concerned with providing a signaling material [i.e. marker tape] for indicating the presence of a buried infrastructure such as a pipeline, electrical line or other buried object, to the operator of excavation machinery. The marker tape will be contacted by the excavation machinery before the buried infrastructure is and "signal" the presence of the buried infrastructure by being observed in the trench or in the excavator bucket. This is the classic marker tape which has been previously discussed at length. In practice, the marker tape, when struck by the bucket of an excavation machine, is not always visible either in the trench or in the bucket of the excavation machinery. This is apparently exacerbated when the soil in which the excavation is being made is rather loose so that the walls of the trench cave in at least to some degree to obscure the residue of the material which remains buried to either side of the trench.

DeCourville '639 attempts to remedy the problems in the prior art by providing a multi part signaling strip with a support grid with comparatively low resistance to rupture [low tensile strength] and by fastening to this support grid multiple, longitudinally extending discontinuous strips which have a substantially higher tensile strength than the support grid. This means that when the signaling device is struck by an excavator bucket, the low tensile strength support grid sections will be readily severed by the excavator bucket but at least one of the high tensile strength longitudinally extending discontinuous strips will be carried off in the bucket to signal the excavation machinery operators of the presence of the buried infrastructure. To this end, the length of the high tensile strength longitudinally extending strips is selected such that it is greater than the maximum dimension of a typical excavating bucket. This helps to ensure that the longitudinal extending strip will overhang the end of the bucket to better warn the excavation crew.

DeCourville '639 teaches that the longitudinal extending strip sections may be made from a metal to have the necessary high tensile strength. Naturally the metal must be protected from the soil environment, so that it may be a low corrodibility metal [perhaps stainless steel] or it is protected by an appropriate coating, or protective synthetic resin [plastic] material, woven fiber bands or even non-woven plastic fiber bands. The support grid can be made from polyvinyl chloride, polyethylene or polypropylene either in the form of a foil or film, synthetic fibers. cotton or the like. The support grid may be a perforated or non-perforated film or foil. DeCourville even states that the support grid may be biodegradable, if desired.

As shown in FIGS. 20 and 21, the DeCourville signaling material comprises a support grid or grill 80 comprising a plastic material which is thermally bonded to two plastic foil or sheet bands 82 fused along their longitudinal edges to the grid 80 and thereby providing respective pockets 88. Each of the pockets 88 receives a multiplicity of metal strip sections 84 disposed in a spaced apart relationship. The space between metal strip sections 84 is shown at 86 in FIG. 20. These spaces 86 are arranged such that the space 86 between the strips 84 shown in the upper portion of FIG. 20 occur in the middle of the strips 82 in the lower portion of FIG. 20. This spacing aids in having at least one of the strips 82 be visible when the assembly is struck by an excavator bucket 90 as shown in FIG. 22. Clearly DeCourville '639 fails to teach or suggest the use of a marker tape as provided in the applicants' invention—that is, a marker tape with a strong core material that is capable of being consistently pulled out of the ground, without breaking, while also capable of, consistently, bringing some, at least, of the remainder of the marker tape to the surface so that it can be seen by an excavation crew and thus warn the crew of the presence of a buried infrastructure.

Cosman et al., U.S. Pat. No. 4,767,237 [hereinafter "Cosman '237"], provides for a more or less conventional marker tape which carries two closely spaced parallel conductor wires along the length of the marker tape. The purpose of the wires is to permit the determination of a break in the marker tape. This is achieved by measuring the capacitance presented by the two closely spaced parallel conductor wires. To work, the Cosman '237 marker tape must be able to be accessed from the surface so that a transmitter may be connected to the wires. In use, the marker tape is buried above an buried infrastructure and passive, resonating markers are attached to the marker tape at pre-determined locations of interest, such as splice points in the buried infrastructure or Tee points [for a pipe]. The passive resonating markers are detected thus locating the locations of interest and the spaced, parallel wires can be used to determine the approximate location of a break in the marker tape. Clearly Cosman '237 fails to teach or suggest the use of a marker tape as provided in the applicants' invention—that is, a marker tape with a strong core material that is capable of being consistently pulled out of the ground, without breaking, while also capable of, consistently, bringing some, at least, of the remainder of the marker tape to the surface so that it can be seen by an excavation crew and thus warn the crew of the presence of a buried infrastructure.

Cosman et al., U.S. Pat. No. 5,017,415 provides a more or less conventional non-conductive marker tape construction with multiple passive resonating markers attached on the tape at pre-determined locations. The marker tape is buried above a buried infrastructure and the passive resonating markers are located using conventional techniques. The passive resonating markers do not require any surface access to be activated and detected and the marker tape still works even if broken. Cosman '415 fails to teach or suggest the use of a marker tape as provided in the applicants' invention— that is, a marker tape with a strong core material that is capable of being consistently pulled out of the ground, without breaking, while also capable of, consistently, bringing some, at least, of the remainder of the marker tape to the surface so that it can be seen by an excavation crew and thus warn the crew of the presence of a buried infrastructure.

RFID Technology:

Radio Frequency Identification [RFID] devices (usually called "RFID tags") are well-known and typically include an integrated circuit (IC) operatively coupled to an antenna. The tag may also have an internal power source, such as a battery, or it may have no power source and may instead obtain energy from an external reader. When lower cost is the predominant factor, RFID tags without batteries may well be preferable. One of the down-sides to an RFID with no internal power source is low operating range. In other words, if the only power for the RFID tag comes from the reader [the interrogating device] emissions, then the reader will have to be fairly close to the tag for the system to work. RFID tags with batteries may be preferred for applications in which a longer read range is preferred. Either or both may be used in conjunction with the present invention. The RFID tags of the present invention preferably resonate in the UHF or microwave frequency band, either of which enables an RFID reader to interrogate the tags from a sufficiently long read range to be useful.

The integrated circuit associated with an RFID tag typically includes a certain amount of memory in which a tag identifier is stored, and perhaps other information related to the tag, and/or the item or items with which the tag is to be associated. When an RFID reader (also known as an interrogator, either of which may read or write information to an RFID tag) transmits energy via its reader antenna to interrogate the RFID tag, the tag responds with information from which the reader can obtain the RFID tag identifier or other information. The data, identifier, or information obtained by the RFID reader may then be compared to entries in a database of identifiers or to information associated with that RFID tag. In that manner, information regarding an RFID-tagged item may be obtained, updated, and provided to a user, and/or written to an RFID tag, perhaps even in real time.

Presently available RFID systems operate in both low frequency (less than 100 megahertz) and high frequency (greater than 100 megahertz) modes. Unlike their low-frequency counterparts, high-frequency tags can have their data read at distances of greater than one meter, even while closely spaced together. New data can also be transmitted to the tags.

A number of RFID devices have been developed to detect and protect underground utilities. For example, the 3M™ EMS Caution Tape 7600 Series provides a caution tape which may be installed near or above a buried infrastructure such as a natural gas line, a telephone line, power line, water line or any other type of buried infrastructure. The markers comprise small RFID devices attached to a known marker tape. The devices operate with a reader such as the 3M™ Dynatel™ Locator 700 Series. The RFID markers require no on-board batteries and do not require an external transmitter hooked up to the marker tape or the use of access points. The markers work independently, so that—even if a section of the caution tape is cut or removed—the other markers on the tape continue to provide location information. The caution tape is provided in the standard underground utility colors and the markers are tuned to the industry standard frequency specific to the various types of undergrounde utilities [gas, telco, wastewater, etc.]. The 3M™ EMS Caution Tape 7600 Series can function down to a burial depth of 2 feet [0.61 m].

Another 3M™ product for marking underground infrastructure is 3M™ EMS Rope 7700 Series. The rope comprises a polyester rope with EMS markers installed about every 8 feet [or approximately 2.44 m] along the rope. As with the caution tape a cut in the rope does not affect the functioning of the the remaining markers. The rope is strong enough to be buried down to 4 feet (or approximately 1.2 m) through rugged terrain.

The Signal Tape of this invention may incorporate RFID tags similar to those used in the 3M™ EMS Caution Tape 7600 Series as discussed supra. The Signal Tape of this invention may also incorporate polyester rope as a core material as discussed below and it is envisioned that the polyester rope used with this invention may incorporate RFID tags and be similar to the 3M™ EMS Rope 7700 Series discussed above. As in discussed infra, any polyester rope used in the inventive Signal Tape would be used as the core material of the Signal Tape and, of necessity, be much stronger than the polyester rope of the 3M™ EMS Rope 7700 Series. The Signal Tape of this invention may also incorporate plain polyester rope as a core material with separate RFID tags similar to those used in the 3M™ EMS Caution Tape 7600 Series as discussed above. These and other embodiments will be discussed below.

Tracer Wire Technology:

Tracer wire is well-known for use in aiding the location of underground utilities which are constructed of non-metallic materials. There have been many systems developed over the years to detect, locate and map ferrous and other metallic underground utilities without the use of tracer wire. Most of these systems involve applying or inducing an alternating current in a metallic underground utility. The applied or induced alternating current produces magnetic fields which can then be sensed from the surface and used to map the underground utility. In recent years it has become common practice to use non-metallic or polymer materials for underground utilities. For example, gas, water and sewer lines are increasingly being made of polymers. Location of a non-metallic polymer underground utility by conventional methodology is made possible by burying a metallic "tracer wire" in a known [and constant] spatial relationship to the underground utility. Alternating current is then applied or induced in the tracer wire and the tracer wire is mapped from the surface. Since the spatial relationship of the tracer wire to the non-metallic underground utility is known—mapping the tracer wire maps the underground utility.

Tracer wire should be buried in a known [and constant] spatial relationship to the underground utility. For example, the tracer wire may be buried a few inches [i.e., two in or more—5.1 cm or more] above the underground utility or a few inches [i.e., two in or more—5.1 cm or more] to one side or the other of the underground utility. The important thing is that, whatever the orientation of the tracer wire to the underground utility, that orientation must be constant and known. At predetermined intervals along the length of the underground utility, the tracer wire is brought to the surface of the ground or to a manhole or other access port near the surface of the ground so that an electric current may be applied [from the surface] to the tracer wire. When it is desired to locate the underground utility, the tracer wire is accessed and an AC current is applied to it at one end and another end of the tracer wire is grounded. This AC current flowing through the tracer wire [to the ground] generates a magnetic signal which is broadcast from the tracer wire. This signal can be remotely detected and mapped from the ground surface using hand-held conventional magnetic locating devices [receivers]. For example, the "Maggie" or the "GA-92XTd" magnetic locating receivers from Schonstedt Instrument Company. When the tracer wire's location has been mapped, because the spatial relationship between the location of the tracer wire and the underground utility is known, mapping the tracer wire enables the mapping of the underground utility.

A number of companies sell this type of magnetic locating equipment. For example, the CL 300 Cable Locating Kit from Schonstedt Instrument Company contains a magnetic receiver [such as the "Maggie" or the "GA-92XTd" or a similar receiver] a transmitter to apply an AC current directly to a metallic underground utility, to induce an AC current using an inductive clamp, or by remote induction, and the various accessories necessary to map underground utilities or tracer wire. Using the Schonstedt system, the transmitter can either be electrically connected directly to a metallic underground utility [or to a metallic tracer wire] to induce the desired magnetic fields. In addition, Schonstedt provides an inductive clamp which can be clamped about the underground utility [or the tracer wire] and the transmitter will then induce the desired magnetic fields in the metallic utility or the tracer wire without a direct electrical connection. Lastly, the transmitter has the capability to directly broadcast a varying magnetic field from the surface of the ground, which varying magnetic field will then induce the desired magnetic fields in the buried metallic underground utility or tracer wire. Obviously, this last option is more limited with regard to range and the direct electrical connection is the preferred operating mode. Under ideal conditions, the Schonstedt system can detect underground metallic utilities [or tracer wire] at depths up to 19 feet [or approximately 5.8 m].

It is important that the tracer wire be properly treated to protect it from the underground environment. If the tracer wire is mechanically broken during installation or from some unexpected source after installation or if the tracer wire deteriorates and corrosion causes a break in the wire, it will be impossible to use the wire to map an underground utility. As one source[3] relates, the use of improper protective covering for a copper tracer wire can have disastrous results. If the locality specification for tracer wire only requires the contractor to "Install #12 solid copper wire with jacket" as many localities do specify, the contractor may well go to the nearest lumber yard or electrical wholesaler and purchase the cheapest #12 solid copper wire available. Often this will be THHN wire or "Thermoplastic, High-Heat-resistant Nylon coated wire. The nylon PVC coating on THHN wire will typically last for about two [2] years underground before it deteriorates and exposes the copper. Bare copper wire, over time, tends to return to its original state, that is, earth. This situation will obviously cause a loss of signal and make it much more difficult [or impossible] to use the tracer wire to locate and map an underground utility.

[3]"Do's and Don'ts of Tracer Wire Systems", Michael Moore, downloaded from WaterWorld™ at http://www.waterworld.com/articles/2010/09/dos-and-donts-of-tacer-wire-systems.html in February, 2017.

The tracer wire can be easily laid in the desired location with respect to the underground utility if the utility is installed using a trenching method. The tracer wire can also be laid using a horizontal boring system by affixing the tracer wire to the boring head at the same time as the boring head is used for pulling back the underground utility. This is most often done when the underground utility is made from non-metallic materials and thus not easily locatable after burial by known locating and mapping techniques. In this circumstance, it is known to emplace multiple tracer wires along with the underground utility to ensure that one tracer wire, at least, will not break and thus provide a locating signal when needed. When the utility is laid by boring, the strength of the tracer wire becomes quite important since breakage during pull back is a much greater problem than breakage with a trench laid underground utility. Since normal copper tracer wire does not have high tensile strength, it is sometimes desired to use copper coated steel wire as tracer wire in boring operations. It is noted that tracer wire can be a solid copper wire but it can also be a copper coated steel-cored wire. This construction gives much increased strength to the tracer wire with substantially the same conductivity for equivalent sized wires.

Conventional prior art tracer wire is shown in FIGS. 23 and 24. As shown in FIG. 23 conventional tracer wire 100 comprises a solid copper core 102 covered by insulation 104. FIG. 24 shows the conventional tracer wire as a cross-section along arrow F of FIG. 23.

Litz Wire Technology:

The term "Litz wire" is derived from the German word litzendraht, meaning "woven wire." Generally defined, it is a wire constructed of individually film-insulated wires bunched or braided together in a wire bundle comprising a uniform pattern of twists and length of lay. The multistrand configuration [the wire bundle] minimizes the power losses otherwise encountered in a solid conductor carrying alternating current due to the "skin effect," or the tendency of radio frequency current to be concentrated at the surface of the conductor. In order to counteract this effect, it is necessary to increase the amount of surface area without appreciably increasing the size of the conductor. This is done by providing a many-stranded bundle of wire with each strand having a small diameter. It is critical that each strand in a Litz wire bundle be insulated—otherwise the entire bundle would simply act as an equivalent sized solid wire. Polyurethane and Polyurethane Nylon films are materials most often used for insulating individual strands because of their low electrical losses and their solderability; however, other insulations can also be used. Litz wires are generally further insulated with a single or double wrap or serving of a textile—typically nylon—on the outside of the wire bundle but they are also available unserved.

Even properly constructed Litz wires will exhibit some skin effect due to the limitations of stranding. Wires intended for higher frequency ranges require more strands of a finer gauge size than Litz wires of equal cross-sectional area but composed of fewer and larger strands. In properly designed Litz wire, the size of the individual strands will be approximately equal to the "skin effect" depth so that power losses due to the skin effect can be minimized.

In a stranded wire construction—such as Litz wire—it is also important to minimize power losses due to the proximity effect. Proximity effect is the tendency for current to flow in loops or concentrated distributions due to the presence of magnetic fields generated by nearby conductors. In transformers and inductors, proximity effect losses are generally more significant than skin effect losses. In Litz wire windings, proximity effect may be sub-divided into internal proximity effect (the effect of other currents within the bundle) and outer proximity effect (the effect of the current in other bundles). The reason for twisting or weaving Litz wire, rather than just grouping fine conductors together without twisting or weaving, is to ensure that the strand currents are equal. Simple twisted bunched conductor wire can accomplish this adequately where proximity effect would be the only significant problem with solid wire. Where skin effect would also be a problem, more complex Litz wire constructions can be used to ensure equal strand currents. Therefore, in a well-designed construction, strand currents are nearly equal. In general, this complex Litz wire construction seeks to have an individual strand running in a given length of a wire bundle to move from the center of the wire bundle to the outside of the wire bundle and then back into the center of the wire bundle, and so forth, in order to eventually occupy every possible position in the cross-section of the wire bundle.

The "skin effect" mentioned above varies with changes in material and frequency. At low frequencies, the skin effect is practically negligible. That is, the "skin depth" or depth of conduction is such that almost the entire cross-section of the conductor is being used for conduction. For example, at a frequency of 60 Hz in copper, the "skin depth" is about a centimeter. As shown in FIG. 25, this would mean that for a copper conductor 110 which is, for example, 2 centimeters in diameter, carrying alternating current at a frequency of about 60 Hz, almost the entire cross sectional area A, of the conductor 110 would be utilized to conduct the current. This is illustrated in FIG. 25 using the stippling clear across the diameter of conductor 110. At a frequency of 500 Hz in copper, skin depth is approximately 0.34 centimeters. Thus, the 2 centimeter diameter copper wire shown in FIG. 26, carrying alternating current at 500 HZ, would only be using about 60% of the wire cross section to conduct current. This is represented by the doughnut shaped area 112 between areas $A_1$ and $A_2$ in FIG. 26. At a frequency of 1 MHz in copper, skin depth is approximately 0.0076 cm. This would mean that the 2 centimeter copper wire shown in FIG. 27 carrying alternating current at 1 MHZ would only be using about 1.5% of the wire cross-section to conduct current. This is illustrated by the small, stippled, doughnut shaped area 114 between the circles in FIG. 27. It is obvious from the forgoing examples that the skin effect can result in considerable conductive losses. To avoid these problems, Litz wire can be used such that, for a given operating frequency, the individual wires in the Litz wire construction are chosen to be about the same thickness as the skin depth, so that there is very little conductive loss due to the skin effect.

Litz wire can be procured in many different configurations. For example, simple Litz wire might comprise five [5] single, film-insulated wire strands, twisted with an optional outer insulation of textile yarn, tape or extruded compound. This construction is illustrated in FIG. 28. Another type of Litz wire might comprise 5 strands of the type of Litz wire shown in FIG. 28 [but without the optional outer insulation] twisted together with an optional outer insulation covering the entire assembly. This type of Litz wire is shown in FIG. 29. Where more strength is desired for the Litz wire assembly, multiple strands of the type of Litz wire shown in FIG. 28 [but without the optional outer insulation] can be twisted around a central fiber core with an outer insulation covering the entire assembly. This type of Litz wire is shown in FIG. 30. It is also possible to provide Litz wire as a rectangular cross-section assembly comprised of individual, film insulated wire strands twisted and braided into a rectangular configuration. This is illustrated in FIG. 31. Typical applications for Litz wire conductors include high-frequency inductors and transformers, motors, relays, inverters, power supplies, DC/DC converters, communications equipment, ultra-sonic equipment, sonar equipment, television equipment, and heat induction equipment. The applicants are not aware that anyone has heretofore used Litz wire as tracer wire or in marker tape.

Horizontal Boring Technology:

One of the most common methods currently used to lay underground utilities is horizontal boring using a directional boring machine such as is shown in Geldner, U.S. Pat. No. 5,803,189 [hereinafter "Geldner '189"]. As is discussed in Geldner '189, the conventional directional boring machine comprises a movable carriage mounted on a tracked base with a longitudinal boom mounted on the carriage and a drill head that is mounted on the boom for forward and reverse movement along the longitudinal boom. The boom is angled relative to the surface to be drilled at an angle ranging from 5° to 25°. The drill head includes a rotating spindle, generally driven by a hydraulic motor, to which one or more elongated drill stems are detachably connected. Conventional directional boring machines operate by connecting one end of a first drill stem to the rotating spindle of the drill head and connecting a drill bit to the opposite or outer end. With the drill head in a retracted position on the boom, spindle rotation begins and the drill head is advanced down the boom resulting in the drilling of a bore. When the drill head reaches the outer boom end, the drill stem is detached from the drill head spindle and the drill head is retracted to its original position. One end of a second drill stem is then mounted to the spindle with its opposite end connected to the existing drill stem. The drilling process then continues until the drill head again reaches the end of the boom, and the process is repeated.

The drill stems are relatively rigid, and the bore that is being drilled initially extends in a straight direction at an inclined angle that corresponds to the angle of the boom. The angle of drilling may be altered so that, when a desired depth is reached, the drilling operation is changed to horizontal. When the underground bore is of the desired length, the drill bit can be directed angularly upward until it re-emerges at ground surface or enters a target hole dug at the desired target. The position of the drill bit, both with respect to direction and depth, may be determined by a conventional electronic transmitter located in the drill bit and an electronic receiver that is carried on the ground surface. In this manner, underground bores of considerable length may be bored.

When the drill bit re-emerges from the ground at the target location or enters the target pit, the utility which is being laid is attached to the drill bit, which is specially configured for such attachment, and the drill bit with the utility attached is withdrawn back to the starting point, pulling the utility with it. This part of the operation is called "pullback." In this manner, utility lines which may be pipes, power lines or telecommunication cables, etc. may be laid without expensive and time-consuming trenching and backfilling.

Many non-metallic utility lines are laid using horizontal boring and local codes almost always require that tracer wire be laid over or near the utility to enable the installed non-metallic utility line to be located at a later date. The usual practice is to secure a tracer wire line to the drill bit when the utility is secured to the head before pullback. In this manner, the required tracer wire is laid at the same time as the utility. Unfortunately, most of the types of wire used as tracer wire for this process do not have a great deal of strength and it is not unusual for the tracer wire to break during pullback. Broken tracer wire is pretty useless, so the normal practice is to attach several tracer wires to the bit so that at least one of them will be laid over the entire run of the utility without breaking.

SUMMARY OF THE INVENTION

The disclosed Signal Tape of the invention utilizes a very strong core material which, when incorporated into the body of the Signal Tape and buried underground, is strong enough to be pulled out of the ground—without breaking—when struck by excavation machinery. The most common type of excavation machinery in use is the backhoe. The core material is laminated within a protective film material which protects the core material from damage caused by contact with the ground [moisture, mechanical abrasion, chemical action, etc]. The protective material is also designed to be pulled from the ground [at least in part] and color coding, warning and coding indicia and other indicia [instructions for example] are emplaced upon the protective film material. It is important that the Signal Tape be brought to the surface no matter what angle the excavator bucket or scoop hits the Signal Tape. The disclosed Signal Tape will be brought to the surface by the excavator bucket with a 90° hit—in other words straight across the longitudinal direction of the Signal Tape. It will also work well if the excavator bucket or scoop hits the Signal Tape at a 45° angle. It is also important that the Signal Tape be brought to the surface if the excavator bucket or scoop hits the Signal Tape along the longitudinal direction—a 180° hit [or 0° hit].

The core material for the Signal Tape may comprise a metallic cable which will not be readily cut by the excavator's bucket or scoop or easily broken when it is being pulled out of the ground by said bucket or scoop. The core material may also be a woven fabric or any other suitable material. The critical factors for the core material are strength, elongation and cost. The core material must be strong in tension and in shear. During the initial strike by the excavator bucket or scoop, the shear strength of the core material is more important than the tensile strength because the forces on the core material are directly across the length of the core material, i.e., shear forces. If the core material is not strong enough in shear, it may be broken during the initial strike by the excavator bucket or scoop. Indeed, it is thought that this lack of adequate shear strength is one of the main reasons why so many prior art marker tapes fail when struck by the excavator bucket or scoop. Once the initial strike has occurred, the excavator bucket or scoop begins to pull the core material [and the rest of the Signal Tape structure] out of the ground, and the tension strength of the core material becomes more important. The ideal core material would be very strong in both tension and shear, very cheap and capable of indefinite elongation. Unfortunately, high strength often means high cost and good elongation characteristics often come with poor strength capabilities.

The core material has an inverse relationship between strength and "elongation". When the core material is cable or some other type of material that is strong but does not readily stretch, extra material must be placed within the Signal Tape to ensure that the core material will be brought to the surface by an excavator bucket. For example, extra wire would be emplaced within the Signal Tape such that 100 feet [approximately 30.5 m] of Signal Tape may have as much as 200 feet [approximately 61 m] of core material [or more] therein. This would give a extra material ratio of 2 to 1. In this manner a core material which does not stretch can "elongate" within the meaning of the term as used herein. Smaller extra core material ratios may also be used depending upon the strength of the selected core material, for example, some embodiments of Signal Tape core material may have an extra core material ratio of 1.2 to 1.

On the other hand, a core material that has good strength and good elongation characteristics may well require less material in a given length of Signal Tape and the ratio of extra material may be more like 1 to 1 or approximately 100 feet [approximately 30.5 m] of core material to a 100 foot [approximately 30.5 m] section of Signal Tape. This type of core material may be, for example, shock cord which is available in various diameters and strengths. An example of a shock cord suitable for use with the Signal Tape of the invention would be ½ inch diameter polypropylene shock cord from Consolidated Cordage [sales@consolidatedcordage.com] which has an average tensile strength of 450 pounds$_f$ [or about 2000 N].

When using a metallic cable as the core material, it has been found that a 0.25 inch [approximately 0.32 cm] metallic cable with a tensile strength of approximately 850 pounds$_f$ [approximately 3781 N] works well if matched with a 2 to 1 extra material relationship [200 feet [61 m] of core material in a 100 foot [30.5 m] length of Signal Tape]. It has also been found that a metallic cable with a tensile strength of 100 pounds$_f$ [approximately 440 N] will work in many instances. It is noted that Signal Tape with core material in this strength range [approximately 100 pounds$_f$ does not come to the surface as reliably as the core materials discussed infra for the preferred embodiments of Signal Tape.

The core material may also comprise fabric. Woven fabrics are available which have the pre-requisite low cost and yet still have good tensile strength. For example, a woven fabric product commonly used to pull wires through electrical conduits has been found to be suitable for use as core material for the invention. This material is also relatively inexpensive. The material is a polyester ribbon, approximately ½ inch [or ~1.3 cm] in width and having a tensile strength of approximately 1250 pounds$_f$ [approximately 5560 N]. The ribbon has low elongation capabilities so it would be used in the Signal Tape of the invention with approximately a 2 to 1 extra material relationship—or approximately 200 feet [approximately 61 m] of ribbon would be contained within a 100 foot [approximately 30.5 m] section of the tape.

The core material may also comprise a rope. For example, polyester rope has good strength and reasonable pricing. A 5/16 in [approximately 0.79 cm] diameter polyester rope has an ultimate breaking strength of >2000 pound$_f$ [>approximately 8900 N]. Polyester rope does not have great elongation characteristics but it does have good environmental capabilities for underground burial. It has excellent abrasion resistance, good chemical resistance to alkalis and acids at the temperatures expected in underground burial, and excellent resistance to petroleum based products, bleaches and solvents. Higher strength polyester rope is also available. For example, a 1 in diameter [2.54 cm] polyester rope is available with a tensile strength of approximately 6000 pound$_f$ [or approximately 27000 N]. This product has been tested as a core material in Signal Tape and works well.

The disclosed Signal Tape is also designed to be used with embedded RFID tags which, as noted above may be similar to [or identical to] those used in the 3M™ EMS Caution Tape 7600 Series as discussed above. As noted above, the signal Tape of this invention may use polyester rope as the core material and, in some instances, the Signal Tape may incorporate polyester rope with embedded RFID tags similar to the 3M™ EMS Rope 7700 Series discussed above.

The disclosed Signal Tape is designed such that when installed near and/or over a pipeline or other buried infrastructure, the tape will be in a position such that an excavator digging near the pipeline will encounter the tape first [before encountering the pipeline] and drag a substantial portion of the Signal Tape above the surface such that the Signal Tape will be observed by a spotter or even the excavator operator. The normal burial depth for Signal Tape is approximately 1 foot [or ~0.30 m] below the soil surface; however, various field conditions such as density, soil composition, water table depth, climate, etc., etc can affect the desired burial depth. Thus, the burial depth can change for a number of reasons. It is unlikely to be too much less than 1 foot [0.30 m] because of the potential for erosion to expose the Signal Tape which is not desirable for obvious reasons. Burial at depths much greater than 1 foot [0.30 m]—2 feet [0.61 m], 3 feet [0.91 m], 4 feet [1.22 m] or more—of course, means that the underground infrastructure which the Signal Tape is designed to protect is buried at a greater depth because the Signal Tape must be [for obvious reasons] buried above the buried infrastructure to do any good. The other problem with a much greater than 1 foot [0.30 m] burial depth for the Signal Tape is that it is harder to detect using known locator technology the deeper it is buried. In addition, the deeper the burial depth, the more difficult it is to bring the Signal Tape to the surface with an excavator since it takes greater energy to move the Signal Tape out of the soil—meaning that the more deeply buried the Signal Tape, the stronger it must be in both tension and shear.

DETAILED DESCRIPTION OF THE INVENTION

Figure 32:
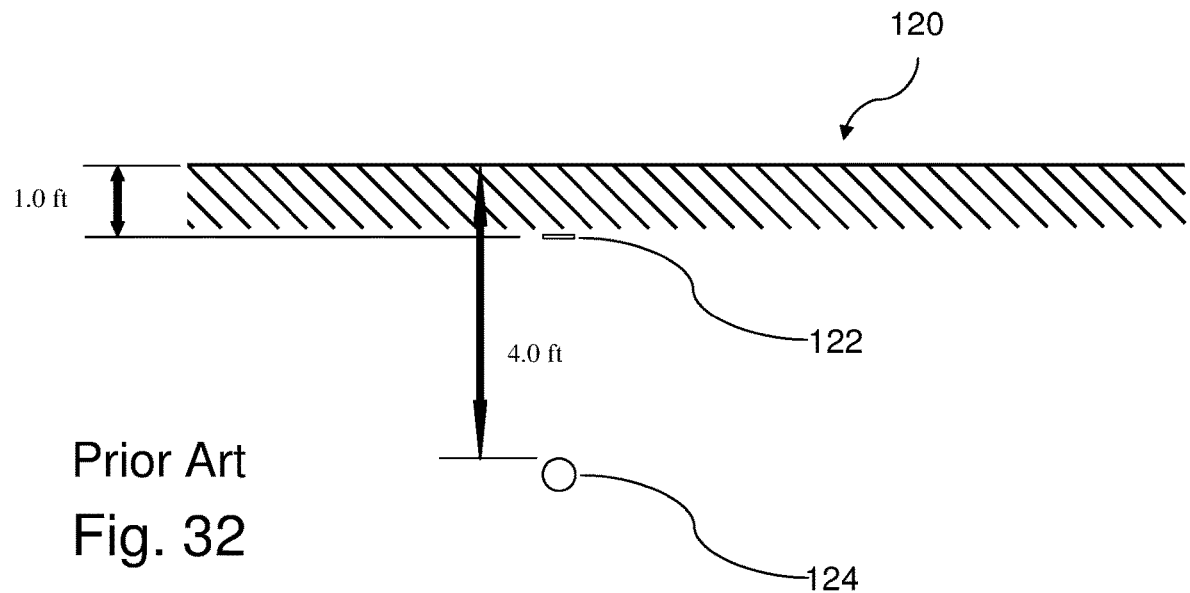
FIG. 32 shows the installation of a prior art marker tape "protecting" a buried pipeline.
Figure 33:
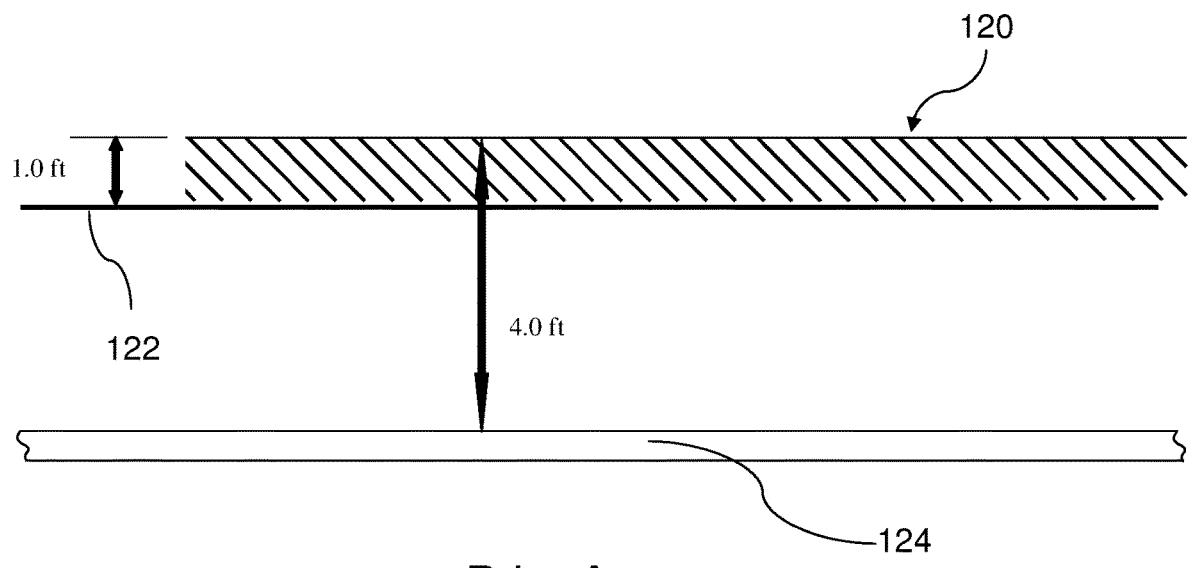
FIG. 33 shows a side view of FIG. 32.

FIG. 32 shown a prior art marker tape installation viewed along the length of the buried utility 124 [in this case, a pipeline]. Buried utility 124 is emplaced under the soil surface 120 at approximately a four (4) foot [approximately 1.22 m] depth. A marker tape of the type disclosed by Allen [U.S. Pat. Nos. 3,115,861; 3,504,503 or 4,623,282] is buried above buried utility 124 and about one (1) foot [approximate 0.305 m] below the soil surface 120. FIG. 33 shows the same setup as FIG. 32 but from a side view.

It is noted that FIGS. 1-31 have already been described above in the BACKGROUND section.

Figure 34:
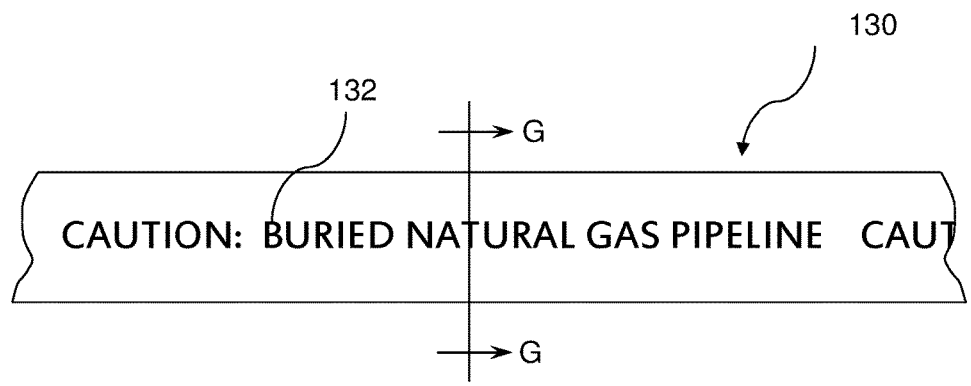
FIG. 34 shows Signal Tape of the invention.
Figure 35:
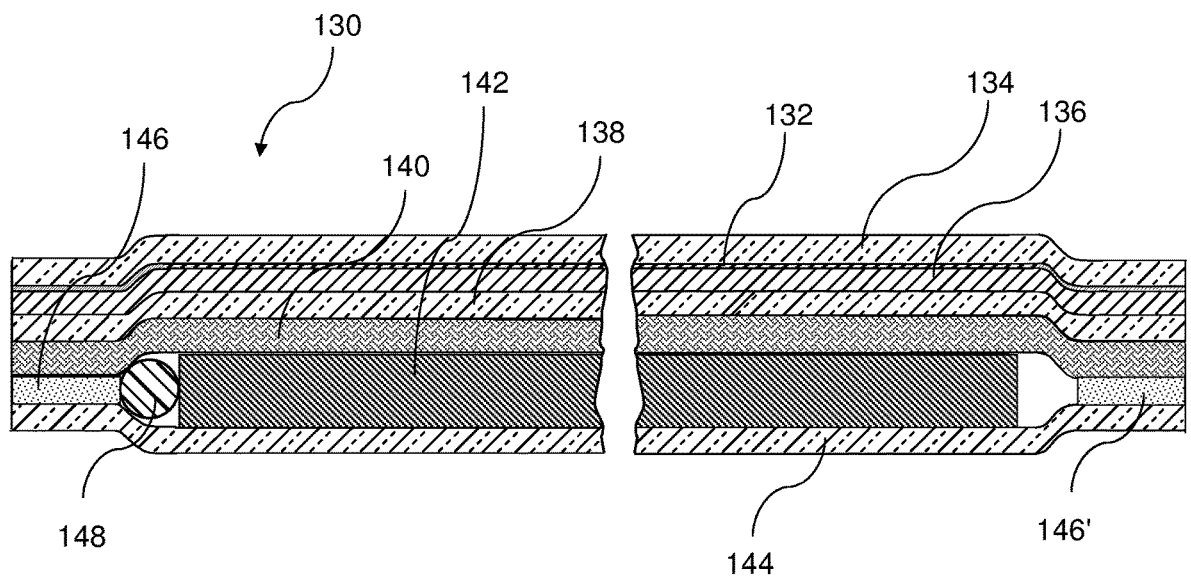
FIG. 35 shows a cross-section of the inventive Signal Tape along section G-G of FIG. 34.
Figure 36:
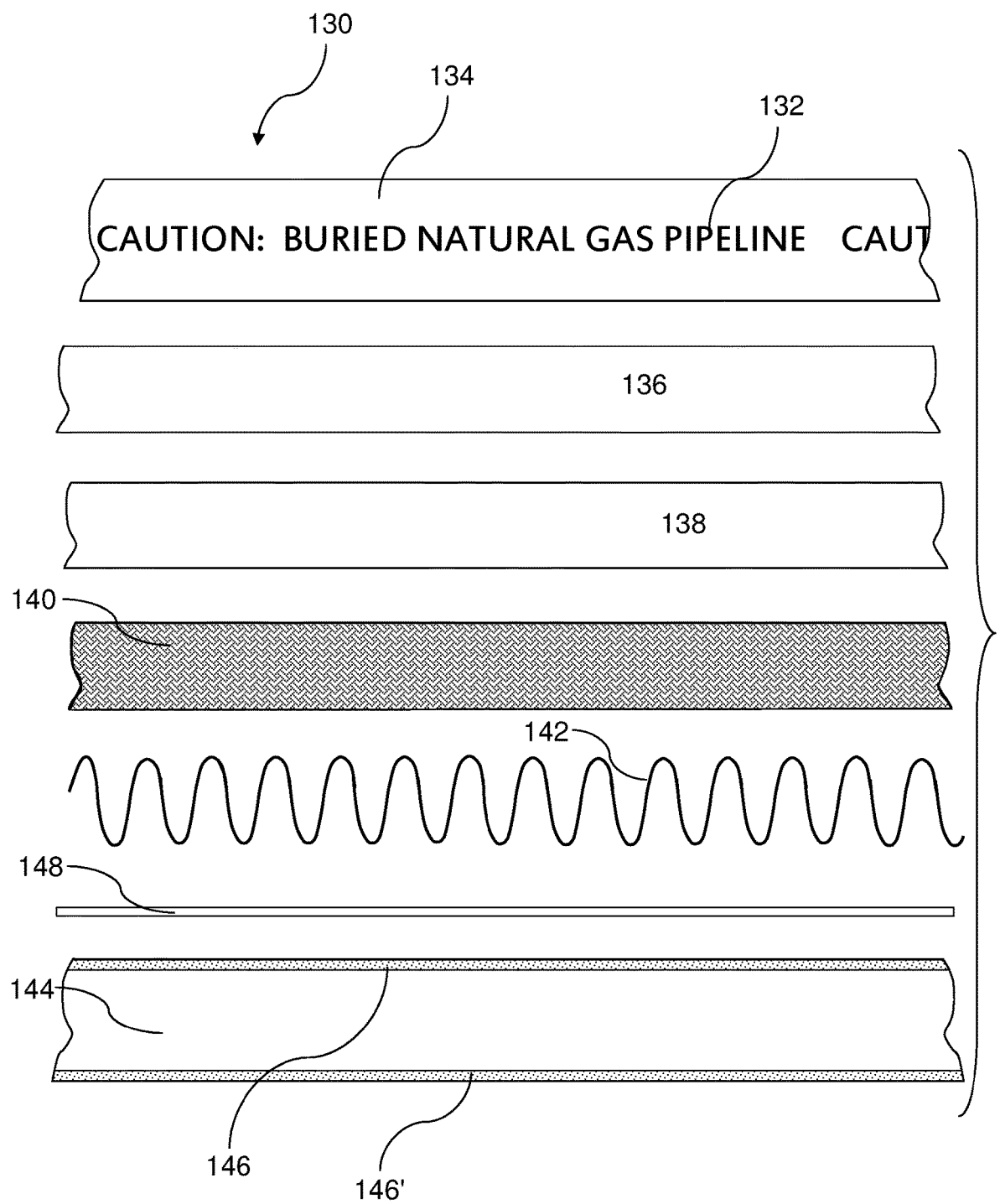
FIG. 36 shows an exploded view of the inventive Signal Tape of FIG. 34.

FIG. 34 shows Signal Tape 130 in vertical plan view with cautionary indicia 132 thereon. FIG. 35 shows a cross-section of tape 130 along the axis G-G shown in FIG. 33. FIG. 36 shows an exploded view of tape 130. These three Figures will be described at the same time. Tape 130 comprises a clear polyester layer 134 with cautionary indicia 132 reverse printed on the underside thereof. It is noted that part of the cautionary indicia 132 will also constitute a color code printed on the underside of layer 134 at the same time as the cautionary indicia. Thus, if tape 130 is intended to be used for protecting an underground gas line, a yellow color of indicia will also be imprinted along the underside of layer 134 at the same time as the cautionary indicia. A layer of Aluminum or other metallic foil 136 is attached to the underside of clear polyester layer 134 in known manner by adhesive [not shown]. Another layer of clear polyester 138 is attached to the underside of foil layer 136 in known manner by adhesive [also not shown]. A layer of woven fabric 140 is attached to the underside of clear polyester layer 138 [again by adhesive which is not shown in FIG. 35]. Core material 142 is sandwiched between woven fabric layer 140 and bottom clear polyester layer 144. Woven fabric layer 140 and bottom layer 144 are joined at the edges with adhesive strips 146, 146'. Conductive tracer wire 148 is also sandwiched between woven fabric layer 140 and bottom layer 144. It should be noted that, although adhesive strips 146, 146' are shown in FIG. 36 as strips, it is possible for the adhesive layer to run all the way across bottom layer 144, as desired.

Aluminum foil layer 136 and coated conductive layer 148 are both provided to permit the buried tape to be located from the surface by known electronic detecting instruments. The woven fabric layer 140 is provided to increase the strength of the covering materials. It is noted that another color code layer of indicia may be carried on the inside surface of bottom polyester layer 144.

The various dimensions of material thickness and other dimensional relationships illustrated in the drawings are not to scale and no inferences regarding actual layer thickness [or other dimensions] should be inferred from the scale of the drawings. The width of the tape may vary [for example due to field and soil conditions] but a width of 12 inches [approximately 30.5 cm] has been found to be satisfactory although it is envisaged that the Signal Tape will also be provided in widths of 6 inches [approximately 15.2 cm] and 3 inches [approximately 7.6 cm].

Figure 37:
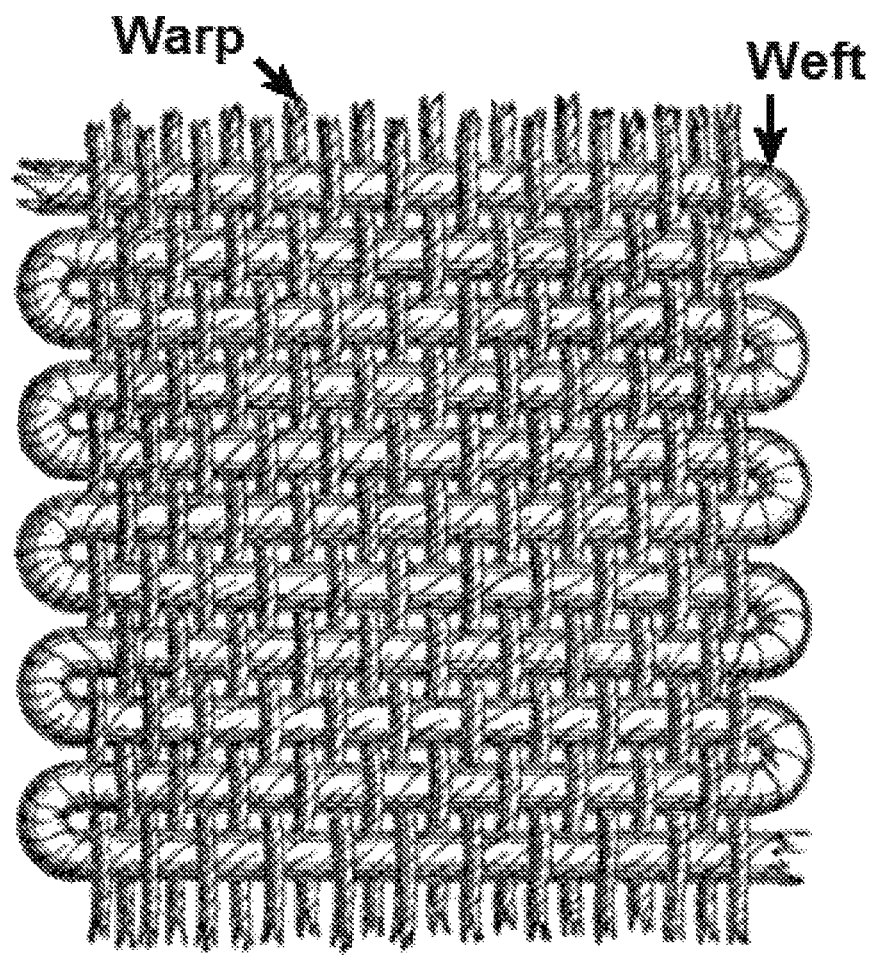
FIG. 37 shows how the core material can be made with woven threads.

FIG. 37 [taken from Wikipedia®] shows a large scale view of a woven tape such as might be used to construct core material 142. The tape is constructed of multiple longitudinal threads which are called the warp threads or alternatively end threads and threads running across the woven tape known as weft threads or alternatively a pic. As was discussed supra, the core material must be strong both in tension and in shear to function as intended for the invention. The tensile strength of a woven tape comes primarily from the warp [or end] threads. The shear strength of the woven tape comes primarily from the weft threads [or the pics]. It has been found that a polyester core material which is approximately ½ inch [~1.3 cm] wide may be used as core material. This material has a shear strength of approximately 75 pounds$_f$ [approximately 333.6 N] and a tensile strength of approximately 1250 pounds$_f$ [approximately 5560 N] and works well in the inventive Signal Tape as a core material. It has also been found that an aramid fiber core material works quite well. This aramid fiber core material is also about ½ inch [~1.3 cm] wide and has a shear strength in excess of 200 pound$f_f$ [or approximately 890 N] and a tensile strength in excess of 3000 pound$_f$ [or approximately 13340 N]. The aramid fiber tape is stronger than the polyester tape because the aramid fibers which the tape is made from are themselves stronger than the polyester fibers used to make the polyester tape but the tapes are also constructed differently. The aramid fiber tape has more pics per inch than the polyester fiber tape and the weft threads also have a higher strength to weight ratio in comparison to regular polyester.

The preferred material for the core material 142 of the preferred embodiment of Signal Tape is an aramid fiber tape approximately ½ inch [~1.3 cm] wide with a shear strength of greater than 200 pound$_f$ [or approximately 890 N] and a tensile strength in excess of 3000 pound$_f$ [or approximately 13340 N]. This core material works very well in Signal Tape when it is used with an extra material ratio of approximately 1.2 to 1. Thus, there would be approximately 1200 feet [approximately 366 m] of core material arranged in a 1000 foot [approximately 305 m] length of the inventive Signal Tape.

Figure 38:
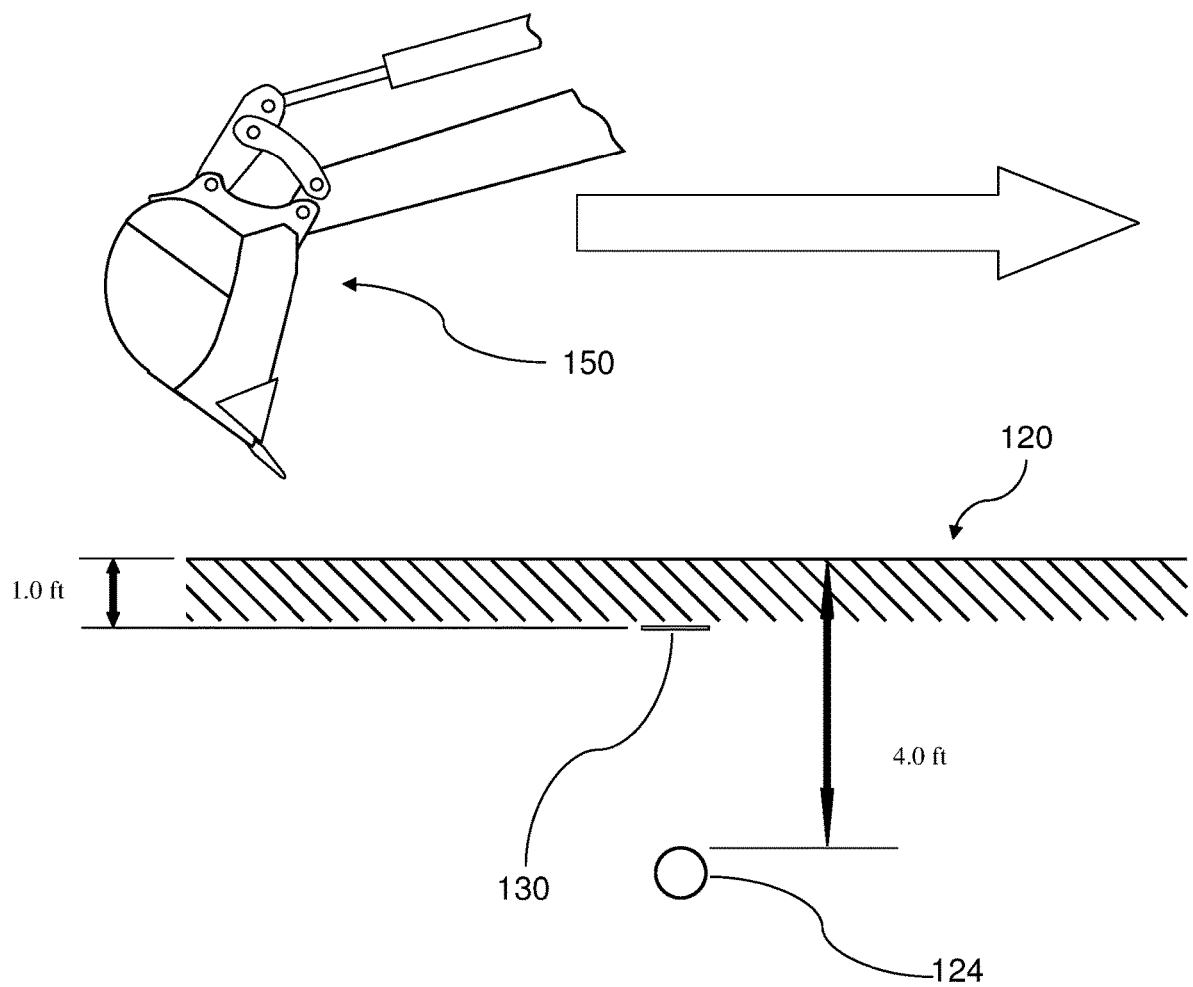
FIG. 38 shows a test dig with a backhoe using the inventive Signal Tape to "protect" a buried pipeline.

FIG. 38 shows a testing dig with the Signal Tape 130 of the invention buried above a buried utility 124 and the figure is viewed along the length of the buried utility 124. Excavator bucket 150 is about to dig transverse to buried utility 124.

Figure 39:
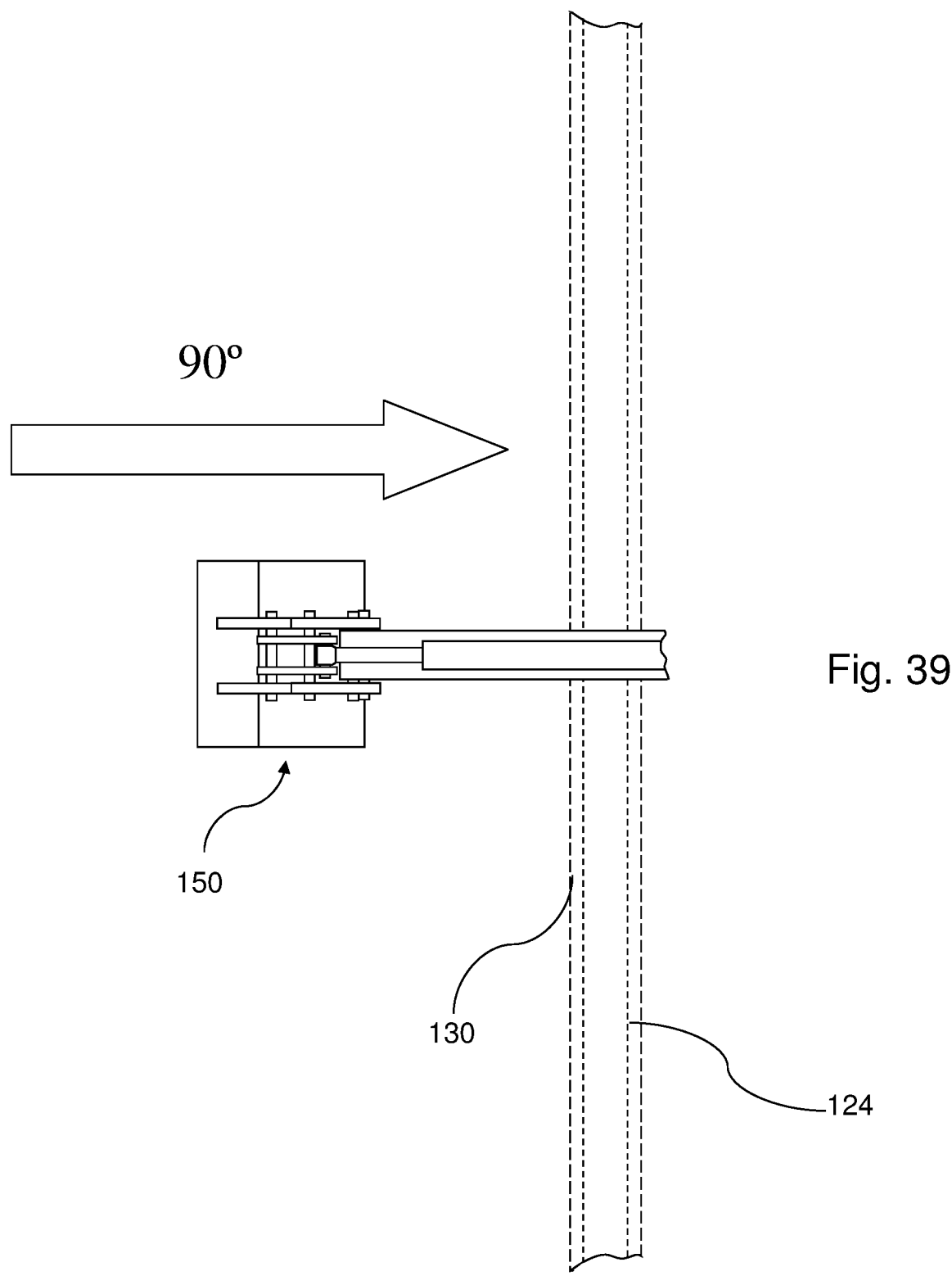
FIG. 39 shows a plan view from above-ground of FIG. 38.
Figure 40:
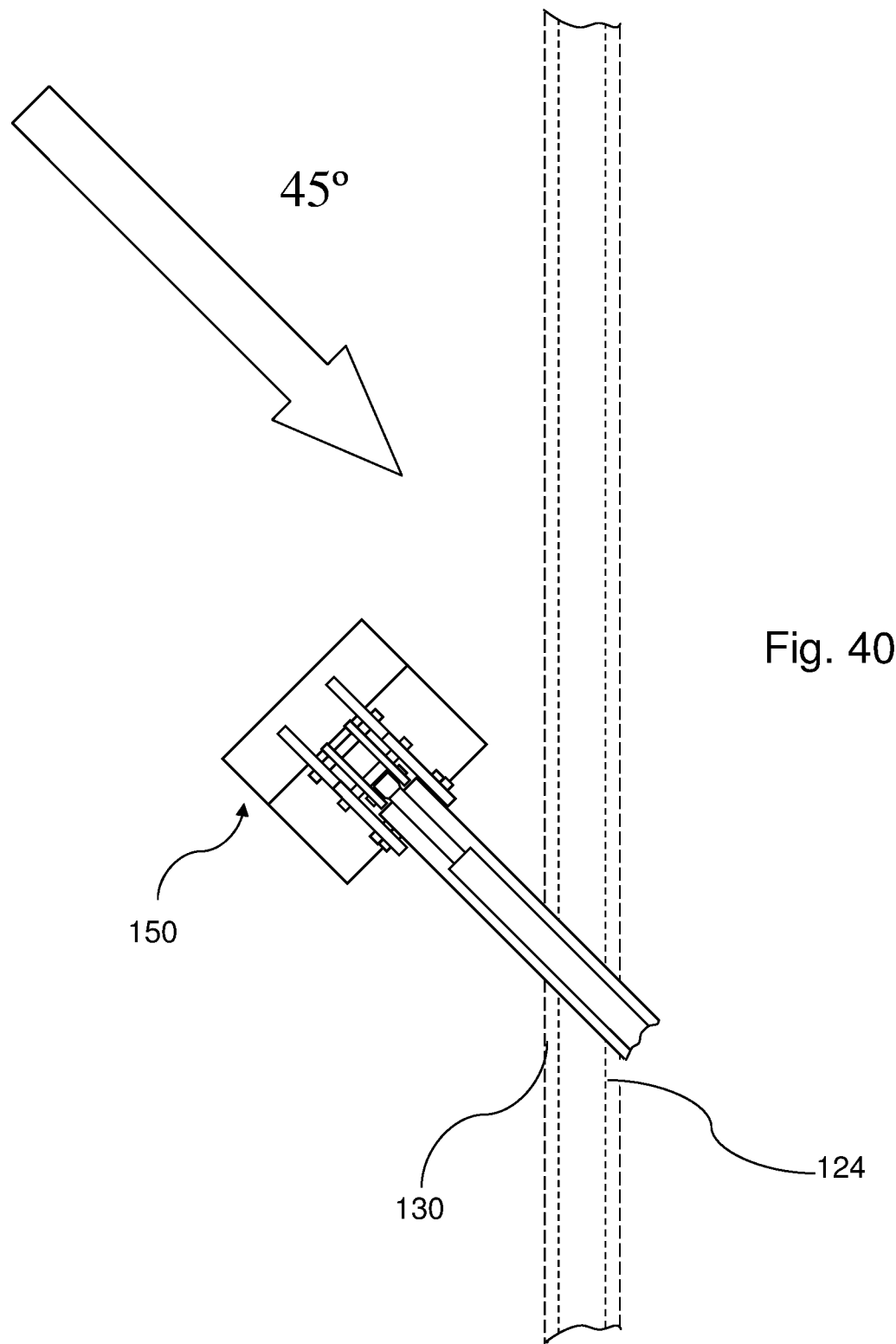
FIG. 40 shows a plan view of a 45° angle test dig.
Figure 41:
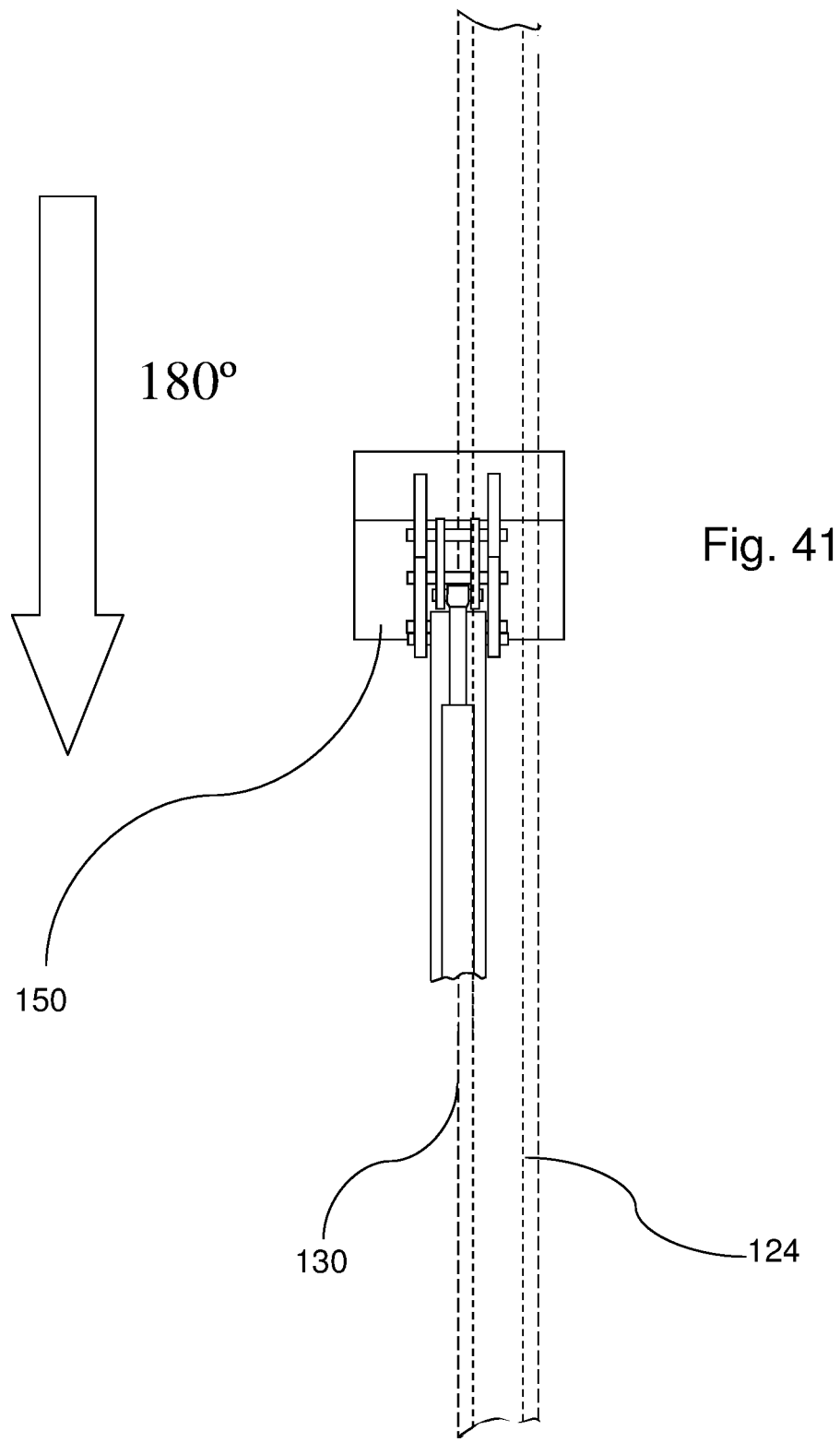
FIG. 41 shows a plan view of a 180° [or 0°] angle test dig.

FIGS. 39-41 show plan views from above ground of the testing dig shown in FIG. 38 with the Signal Tape 130 of the invention buried above a buried utility. Excavator bucket 150 is about to dig transverse to and to and in the vicinity of buried utility 124. In FIG. 39 the dig will be at a 90° angle to the length of the buried utility 124. In FIG. 40 the digging direction will be at a 45° angle to buried utility 124 and in FIG. 41 the digging angle will be 0° [or 180°] to the buried utility 124. Extensive field testing has shown that Signal Tape 130 works very well when struck at all angles. Signal Tape 130 will be struck by the excavator bucket before the bucket can get to the buried utility 124 and the excavator bucket will bring the core material and portions of the protective material to [and above] the surface of the soil to warn the excavator operator that there is a buried utility very close to his bucket.

Figure 42:
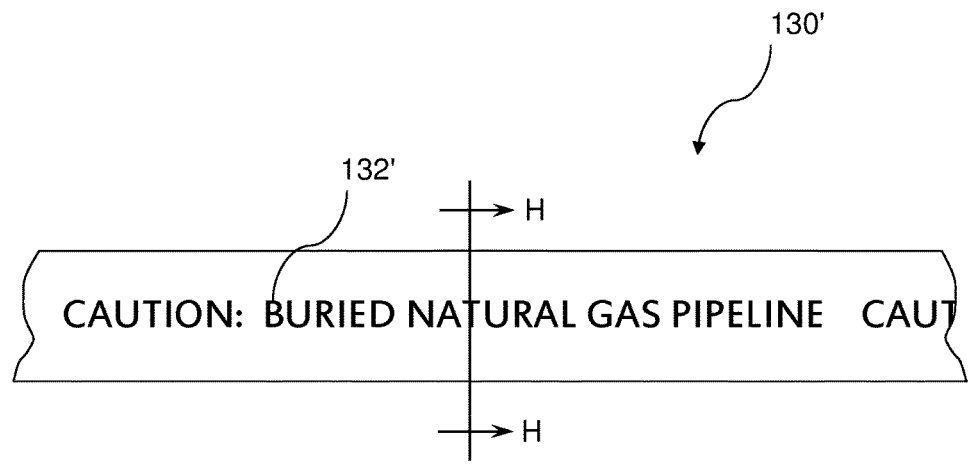
FIG. 42 shows a plan view of the Signal Tape of the invention using RFID technology.
Figure 43:
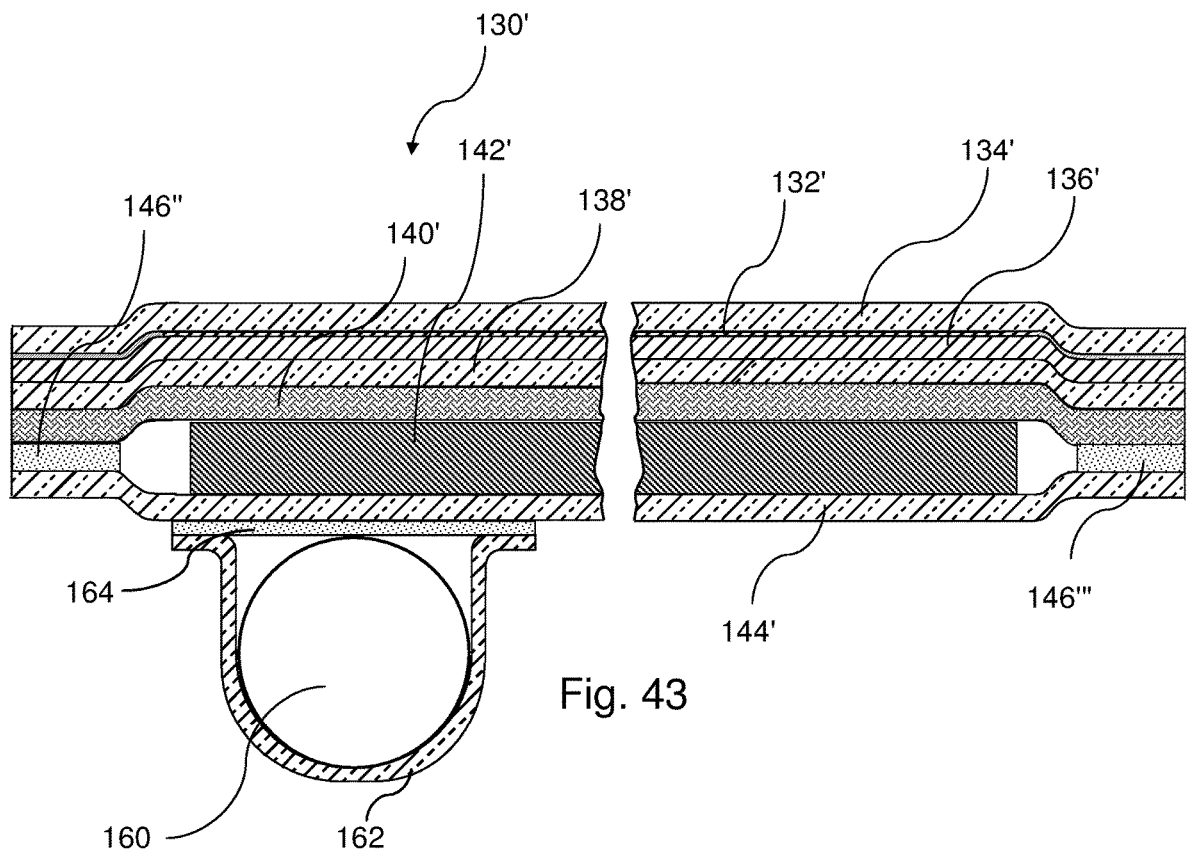
FIG. 43 shows a cross-section of FIG. 42.

FIG. 42 shows a second embodiment 130' of the signal tape of the invention incorporating known R1-.11) technology as the primary location means for locating the Signal Tape when it is buried underground. Warning indicia 132' can be incorporated into signal tape 130'. FIG. 43 shows a cross-sectional view of signal tape 130' along section H-H of FIG. 42. Tape 130' comprises a clear not halted immediately. One way to increase the effectiveness of this warning is to color the pull tape with brightly colored indicia and to provide written indicia thereon which instructs the excavation crew to cease excavation immediately.

The primary location means for Signal Tape 130' when it is installed underground is conventional RFID technology, as noted above. To this end an RFID tag 160 is emplaced on or in Signal Tape 130' about every 8 feet [approximately 2.44 m] along the length of Signal Tape 130'. In FIG. 43, a conventional RFID tag 160 [such as those described supra is attached to the outside surface of clear polyester bottom layer 144' using a conventional blister package 162 using adhesive 164 in a known manner. It is noted that adhesive 164 runs from one edge of blister package 162 to the other and also directly adheres RFID tag 160 to layer 144' as shown in FIG. 43. Blister package 162 completely seals tag 160 to the bottom of Signal Tape 130' and is made from polyester or the like in a known manner. The presence of RFID tag 160 in the Signal Tape permits the buried Signal Tape to be located from the surface by known RFID electronic detecting instruments.

Figure 44:
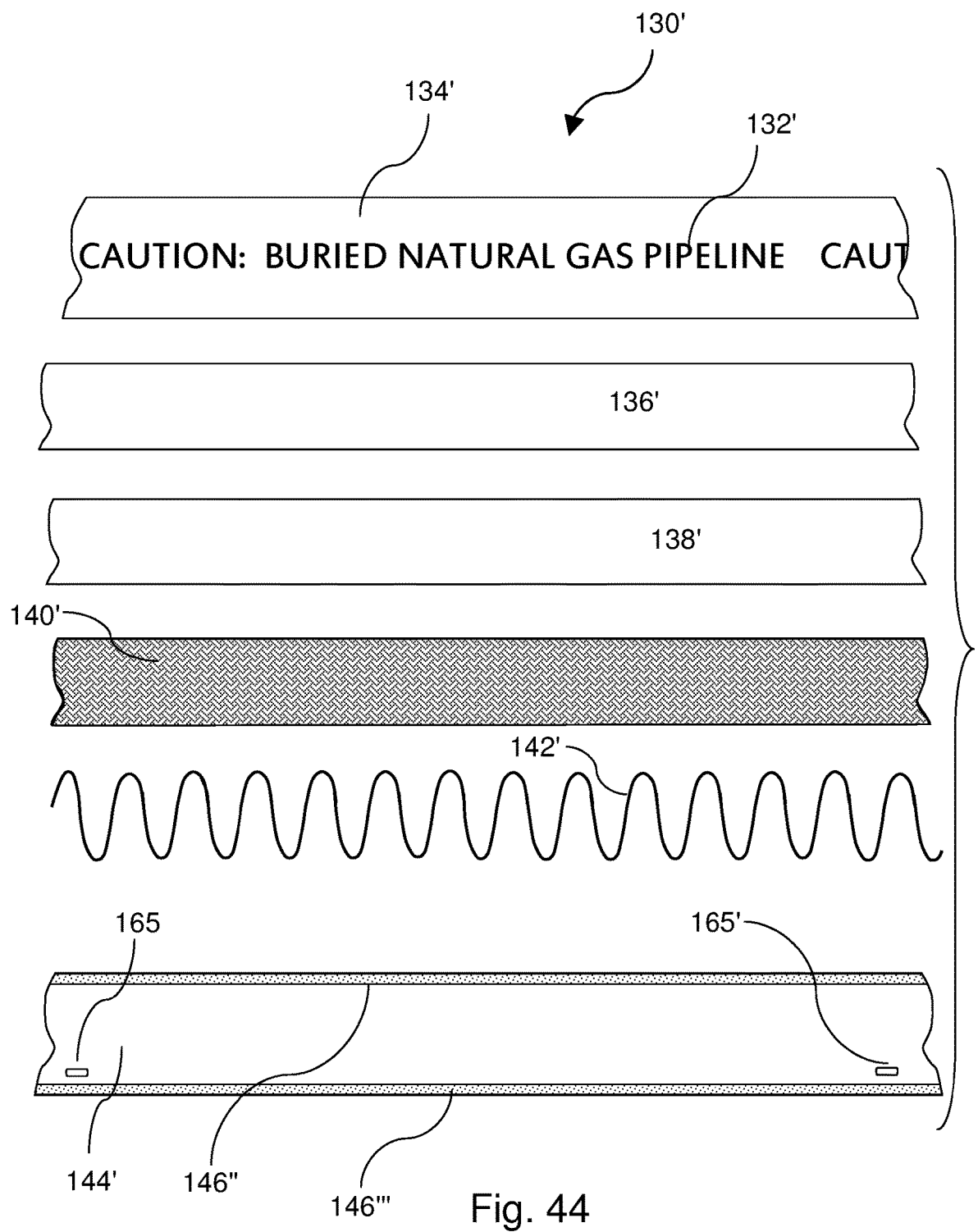
FIG. 44 shows an exploded view of a second embodiment of the Signal Tape of FIG. 42.

FIG. 44 shows another embodiment of the Signal Tape utilizing RFID technology. In this embodiment, RFID tags 165 and 165' are positioned inside Signal Tape 130' at approximately 8 feet [approximately 2.44 m] intervals along the length of Signal Tape 130'. RFID tags 165 and 165' are shown attached to the inside surface of bottom layer 144' as shown in FIG. 44. The tags would be attached to layer 144' using adhesive [not shown in FIG. 44] in a conventional manner. The remaining portions of FIG. 44 are similar to those shown in FIG. 36 and use similar numbering.

Figure 45:
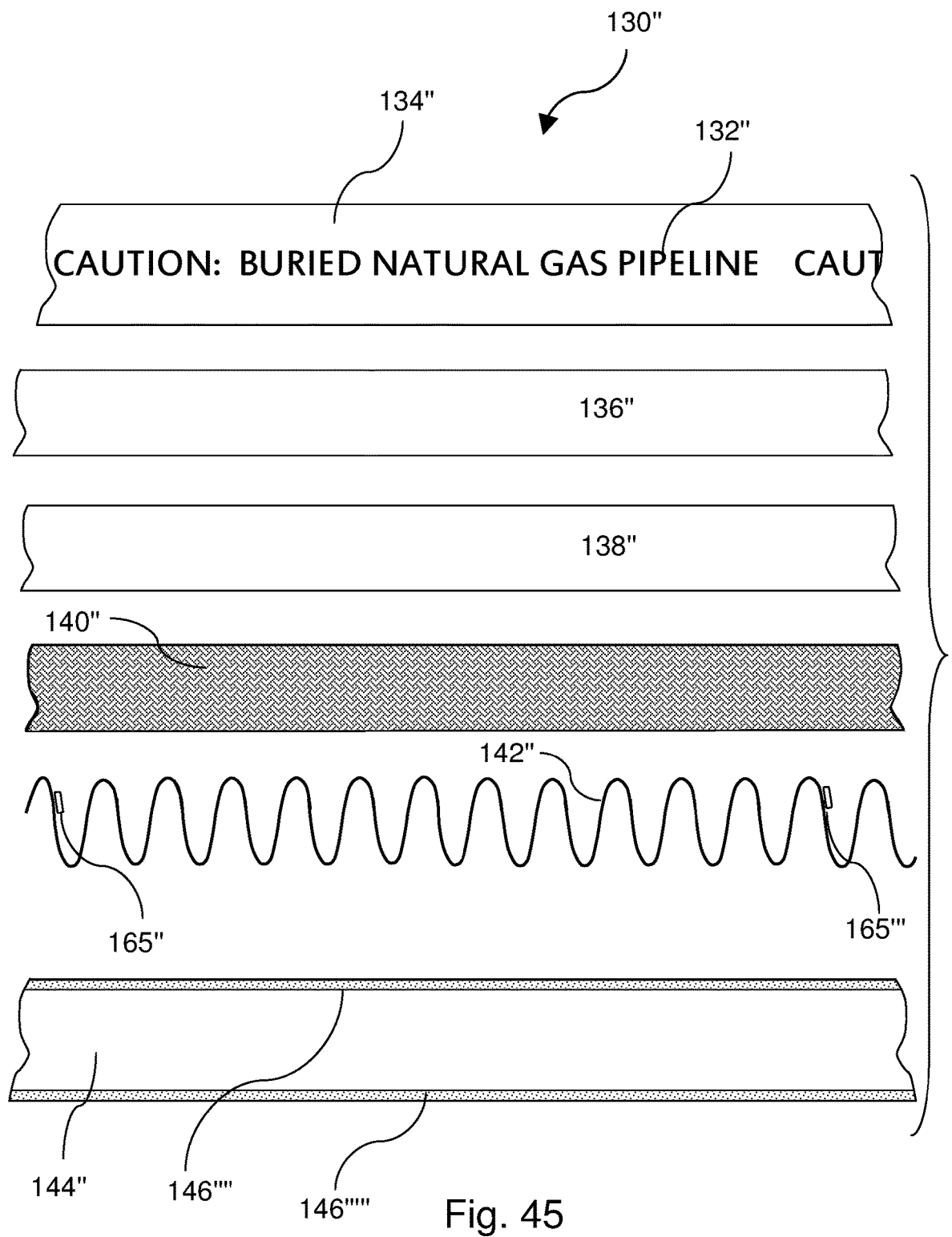
FIG. 45 shows an exploded view of a third embodiment of the Signal Tape of FIG. 42.

FIG. 45 shows yet another embodiment of the Signal Tape utilizing RFID technology. In this embodiment, RFID tags 165" and 165'" are positioned inside Signal Tape 130" at approximately 8 feet [approximately 2.44 m] intervals along the length of Signal Tape 130". RFID tags 165" and 165'" are shown attached to a surface of core material 142". The tags would be attached to core material 142" using adhesive [not shown in FIG. 45] in a conventional manner. The remaining portions of FIG. 45 are similar to those shown in FIG. 44 and use similar numbering.

Figure 46:
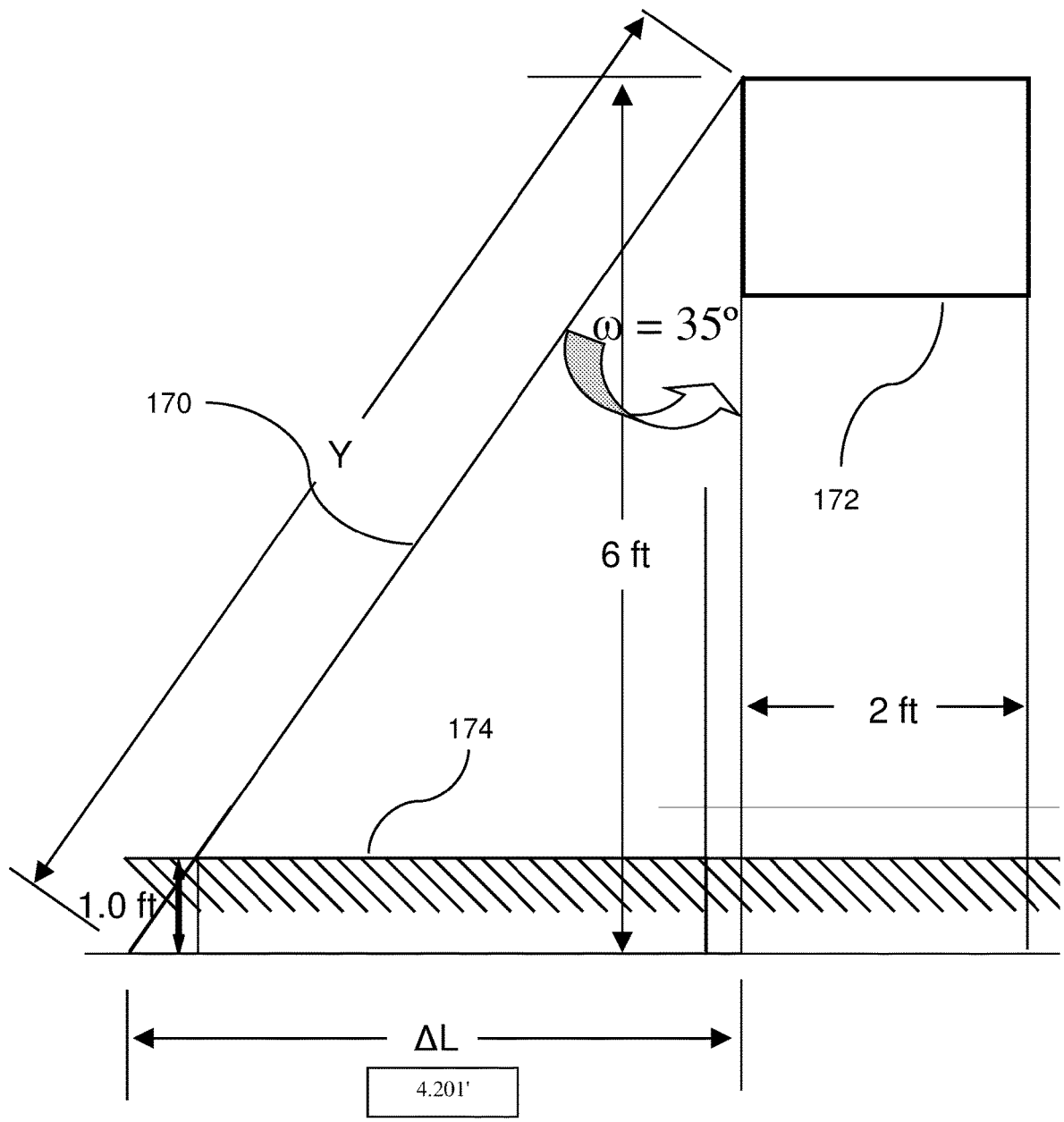
FIG. 46 shows a diagram illustrating the core material angle as the Signal Tape is pulled from the ground.

FIG. 46 illustrates the angle co which the Signal Tape 170 makes when it has been pulled out of the ground by backhoe bucket 172 with the backhoe bucket being approximately 5 feet [or approximately 1.5 m] above the soil surface 174. The angle the core material makes with the top of the backhoe bucket is approximately 35°—or the angle which the core material exits from the ground surface is approximately 55°. In field tests it is quite common for the backhoe bucket to be able to pull an <u>unbroken</u> strip [emphasis added] of the core material of the Signal Tape up to a height of about 10 feet [or approximately 3 m] above the ground surface and to have significant portions of the outer protective layers, which will be broken and in sections, still attached to the core material. This means that the core material and the attached portions of the outer protective layers are clearly visible to the operator of the backhoe and will serve to warn him of a potential problem. In addition, it has been found in field testing that there is a <u>significant</u> drag [emphasis added] on the backhoe from the resistance of the core material coming out of the ground. Enough so that experienced backhoe operators have been known to be visibly [and verbally] surprised by the amount of resistance.

FIG. 46 also gives an indication of how much soil is moved by the Signal Tape as it is pulled from the ground. Using the geometry of FIG. 46 it has been calculated that the total weight of the disturbed soil when the backhoe bucket is at a height of 5 feet [approximately 1.5 m] above the surface of the soil with a 1 foot [approximately 0.3 m] burial distance for the Signal Tape is approximately 81 pounds [approximately 36 kg]. This weight of soil is simply not enough to cause the resistance observed when the Signal Tape is unearthed with a backhoe, accordingly, there must be sliding and extension of the core material from the Signal Tape that is still buried in the ground. It has also been observed that there is a significant and loud "cracking" noise when the Signal Tape is unearthed. As shown in FIG. 35, in the preferred embodiment of the Signal Tape, the core material 142 is adhered on at least one edge surface to the bottom layer 144 of the Signal Tape protective materials. This is done by applying adhesive [not shown in FIG. 35] to the entire inside surface of protective layer 144. It is thought that the observed "cracking" noise is due to the core material 142 being ripped loose from protective layer 144 in portions of the Signal Tape that are still underground.

Figure 47:
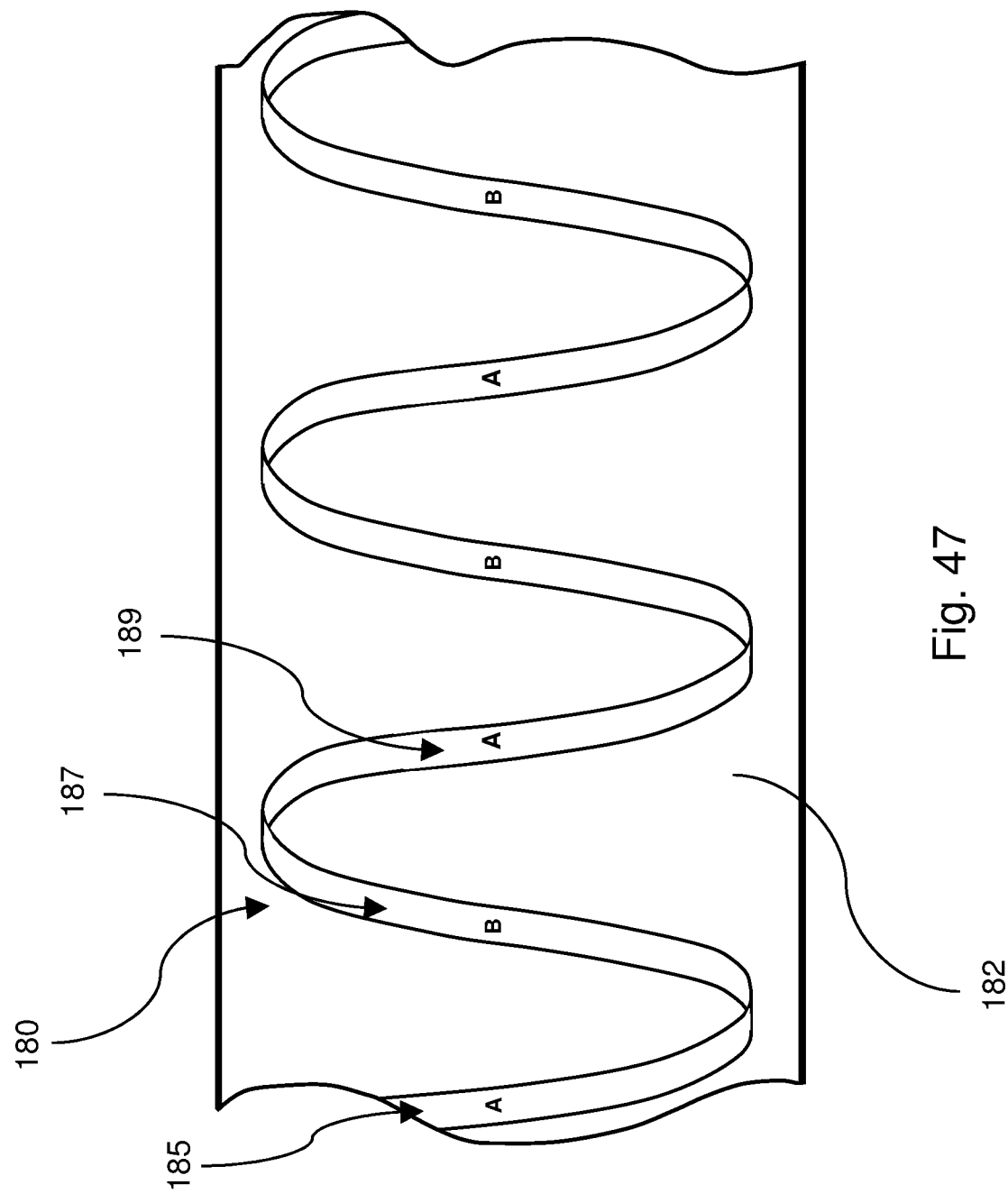
FIG. 47 illustrates how the core material folds over in the assembled Signal Tape when the core material is inserted into the Signal Tape in a sinusoidal pattern.

In practice, it has been found that in the assembly of the Signal Tape, core material 180 is actually adhered to protective layer 182 on much more than just an edge of the core material. FIG. 47 illustrates how the core material 180 folds as it is assembled into the Signal Tape. Bottom clear polyester layer 182 is shown with core material 180 on the top surface of bottom layer 182. As noted above, adhesive [not shown in FIG. 47] would have been applied to the entire top surface of bottom layer 182 during the assembly of the Signal Tape. Core material 180 is fed into the assembly in a sinusoidal-like pattern as shown in FIG. 47 and then the entire assembly is run through nip rollers to press the components together. In this process, core material 180 is flattened against the top surface of bottom layer 182. As close examination of FIG. 47 will show that at the left hand portion 185 of the figure top surface A of core material 180 is facing upwards. Yet in the portion 187 of core material 180 immediately to the right of this first portion 185 the obverse surface B is facing upwards. In like manner, in portion 189 immediately to the right of portion 187, surface A is facing upwards and etc., etc. This means that a significant portion of the surface of core material 180 is adhered to protective layer 182. It is thought that it is the breakage of these adhesive bonds during removal from the soil which causes the observed loud "cracking" noises.

Figure 48:
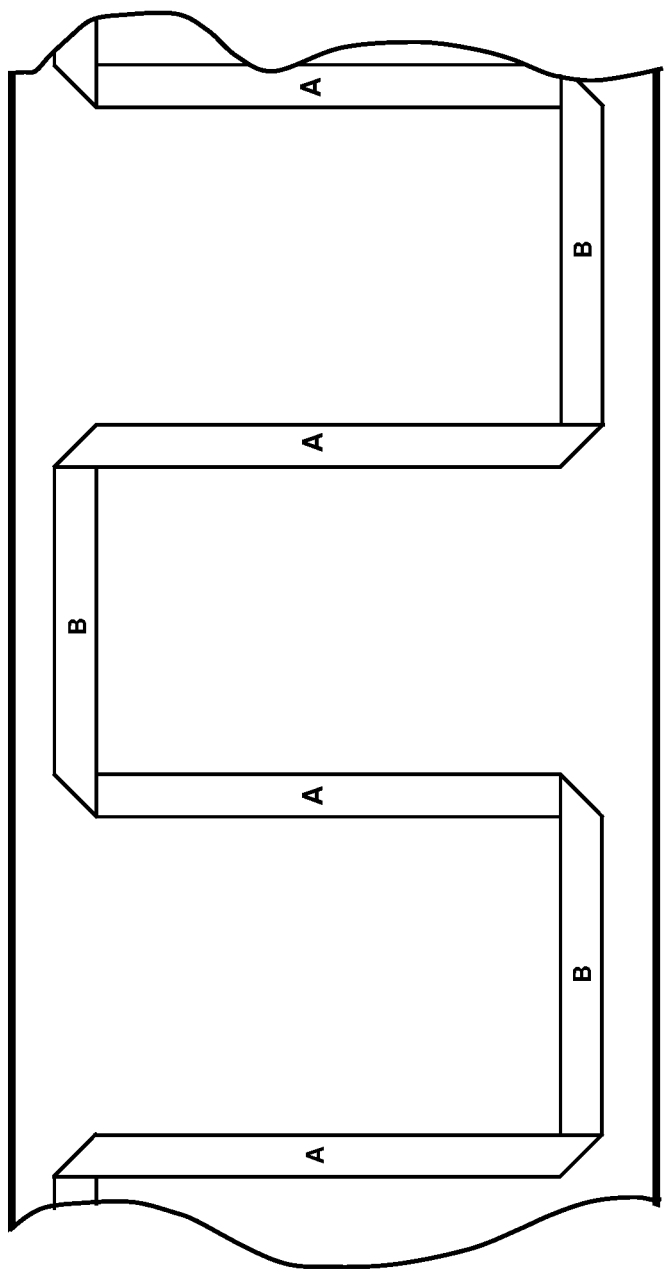
FIG. 48 illustrates how the core material folds over in the assembled Signal Tape when the core material is inserted into the Signal Tape in a square wave pattern.
Figure 49:
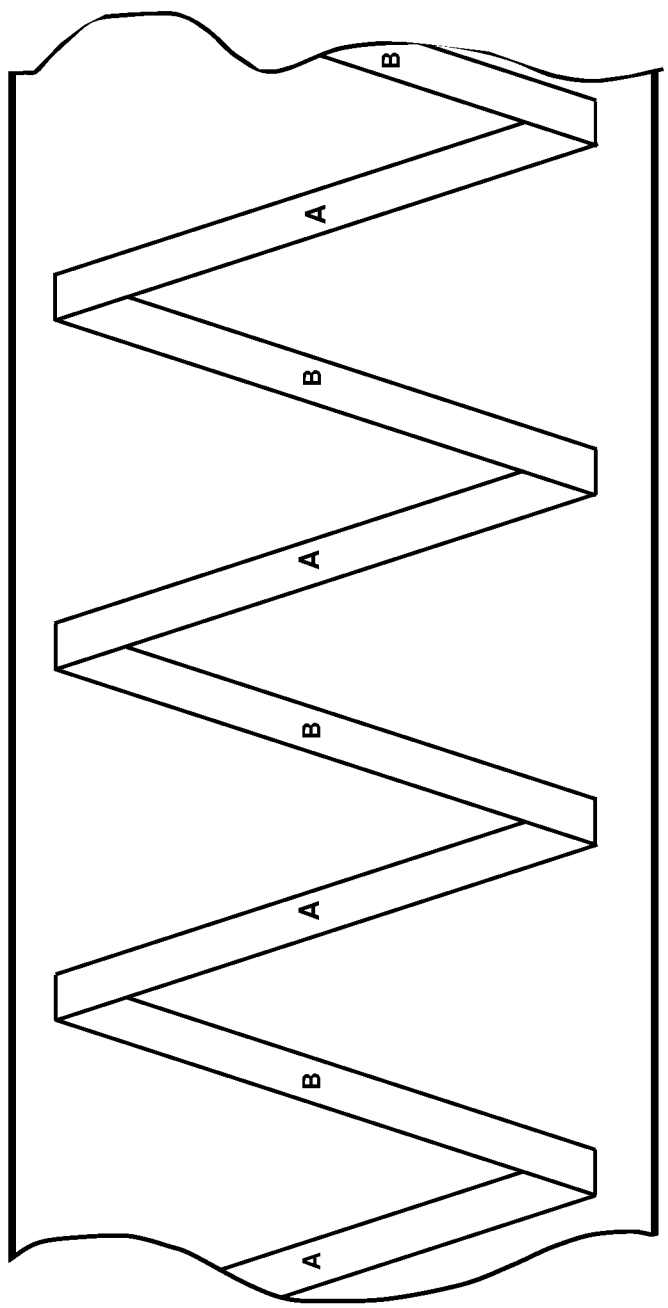
FIG. 49 illustrates how the core material folds over in the assembled Signal Tape when the core material is inserted into the Signal Tape in a triangular wave pattern.
Figure 50:
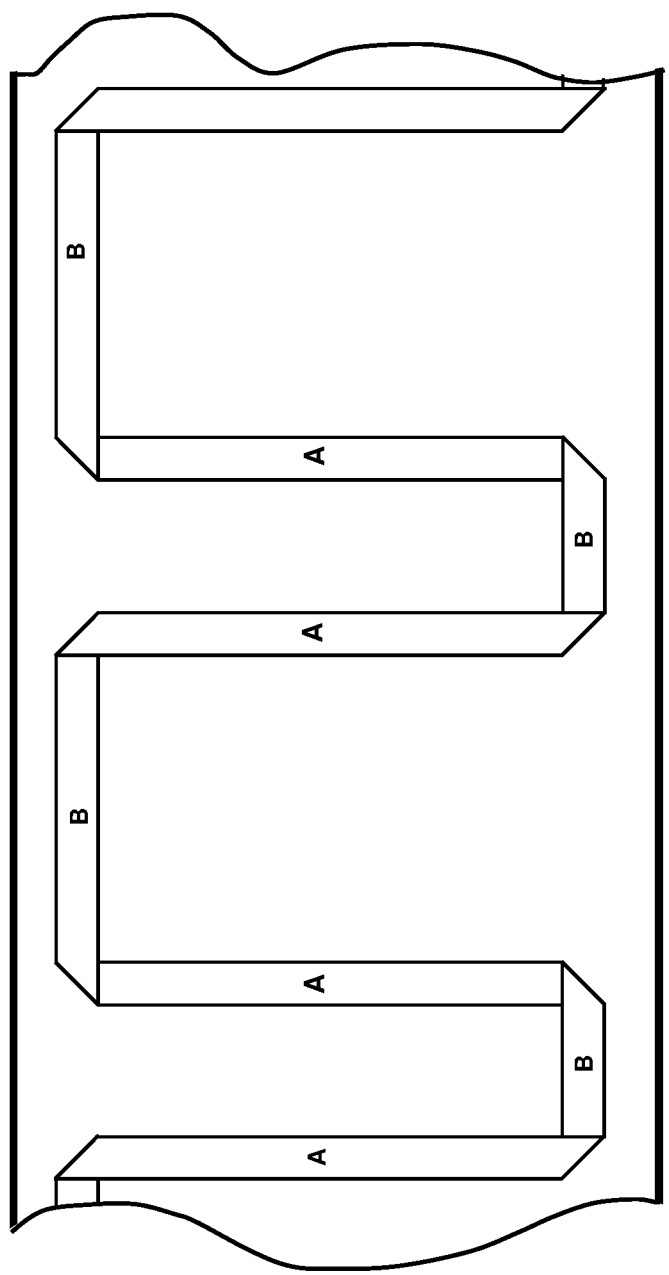
FIG. 50 illustrates how the core material folds over in the assembled Signal Tape when the core material is inserted into the Signal Tape in a non-uniform rectangular wave pattern.

FIG. 47 illustrates the core material being assembled into the Signal Tape using a sinusoidal-like pattern to accommodate the desired extra core material. FIGS. 48-50 illustrate other patterns that could be used. For example, FIG. 48 illustrates a rectangular pattern. FIG. 49 illustrates a triangular pattern and FIG. 50 illustrates an irregular rectangular pattern. In each pattern, it can be seen that substantial portions of the surface of the core material are adhered to the bottom protective layer.

As described supra Litz wire is known and used for many purposes. To the applicants knowledge, no one has heretofore used Litz Wire as tracer wire. Applicants have discovered a new use for Litz wire, namely that Litz wire can be used as tracer wire for locating and mapping underground utilities which comprise non-metallic material. As noted supra it has become common practice to use non-metallic or polymer materials for underground utilities. For example, gas, water and sewer lines are increasingly being made of polymers. These non-metallic underground utilities can be laid using conventional trenching methods but many are currently being laid using horizontal boring. In a horizontal boring operation a boring bit is pushed into the ground at a starting location and then pushed through the ground to a target location—thus defining a borehole—where it is brought to the surface or into a target pit dug in a target area. The underground utility is attached to the boring bit and the bit is withdrawn back through the borehole—thus installing the underground utility. Tracer wire is often attached to the utility line and pulled back with the utility line so that the non-metallic utility can be located and mapped at a later time. Because of the low strength of conventional tracer wires, it is not unusual for contractors to tie several lengths of tracer wire to the boring bit in the hope that at least one of the tracer wires will survive the pullback operation unbroken.

Figure 51:
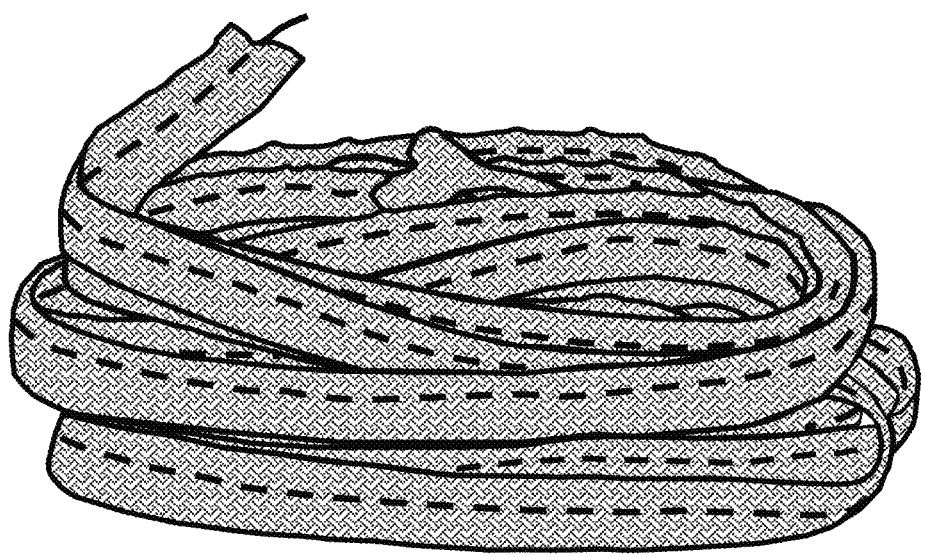
FIG. 51 shows an example of conventional tracer wire incorporated within the body of a conventional pull tape.

Applicants have discovered that it is possible to incorporate tracer wire into a woven fabric pull tape and use this structure a emplace tracer wire with an underground utility as it is being laid in a horizontal drilling pullback operation. It is known to incorporate plain wire such as copper wire into a polyester pull tape as shown in FIG. 51. What is not known as far as applicants' can determine is to use this structure as marker wire and to tie such a structure to a drill head for emplacement along with a utility in a horizontal drilling pullback operation. Applicants call tracer wire embedded within a woven fabric tape, "Tough Trace." It is essentially conventional tracer wire embedded within a woven fabric tape. The woven fabric may be polyester or an aramid fiber or any other suitable woven fabric tape which has high strength, good resistance to soil chemicals and reasonable cost.

Applicants have also discovered that it is possible to use Litz wire as shown in FIGS. 28-31 as tracer wire by attaching the Litz wire directly to the boring head and laying it with the underground utility in a pullback operation. In this circumstance, strength would be a pre-requisite so it is likely that a very strong type of Litz wire would need to be used.

It is also possible to incorporate Litz wire of the types shown in FIGS. 28-31 within a woven tape similar to the type of tape used in the electrical industry to pull electrical wires through conduits. This type of pull tape is shown in FIG. 51. A standard polyester pull tape might be W/P 1250 Lb Polyester Pull Tape [available in large quantities from The Ribbon Factory at 600 North Brown Street, Titusville, PA, 16354]. This pull tape is approximately ½ inch [1.27 cm] wide, approximately ¹⁄₁₆ inch [approximately 0.16 cm] thick and has a tensile strength of 1250 pounds$_f$ [or approximately 5560 N]. Pull tape is available from other sources with different dimensions and widths and in different strengths, for example, up to 2500 pounds$_f$ [approximately 11,000 N] tensile strength. Pull tape made from aramid fibers is also available. It is possible to obtain an aramid fiber pull tape with a 3000 pounds$_f$ tensile strength [or approximately 13,3430 N]. This tape is approximately ⅝ inch [approximately 1.59 cm] wide and approximately ¹⁄₁₆ inch [approximately 0.16 cm] thick. It is also possible to obtain polyester pull tape with copper tracer wire incorporated therein. This is illustrated in FIG. 51. Applicants have found that it is possible to incorporate Litz wire within standard polyester or aramid fiber pull tape and use the Litz wire as conventional tracer wire within the known pull tapes. Pull tape with Litz wire incorporated therein is called "Litz Pull Tape" by applicants. For example, a Litz Pull Tape could be buried a few inches above, below, or to one side of a non-metallic underground utility when said utility is laid using a conventional trenching operation. A Litz pull tape could also be laid in a horizontal boring operation by tying the Litz pull tape to the boring head and being pulled back along with the underground utility. This type of installation has the expected advantage of being locatable from the surface using conventional locating and mapping techniques as discussed supra it also has the advantage of having the woven tape act in a manner similar to the inventive Signal Tape discussed supra. That is, when a Litz pull tape constructed of strong polyester or aramid tape is struck by an excavator bucket it will be pulled to the surface in the same manner as the inventive Signal Tape, thus providing a warning to the excavation crew of a buried underground utility which they may damage if excavation is not halted immediately. One way to increase the effectiveness of this warning is to color the pull tape with brightly colored indicia and to provide written indicia thereon which instructs the excavation crew to cease excavation immediately.

Figure 52:
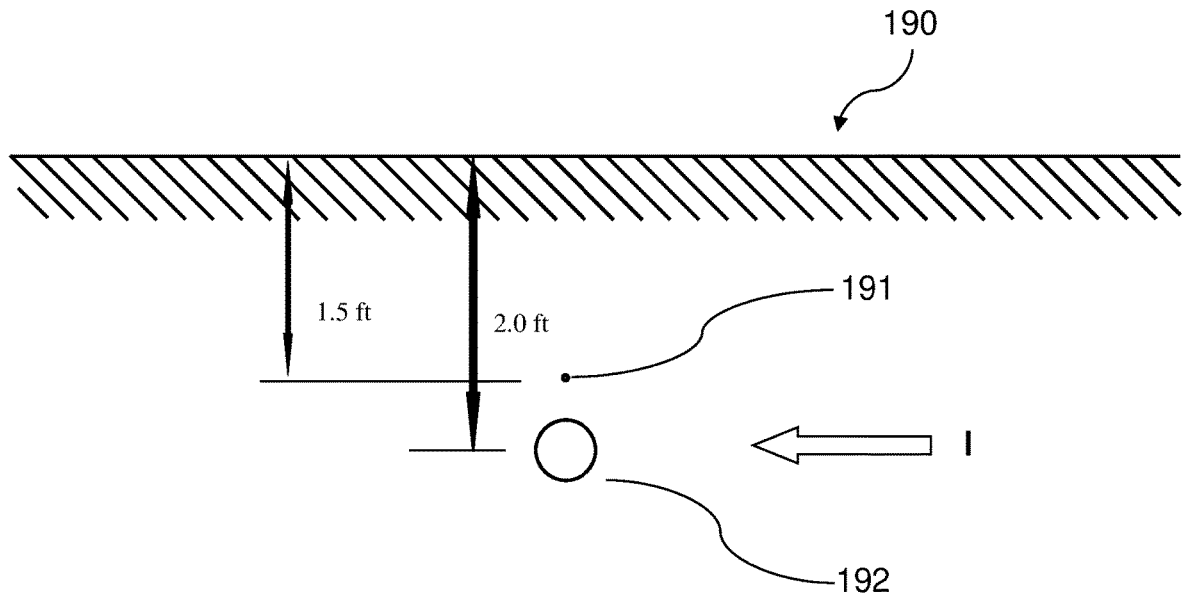
FIG. 52 shows a cross-sectional view of an underground utility being "protected" by conventional marker wire.
Figure 53:
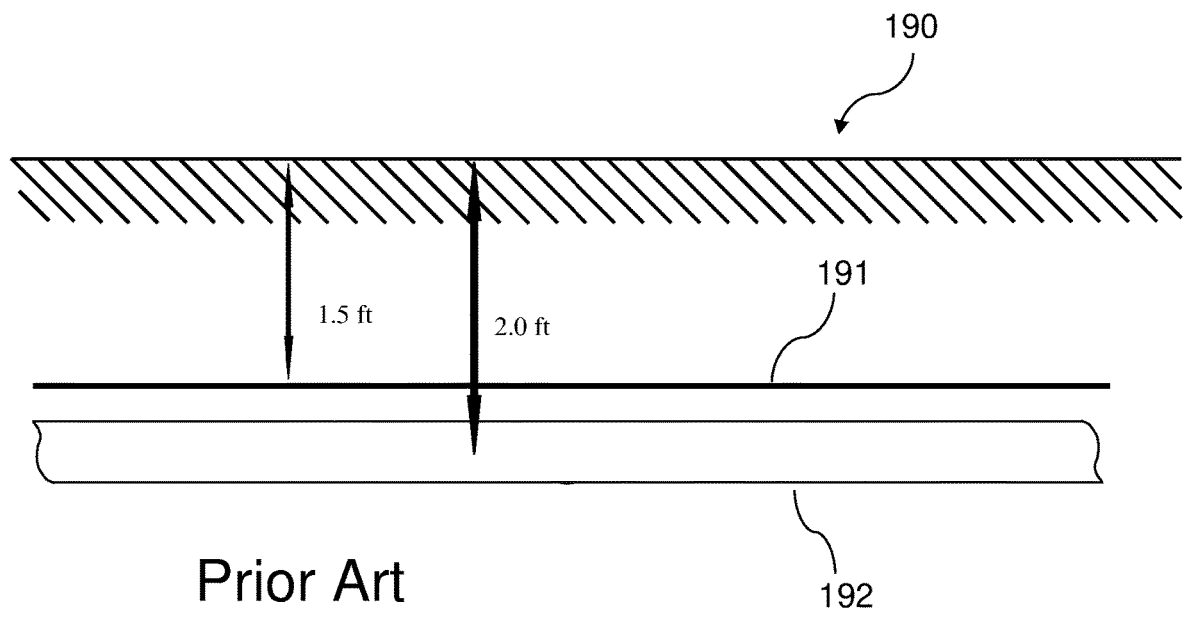
FIG. 53 shows a side view of an underground utlility being "protected" by conventional marker wire from the direction of arrow I of FIG. 52.
Figure 54:
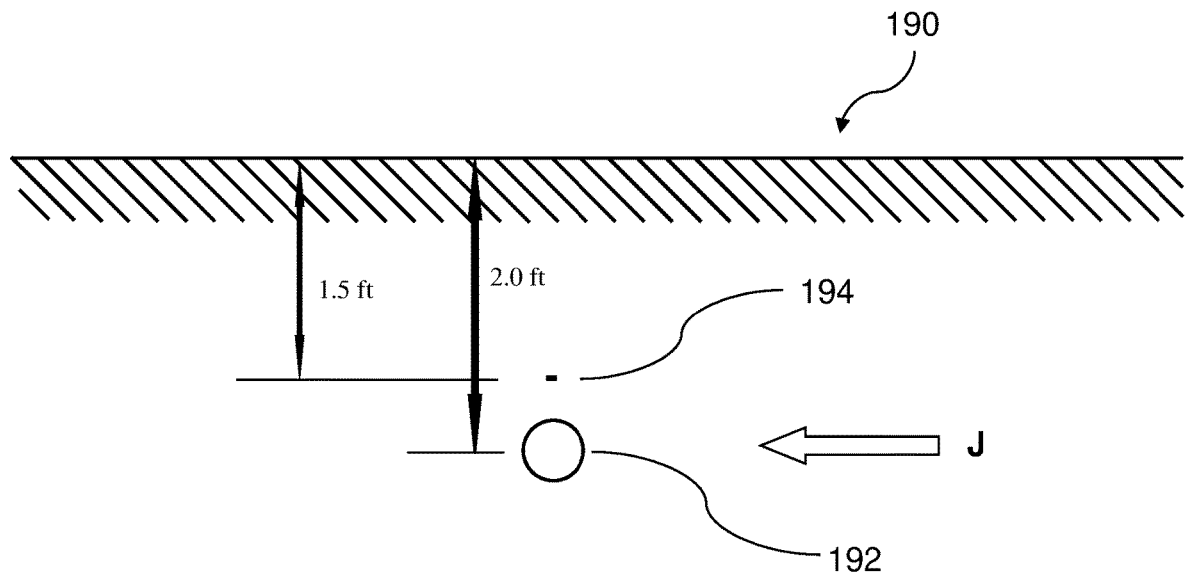
FIG. 54 shows a cross-sectional view of an underground utility being protected by Litz wire being used as marker wire.
Figure 55:
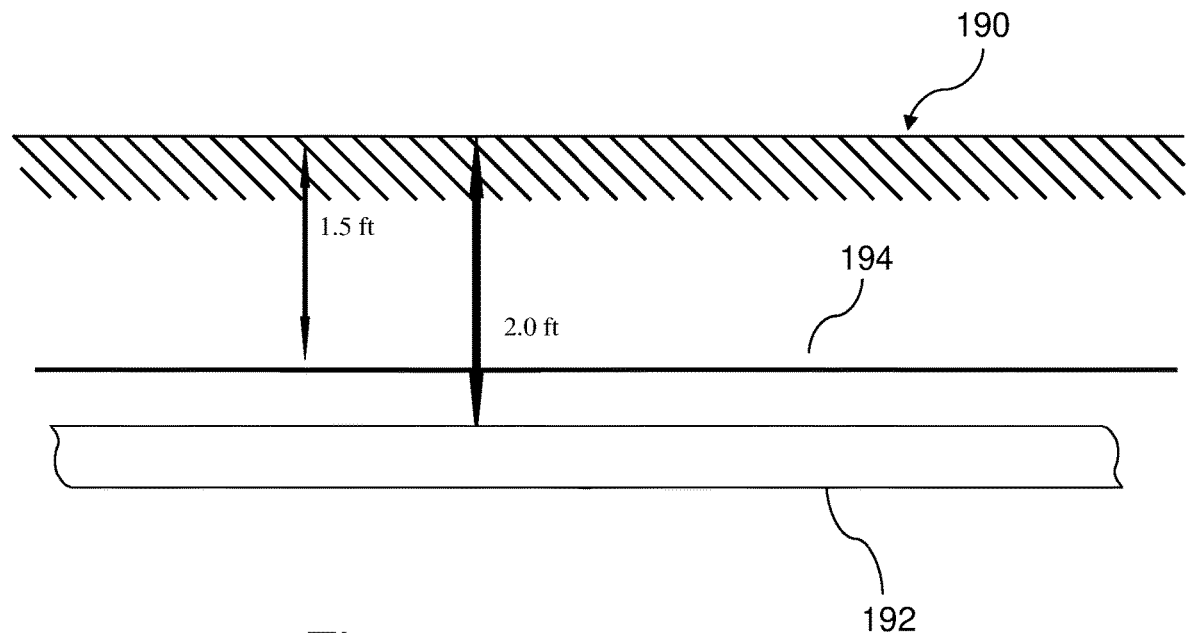
FIG. 55 shows a side view of an underground utility being protected by Litz wire being used as marker wire from the direction of arrow J of FIG. 54.

It is also possible to incorporate Litz wire into conventional marker tape to provide a location and mapping capability with marker tape. FIG. 52 shows a cross-sectional view of a conventional marker wire installation over a buried infrastructure, in this case a pipeline. A buried infrastructure which in this case is pipeline 192 is buried approximately 2 feet [approximately 61 cm] below soil surface 190. Conventional marker wire 191 is buried a few inches [in this case 6 inches—approximately 13.2 cm] above pipeline 192. FIG. 53 is a side view of this arrangement. FIG. 54 illustrates the use of Litz wire as a marker tape to protect pipeline 192. In this figure, Litz wire 194 is buried a few inches [in this case 6 inches—approximately 13.2 cm] above pipeline 192. FIG. 55 shows a side view of this arrangement. It is noted that the Litz wire in FIGS. 54 and 55 may be a bare Litz wire which has been covered with some type of environmental protection or it may be a polyester or aramid fiber tape with the Litz wire incorporated therein. In both instances, adequate environmental protection would be necessary.

The applicants have discovered a new use for Litz wire, namely the use of Litz wire as tracer wire. Litz wire can be used in tracer wire situations with a woven fabric carrier tape or without such a carrier tape. When incorporated within a woven fabric carrier tape, the applicants call this product Litz Pull Tape. When used alone as marker wire, the applicants call this product Litz Marker Tape.

Figure 56:
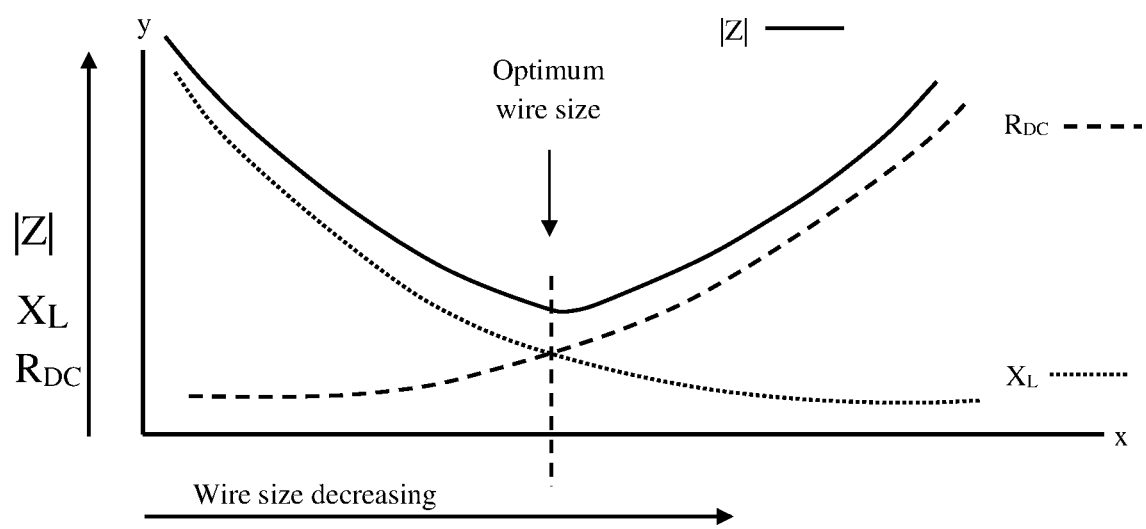
FIG. 56 illustrates the method of determining optimum wire size in a Litz wire bundle for use with Litz Pull Tape or Litz Marker Tape.

FIG. 56 shows the method of determining optimum wire size in a Litz wire bundle for use with Litz Pull Tape or Litz Marker Tape. The operating frequency of the system which will detect the Litz Pull Tape or Litz Marker Tape is presumed known. The total length of the Litz wire and the number of wires [or strands] in the Litz wire is also presumed known. Thus for a given operating frequency, with a given length of Litz wire and a given number of wires or strands in the bundle, the optimum wire [strand] size is that size which will produce the least value of impedance in the Litz wire. This would mean that any current induced in the Litz wire by a detecting system would be able to produce the maximum magnetic fields for detection. FIG. 56 plots |Z|, $X_L$ and $R_{DC}$ for a given length of Litz wire with a given number of wires [strands] in the Litz wire bundle and for a given operating frequency. |Z| is a function of the sum of capacitive reactance [$X_L$] and DC resistance [$R_{DC}$]. The x axis in FIG. 56 is the wire size of an individual wire in the Litz wire bundle and the size decreases to the right. The y axis is |Z|, $X_L$ and $R_{DC}$ increasing upwardly. The absolute value of impedance |Z| is determined by the following equation.

$$|Z|=X_L+R_{DC} \quad [1]$$

In equation [1] $X_L$ is equal to the Inductive reactance which is governed by equation [2].

$$X_L=\omega L=2\pi fL \quad [2]$$

In equation [2] $\omega$ is the frequency or $2\pi f$ and L is the inductance of the wire in henries.

$$R_{DC} = \frac{\rho \times L_{length}}{\text{Area}_{of\ strand} \times \text{Number}_{of\ strands}} \quad [3]$$

In equation [3] $\rho$ is the DC resistance constant for the type of wire used in the bundle, L is the length of the wire and the remaining variable are self-explanatory. It can be seen that the plot of $X_L$ decreases with decreasing wire size and the plot of $R_{DC}$ increases with decreasing wire size. Where the two curves meet, you get the minimum value of |Z| and this is the optimum wire size. This is also shown by the plot of |Z| which is the sum of $X_L$ and $R_{DC}$. Where the plot of |Z| shows the minimum value is where the $X_L$ and $R_{DC}$ curves cross. Applicants have found that by using Litz wire as tracer wire instead solid copper or copper coated steel wire that there is a significant increase in the effective surface area of the Litz wire tracer wire. For example the use of Litz wire as tracer wire can increase the surface area of the wire by about a factor of 4. For example a Litz wire tracer wire that has an equivalent cross-section to a 16 gauge solid copper wire can have about 4 times the wire surface area that the solid wire has. Since induced current is a function of the wire surface area, this will dramatically increase the current induced in the Litz wire tracer wire by known locating and mapping devices. The increase in induced current will result in much greater induced magnetic signal strength when the Litz wire tracer wire is interrogated by conventional locating and mapping transmitters such as those discussed supra. This, in turn, will make the Litz wire tracer wire much easier to locate.

FIG. 54 shows a view of a non-metallic underground utility 192 [in this example, pipe] buried approximately 2 feet [approximately 61 cm] below ground surface 190. Since underground utility 192 is non-metallic, it is thus not detectable from surface 190 by known locating and mapping techniques. To remedy this, a tracer wire 194 is buried approximately 6 inches [approximately 15.2 cm] directly above non-metallic underground utility 192. This tracer wire 194 is Litz Pull Tape with Litz wire chosen from any of the types shown in FIGS. 28-31 or any other known type of Litz wire. The invention is the use of Litz wire as tracer wire in this type of application. FIG. 55 is a view of the installation of FIG. 54 taken along arrow J of FIG. 54. Litz Pull Tape 194 comprises, according to the invention, a known polyester pull tape incorporating any type of Litz wire such as those shown in FIGS. 28-31 or any other type of Litz wire. The advantage of Litz pull tape is that the non-metallic underground utility may be located and mapped using conventional surface techniques—such as those described above. However, the use of Litz pull tape also gives advance warning of the presence of the underground utility in a manner similar to marker tape because the polyester pull tape [or the aramid fiber pull tape [if desired] is strong enough to be pulled to the surface by excavation equipment—thus warning the excavation crew of the presence of the underground utility. To make it even more clear to the excavation crew that they are about to dig into an underground utility with possible disastrous results, the Litz pull tape can be color coded or have warning indicia emplaced on the exterior surface thereof in much the same fashion as is disclosed below for applicants marker tape.

Figure 1:
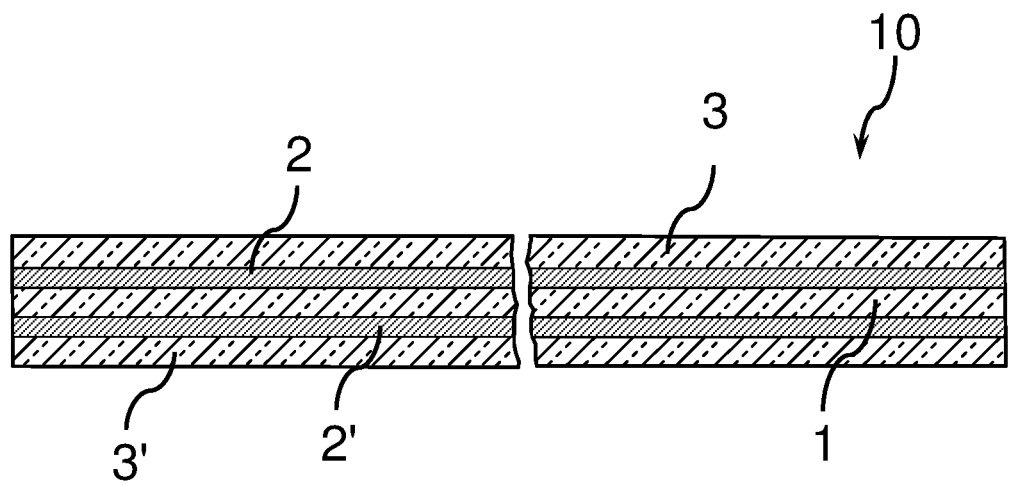
FIG. 1 shows a first embodiment of a prior art marker tape according to Allen, U.S. Pat. No. 3,633,533.
Figure 2:
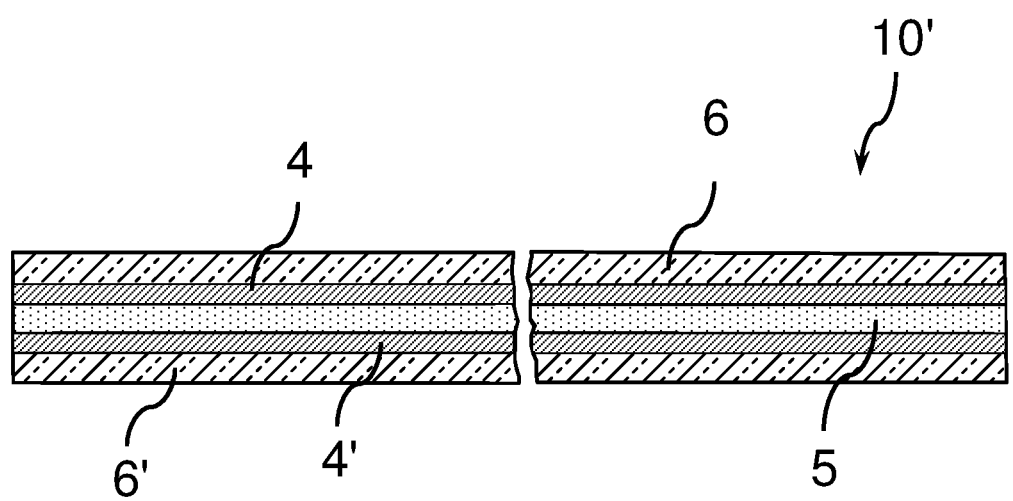
FIG. 2 shows a second embodiment of a prior art marker tape according to Allen, U.S. Pat. No. 3,633,533.
Figure 3:
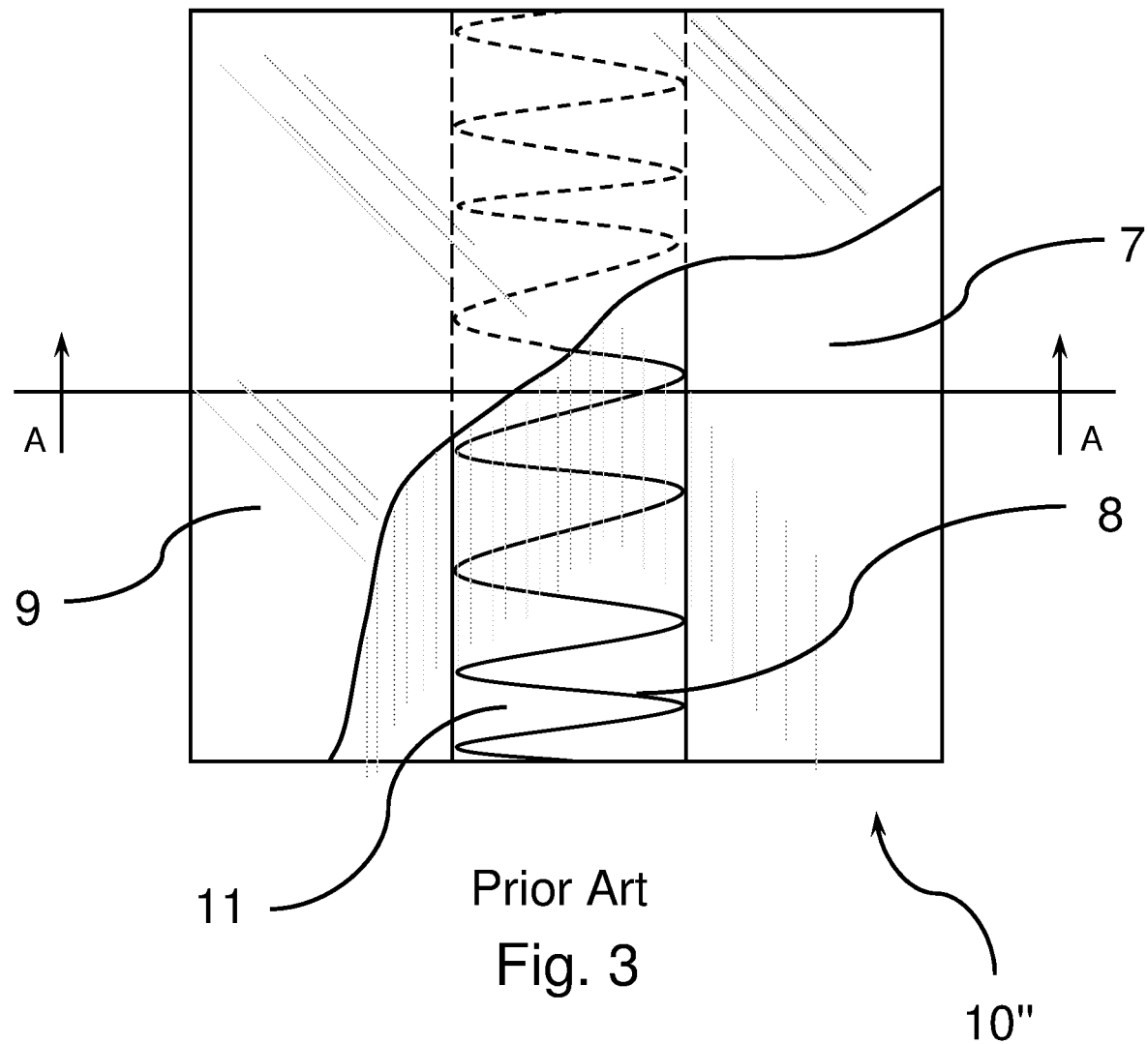
FIG. 3 shows a third embodiment of a prior art marker tape according to Allen, U.S. Pat. No. 3,633,533.
Figure 4:
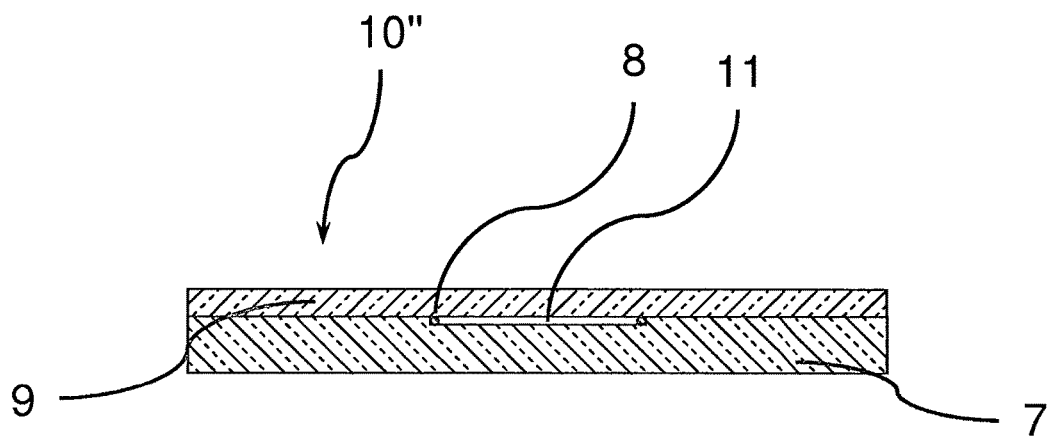
FIG. 4 shows a cross-section of FIG. 3 along section A-A of FIG. 3.
Figure 5:
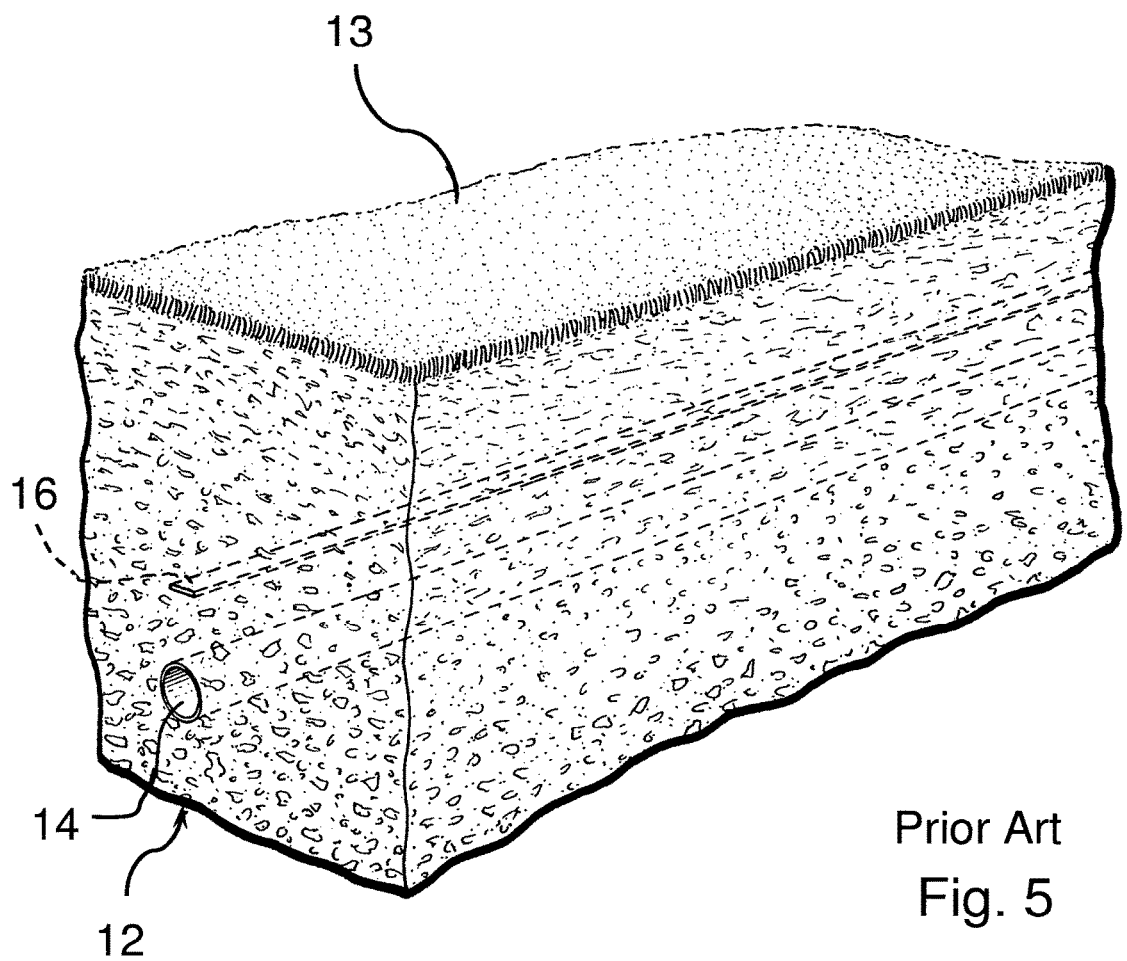
FIG. 5 shows the installation of a prior art marker tape according to Allen, U.S. Pat. No. 4,623,282.
Figure 6:
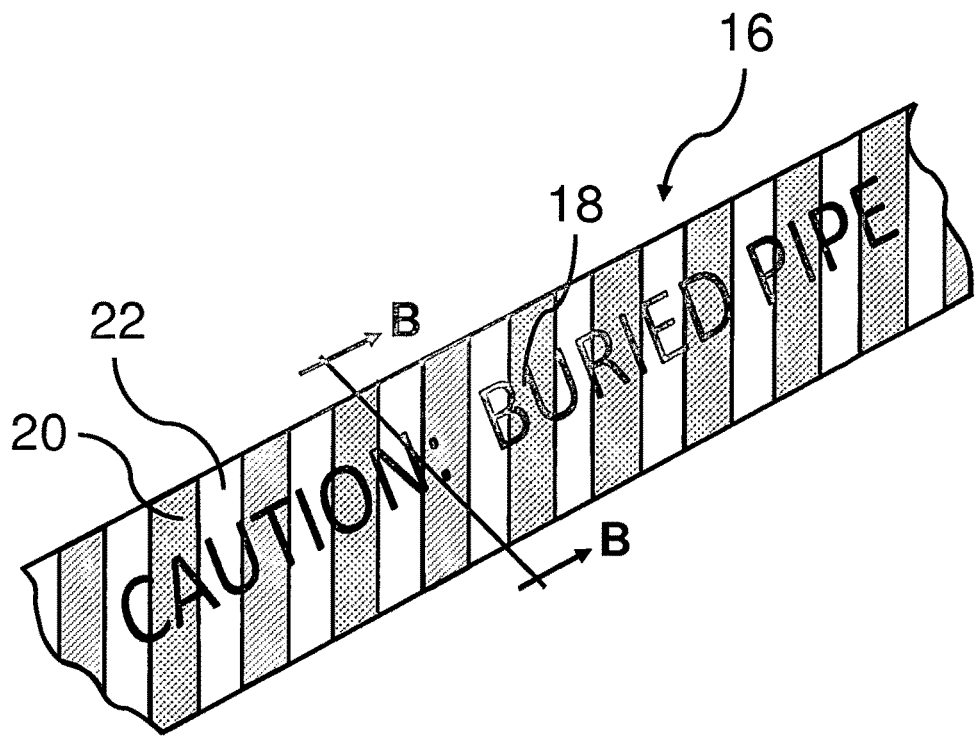
FIG. 6 shows a close up of the marker tape of Allen U.S. Pat. No. 4,623,282.
Figure 7:
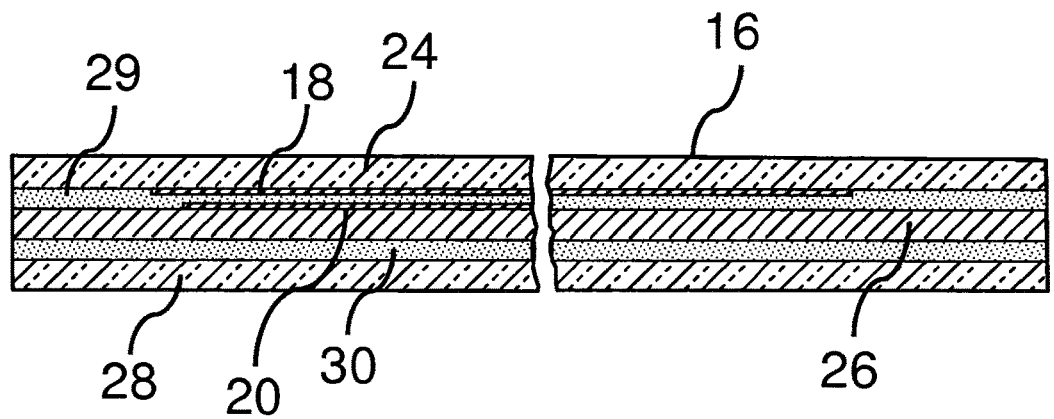
FIG. 7 shows a cross-section of FIG. 6 along section B-B of FIG. 6.
Figure 8:
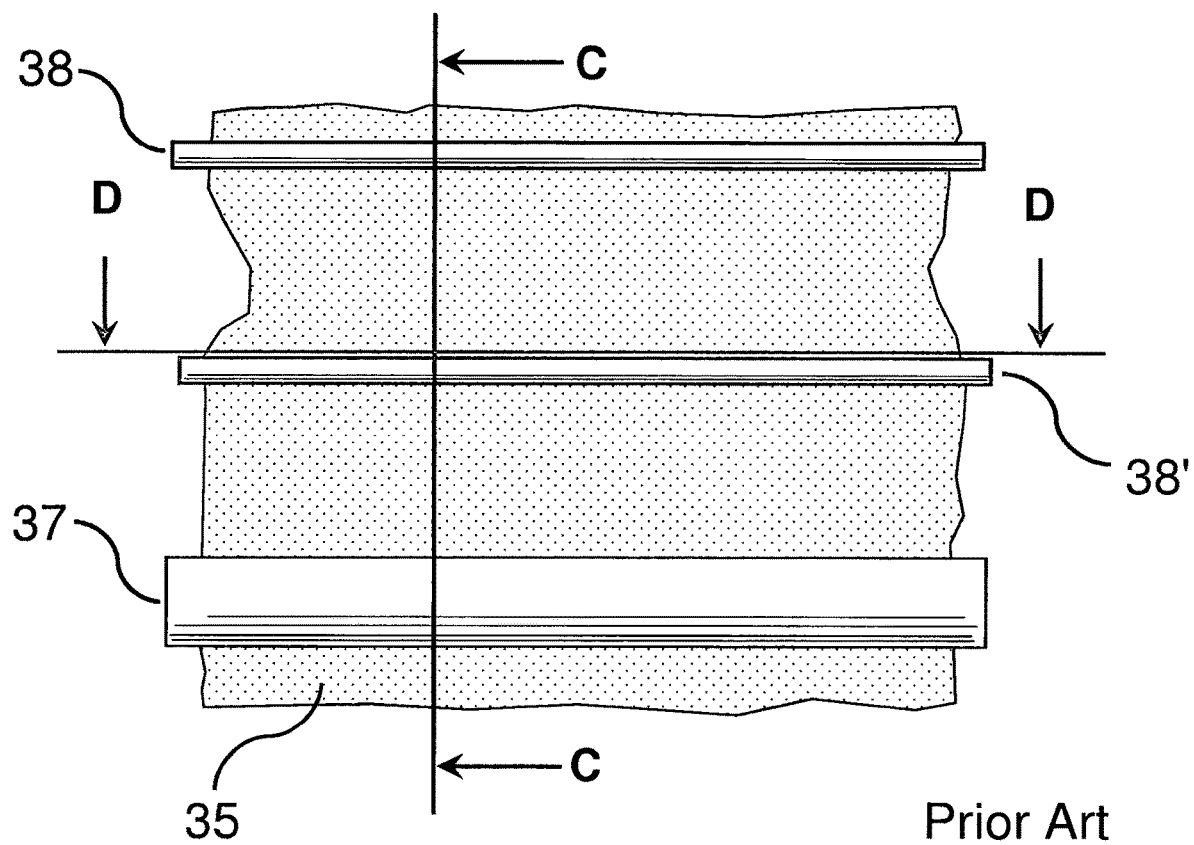
FIG. 8 shows the installation of a prior art marker tape according to Southworth, Jr., U.S. Pat. No. 3,568,626.
Figure 9:
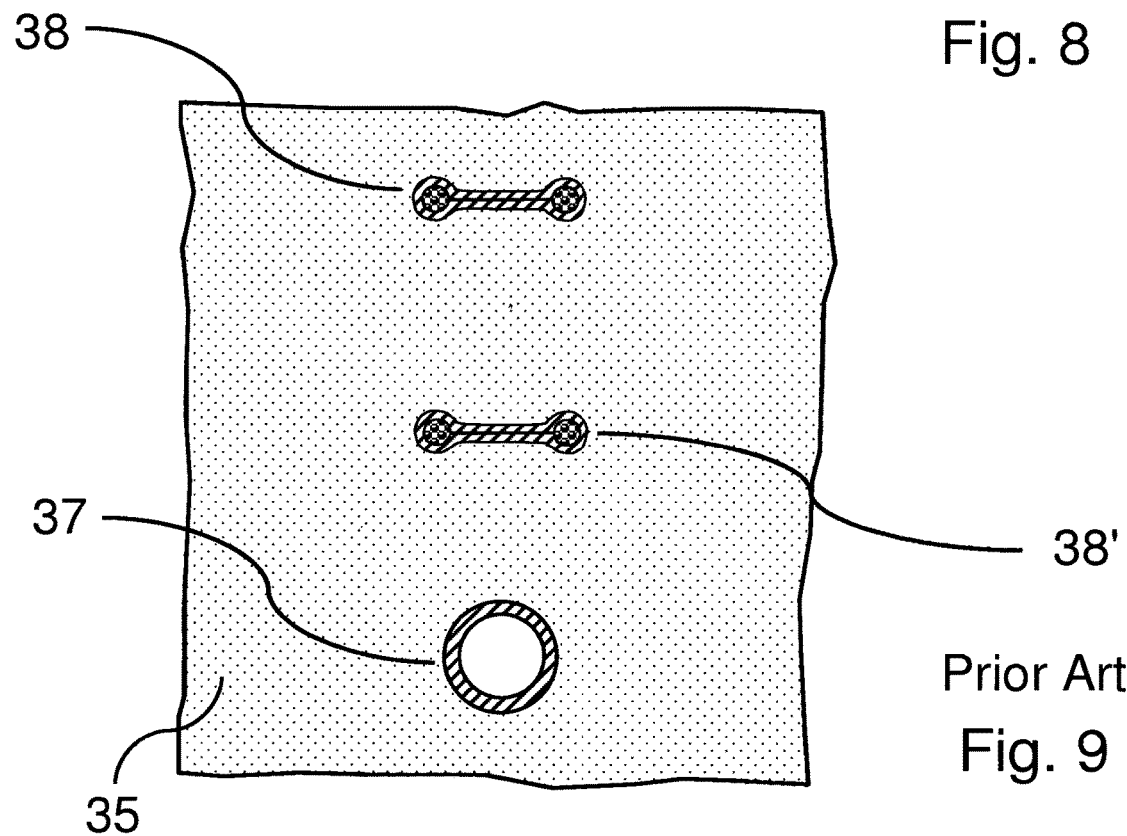
FIG. 9 shows a cross-section of FIG. 8 along section C-C of FIG. 8.
Figure 10:
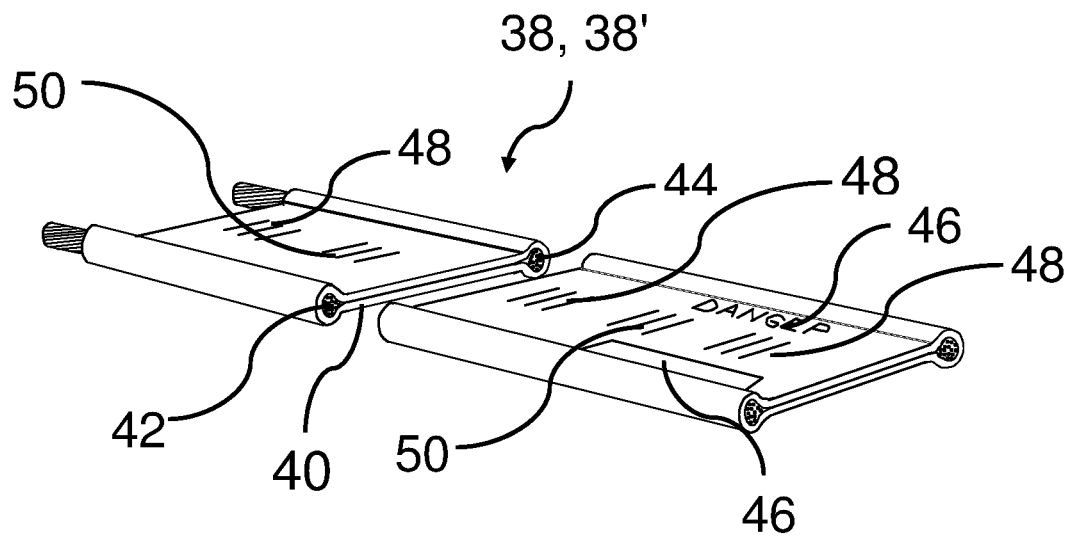
FIG. 10 shows a view of the Southworth, Jr. marker tape.
Figure 11:
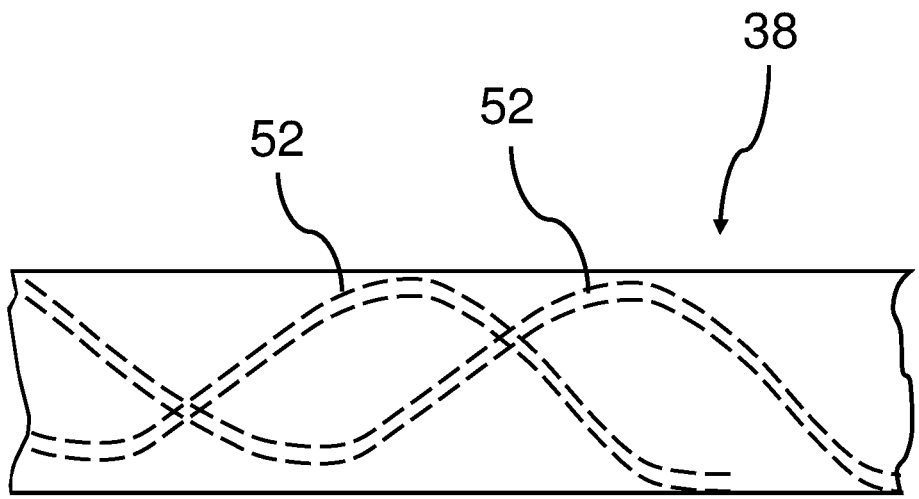
FIG. 11 shows an optional feature of the Southworth, Jr. marker tape.
Figure 12:
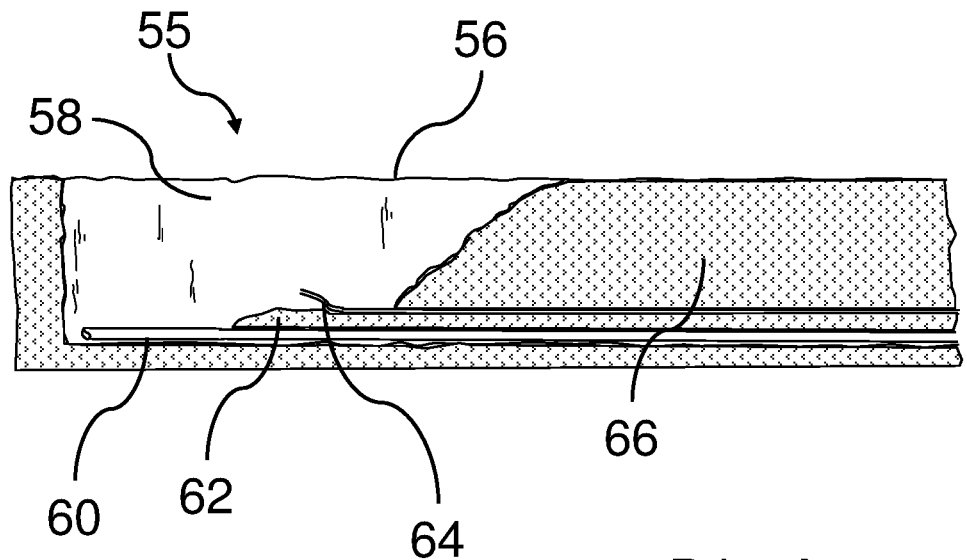
FIG. 12 shows the installation of a prior art marker tape according to Prosser, U.S. Pat. No. 3,282,057.
Figure 13:
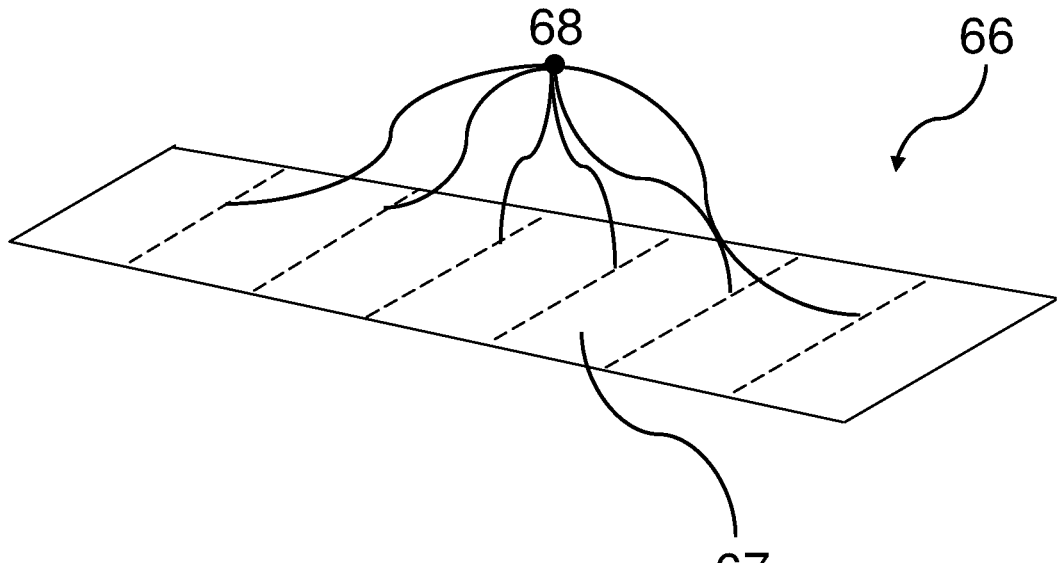
FIG. 13 shows a first embodiment of the Prosser, U.S. Pat. No. 3,282,057, marker tape.
Figure 14:
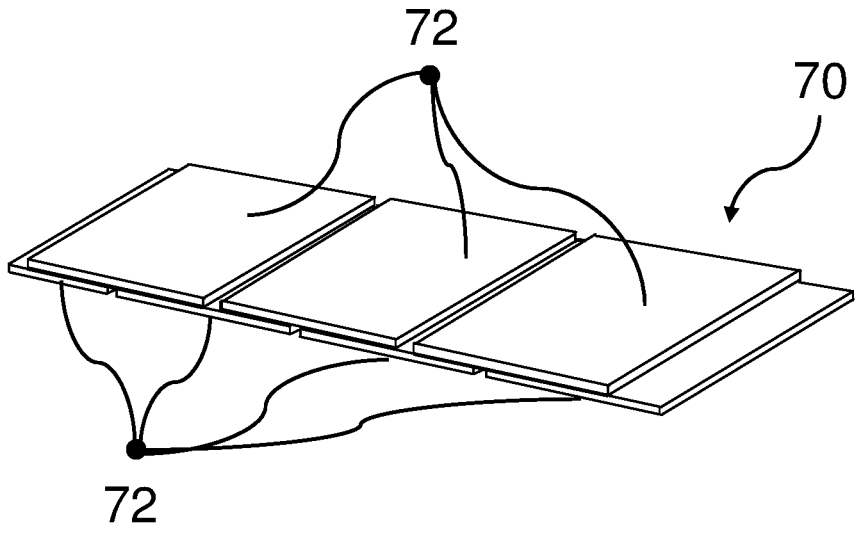
FIG. 14 shows a second embodiment of the Prosser, U.S. Pat. No. 3,282,057, marker tape
Figure 15:
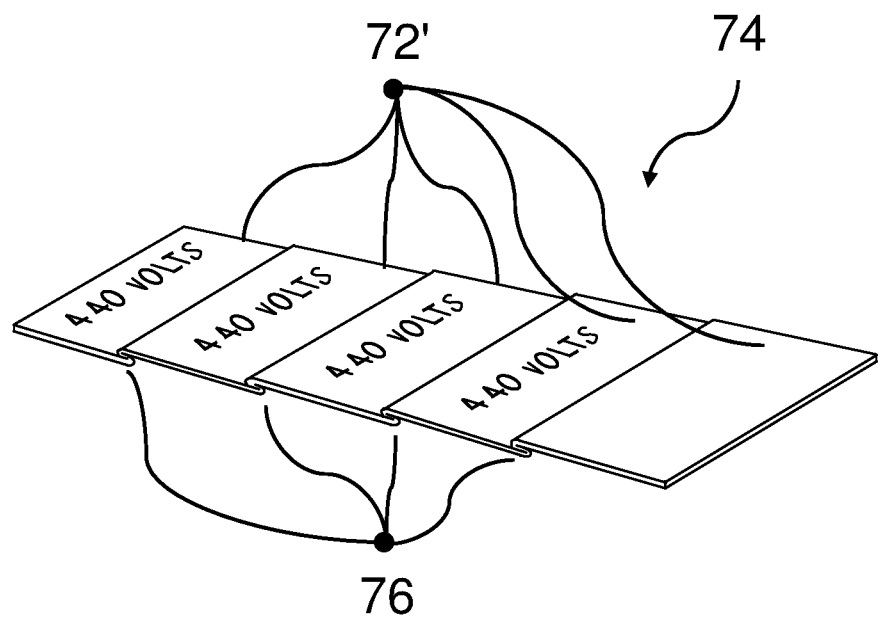
FIG. 15 shows a third embodiment of the Prosser, U.S. Pat. No. 3,282,057, marker tape
Figure 16:
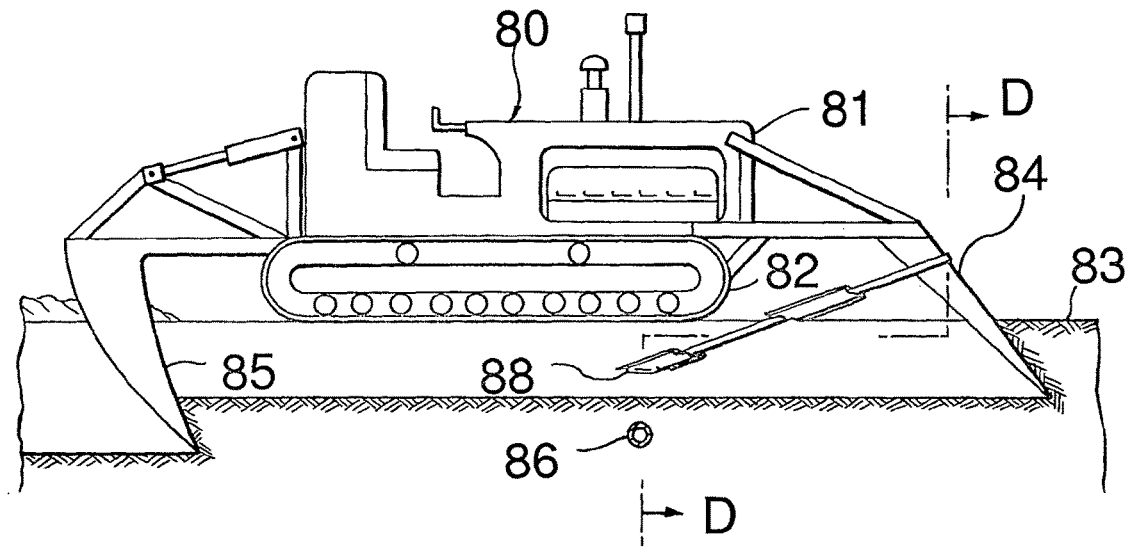
FIG. 16 shows the installation of a prior art marker tape according to Evett, U.S. Pat. No. 3,908,582.
Figure 17:
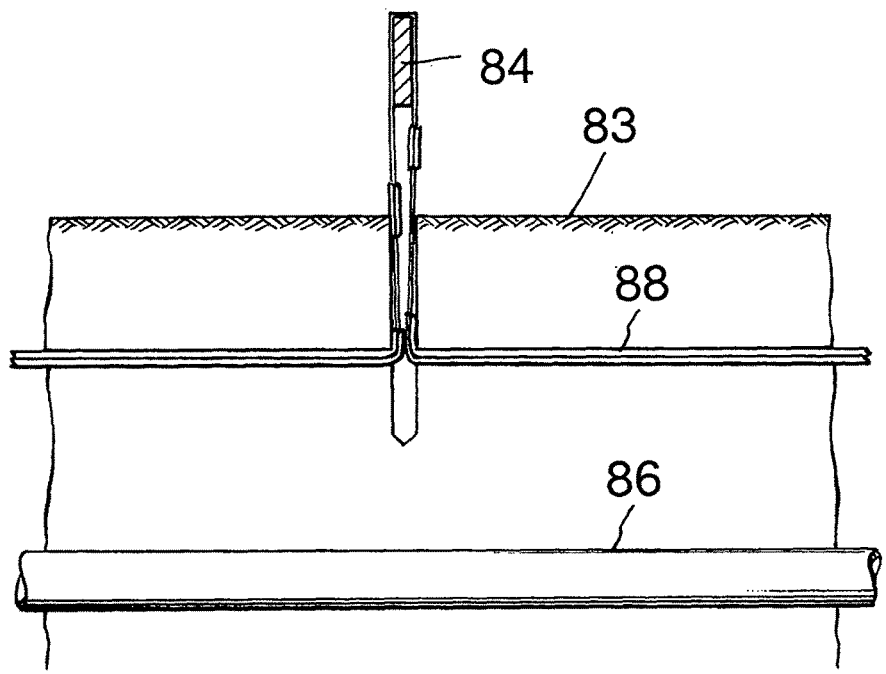
FIG. 17 shows a cross-section of FIG. 17 along section D-D of FIG. 17.
Figure 18:
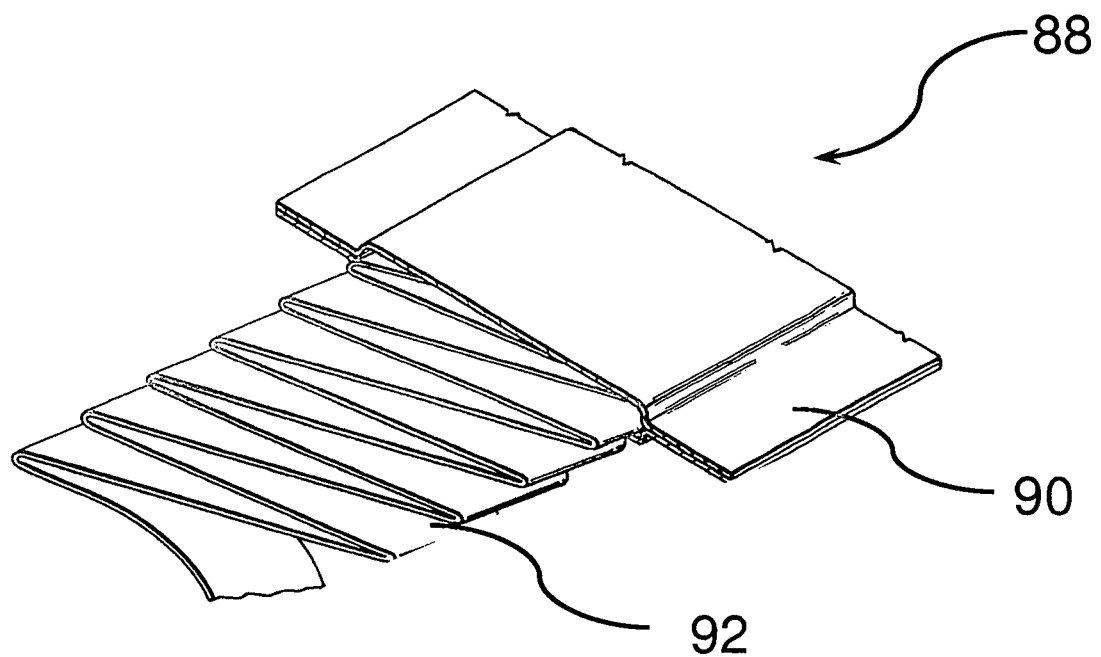
FIG. 18 shows a first embodiment of a marker tape according to Evett, U.S. Pat. No. 3,908,582.
Figure 19:
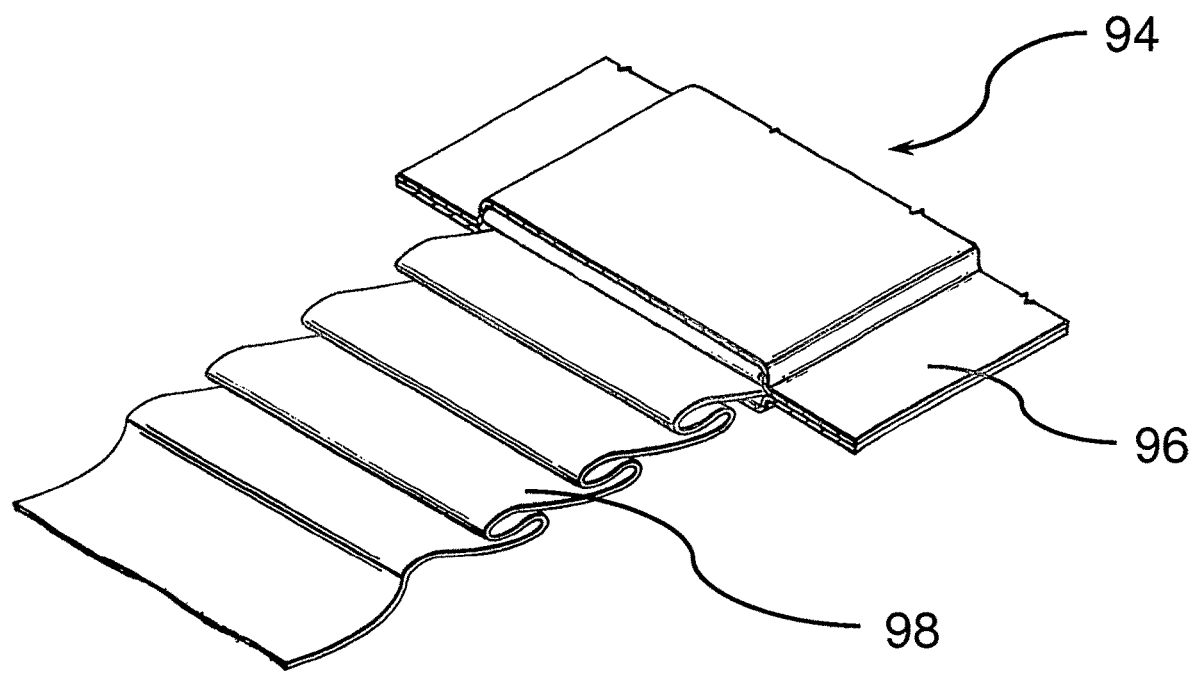
FIG. 19 shows a second embodiment of a prior art marker tape according to Evett, U.S. Pat. No. 3,908,582.
Figure 20:
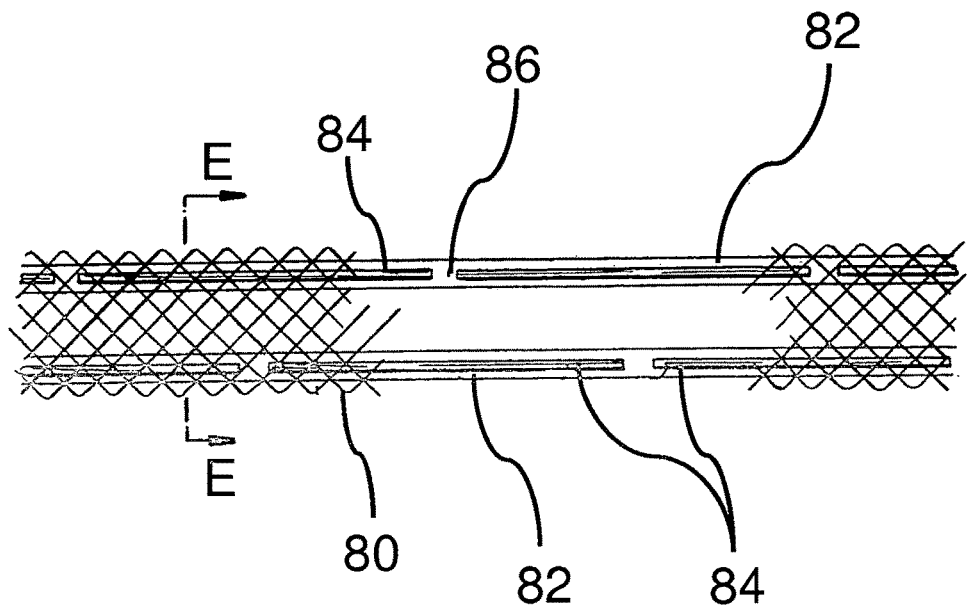
FIG. 20 shows the installation of a prior art marker tape according to DeCourville, U.S. Pat. No. 4,654,639.
Figure 21:
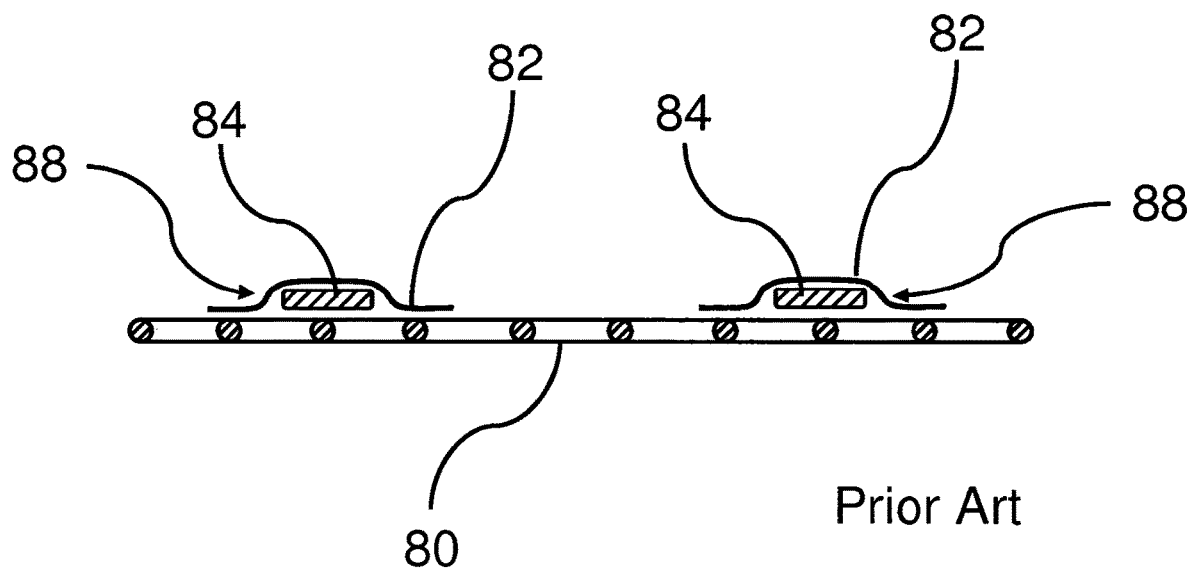
FIG. 21 shows a cross-section of FIG. 20 along section E-E of FIG. 20.
Figure 22:
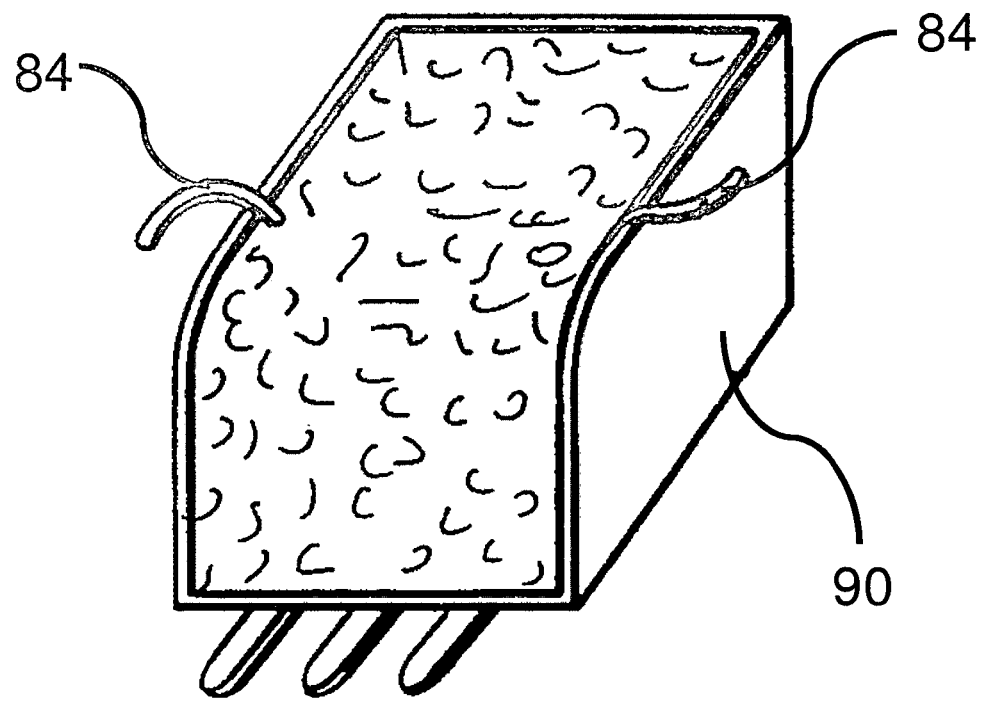
FIG. 22 shows a view of an excavator bucket with sections of marker tape hanging out of the sides from DeCourville, U.S. Pat. No. 4,654,639.
Figure 23:
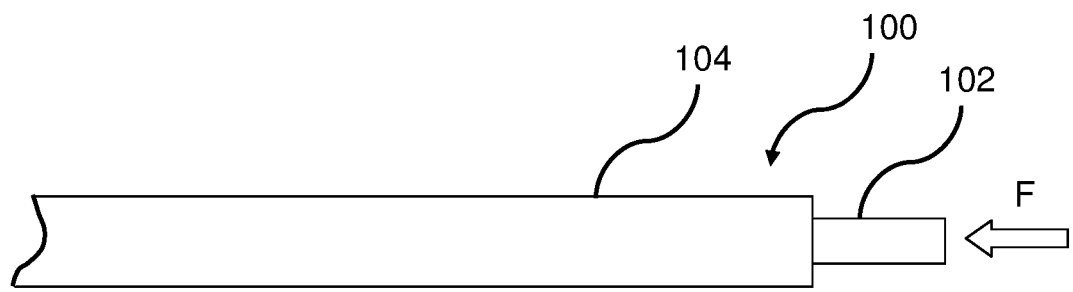
FIG. 23 shows prior art tracer wire.
Figure 24:
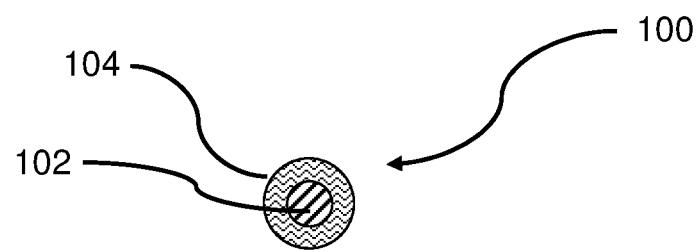
FIG. 24 shows a cross-section of FIG. 23 in the direction of arrow F of FIG. 23.
Figure 25:
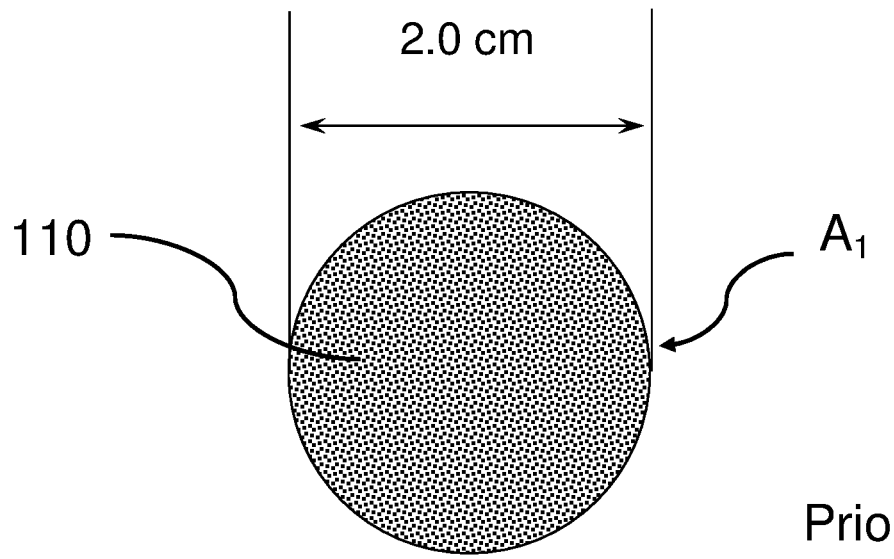
FIG. 25 shows an example of 60 Hz electrical conduction on a 2.0 cm copper wire.
Figure 26:
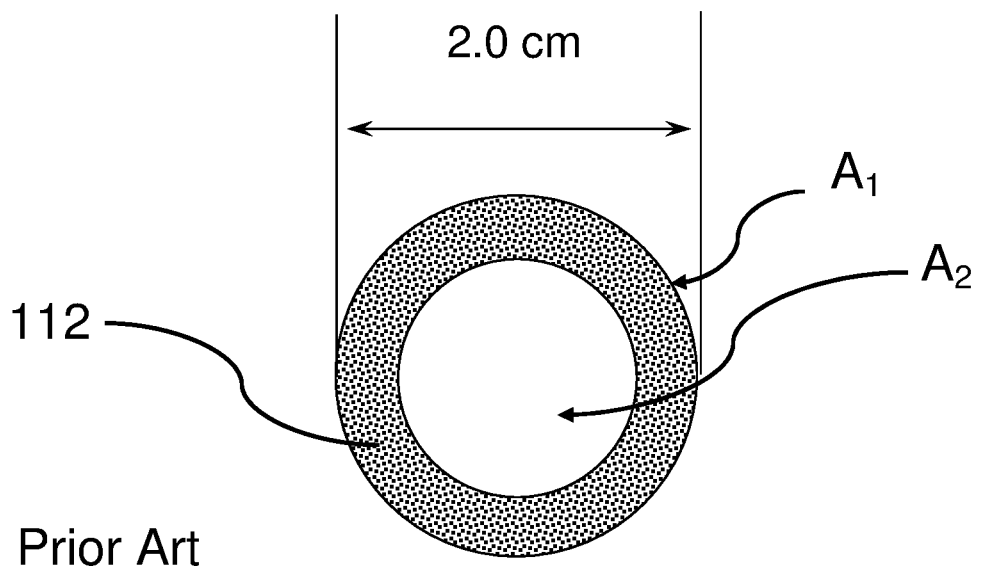
FIG. 26 shows an example of conduction at 500 Hz on a 2.0 cm copper wire.
Figure 27:
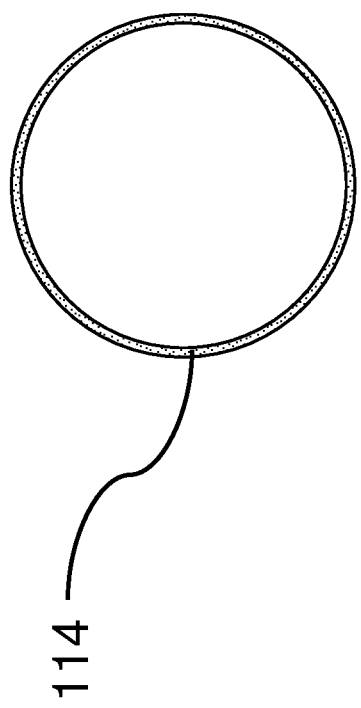
FIG. 27 shows an example of conduction at 1 MHz on a 2.0 cm copper wire.
Figure 28:
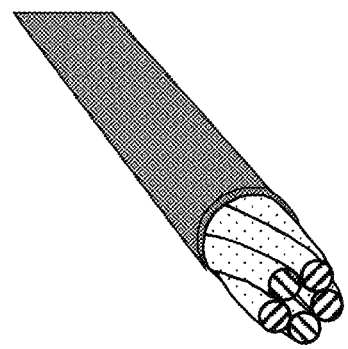
FIG. 28 shows a first embodiment of prior art Litz wire.
Figure 29:
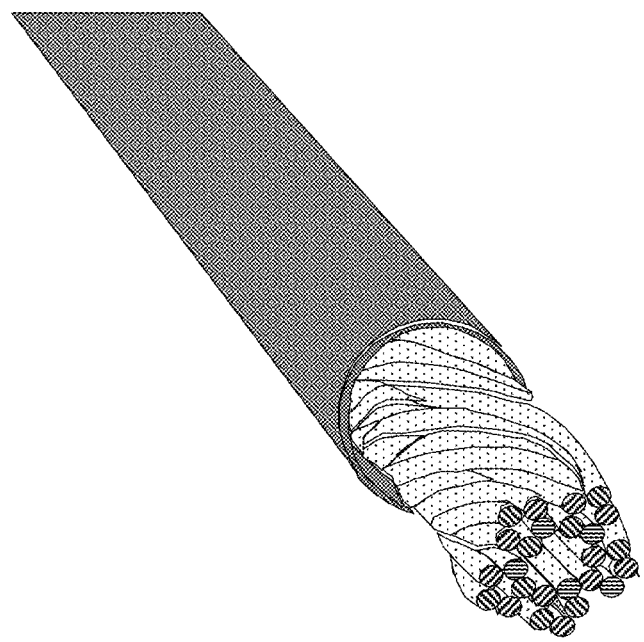
FIG. 29 shows a second embodiment of prior art Litz wire.
Figure 30:
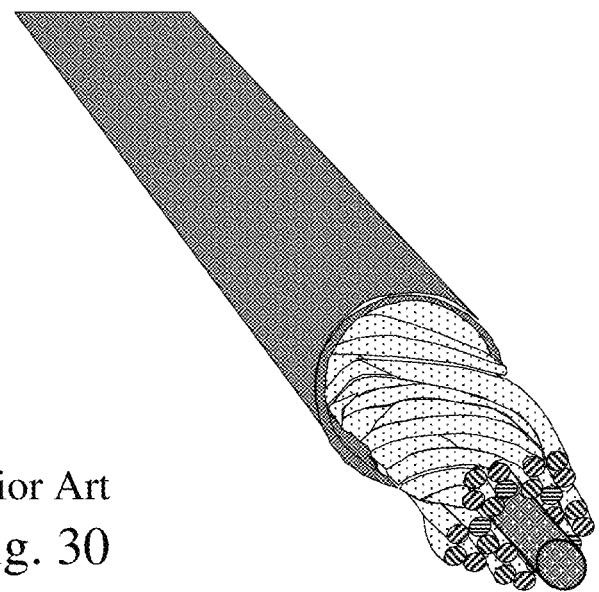
FIG. 30 shows a third embodiment of prior art Litz wire.
Figure 31:
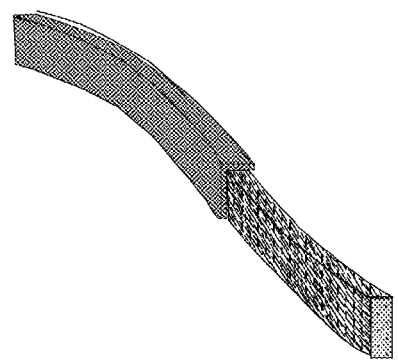
FIG. 31 shows a fourth embodiment of prior art Litz wire.
Figure 57:
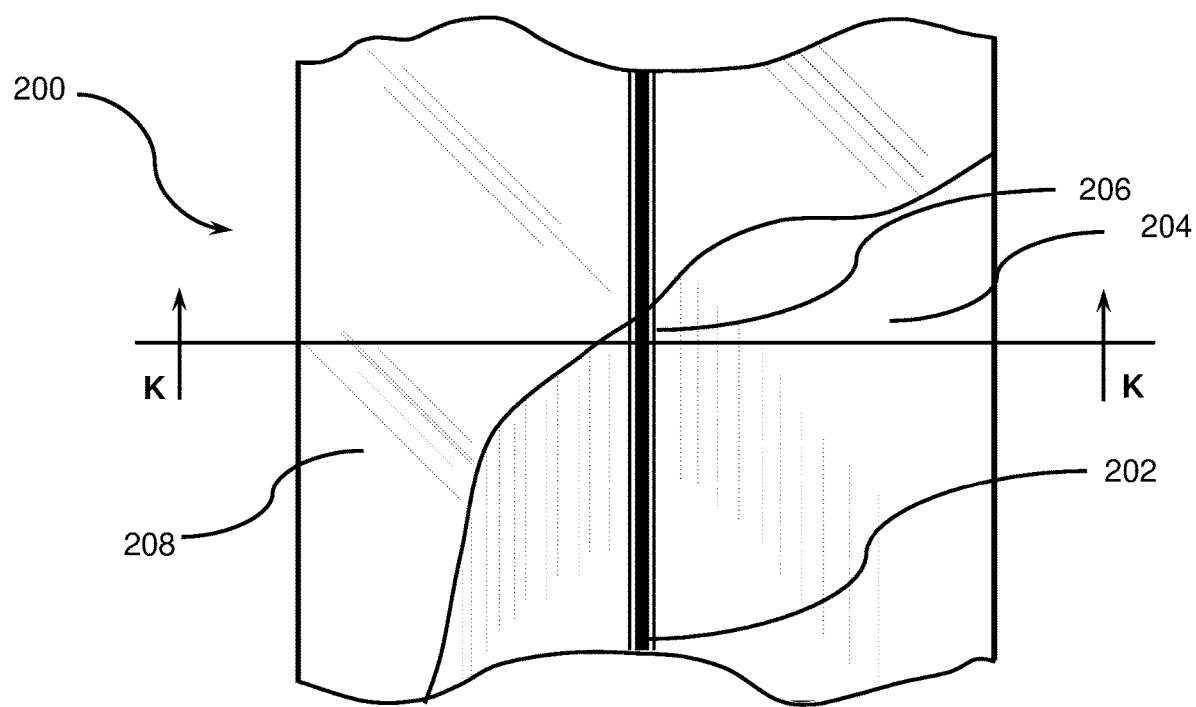
FIG. 57 shows a top view of a conventional marker tape for "protecting" an underground utility which incorporates Litz wire.

FIG. 57 illustrates a marker tape 200, according to the invention, incorporating Litz wire 202 therein as tracer wire. Applicants call the inventive marker tape Litz marker tape. The marker tape is similar in construction to that of Allen '533 as shown therein in FIGS. 3 and 4. This marker tape is also illustrated in FIGS. 3 and 4 of the instant disclosure and described supra. The inventive marker tape incorporating Litz wire as tracer wire as shown in FIGS. 54 and 55. In the Allen '533 disclosure, tracer wire 8 was embedded within his marker tape in a zigzag fashion as shown in FIG. 3 of applicants' drawings. This is not possible when using Litz wire as tracer wire as the Litz wire must be installed in a generally straight line on the marker tape to avoid interference during the detection process. If the Litz wire were installed in a zigzag or sinusoidal manner within marker tape 200, some of the current induced in the tracer wire during detection by conventional location and mapping devices will cancel out the induced current in other sections of the wire—thus it is must be straight to function well.

Figure 58:
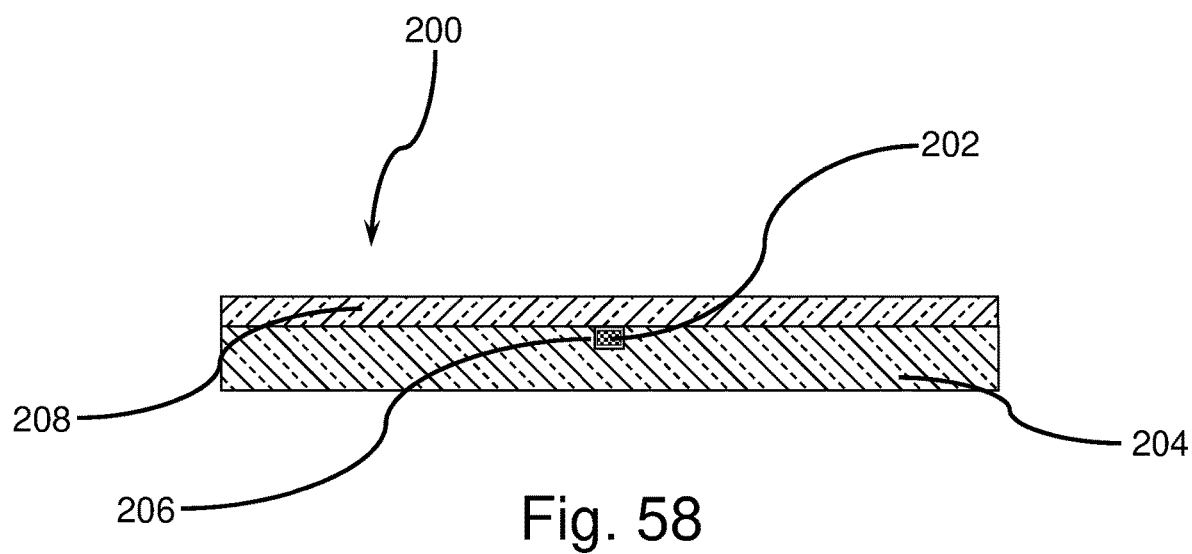
FIG. 58 shows a cross-sectional view of the marker tape of FIG. 57 along the section K-K of FIG. 57.

With the foregoing in mind, marker tape 200 as shown in FIGS. 57 and 58 comprises a lower layer 204 of a colored polyethylene or other moisture and soil-resistant synthetic plastic tape having a relatively straight channel 206 formed therein. Litz wire 202 is emplaced within channel 206 to act as tracer wire for marker tape 200. Again, Litz wire 202 could be of any construction for Litz wire. A number of such constructions are shown in FIGS. 28-31, but any type of Litz wire construction could be used. The invention is providing Litz wire within the marker tape as tracer wire.

FIG. 58 is a cross-sectional view of marker tape 200 taken along section K-K of FIG. 57. Laminated to the upper surface of lower layer 204 is an upper layer 208 also made of colored polyethylene or synthetic plastic. Tape 200 may be color coded to the type of underground utility and may have soil contrasting reflective stripes to aid in tape detection. Tape 200 may also have warning indicia and/or identification indicia imprinted on the inner or outer surfaces of lower layer 204 and/or upper layer 208. Tape 200 will be color coded in the accepted coding for the type of utility line being protected. The uniform color code generally accepted in the industry to identify underground facilities is as follows: Red—electric power lines; Yellow—gas, oil or steam lines; Orange—telephone, police and fire communications and cable television; Blue—water lines; and Green—sewer lines.

Figure 59:
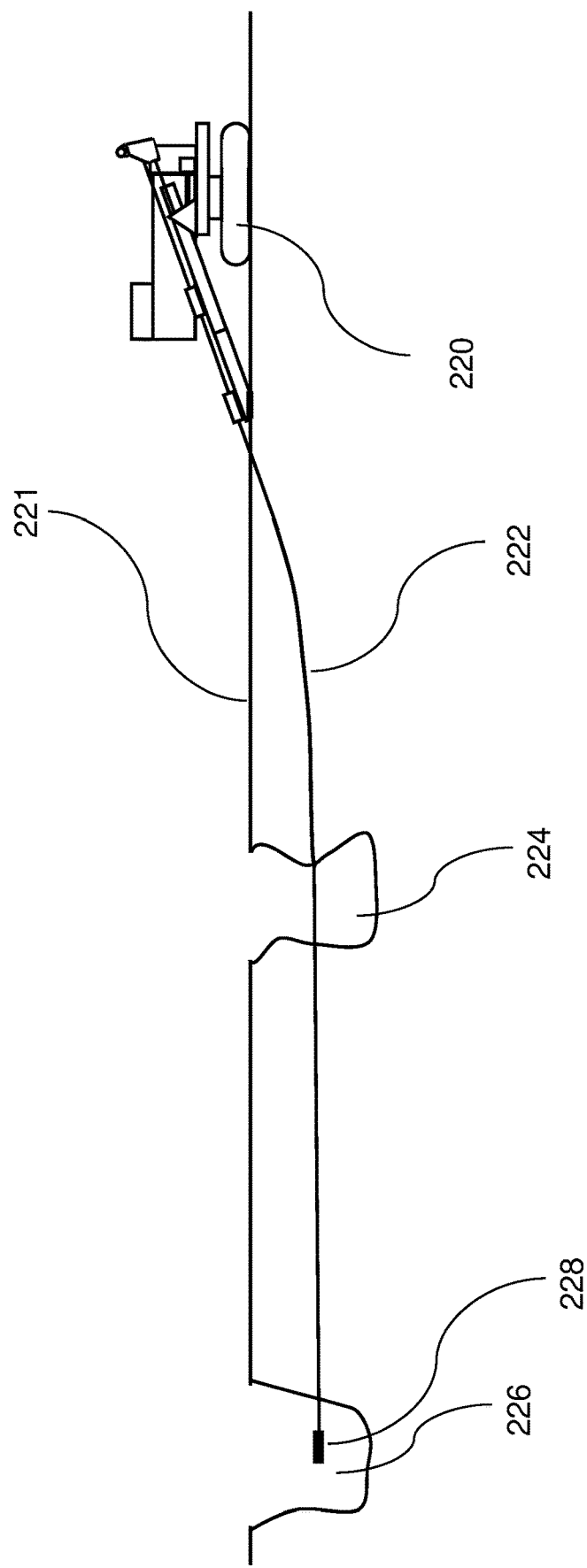
FIG. 59 shows a typical horizontal boring operation.

FIG. 59 illustrates a conventional horizontal boring operation for laying an underground utility. Directional boring machine 220 is shown setting on ground surface 221.

Directional boring machine 220 is taken from Geldner, U.S. Pat. No. 5,803,189 but could be any of the numerous types of directional boring machines on the market. Drill stem 222 extends under the ground surface 221 and defines a borehole. Inspection pit 224 is dug approximately half-way along the intended path of drill stem 222 to permit exact location of drill stem 222 and the associated borehole. Pit 226 is the target pit for the drill stem 222 showing the drill head 228 and a part of drill stem 222 extending into target pit 226.

Figure 60:
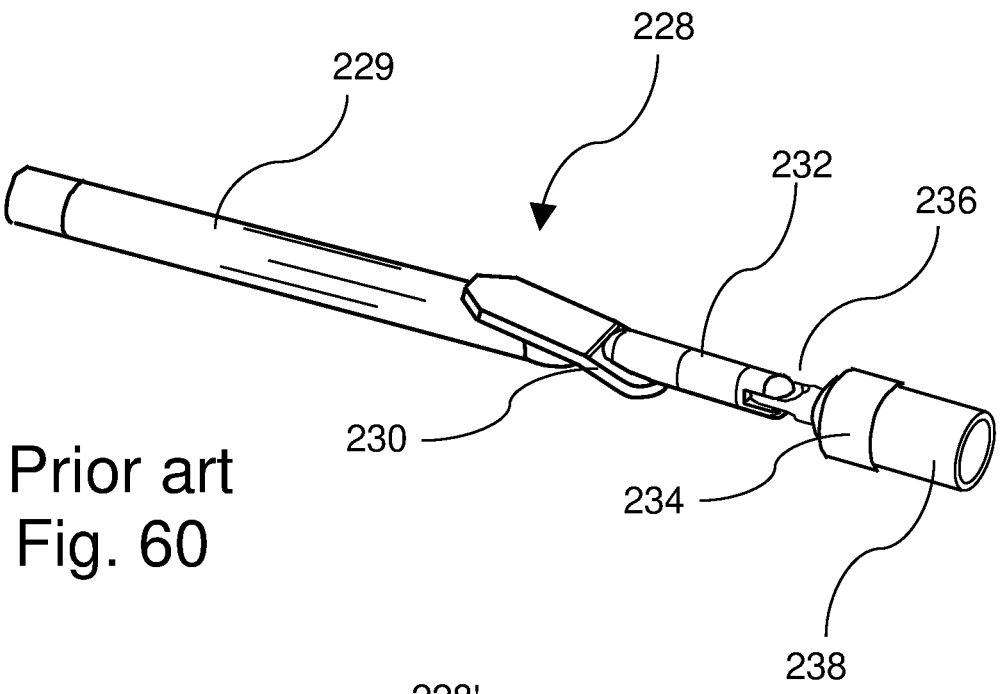
FIG. 60 illustrates a conventional drill bit and stem readied for a pullback operation.

FIG. 60 illustrates an end piece 228 of drill stem 222 [shown in FIG. 59] which carries a conventional generally planar boring head 230 attached thereto and is taken from Melsheimer, U.S. Pat. No. 9,719,344. Adapter 232 is fastened at one end to the face of boring head 230 by a bolt fastening means [not shown in FIG. 60] and at the other end is joined to tow head 234 by swivel joint 236, Tow head 234 carries a duct puller configured to retain and pull a conduit 238 [pipe, cable or the like] during pullback operations. As described above, directional boring machine 220 is positioned at the desired starting point of the utility and creates a borehole with drill stem 222 and drill head 228 along the desired path of the utility. At the desired end point of the utility, drill head 228 extends into a target hole [or is brought up out of the ground which is not shown in FIG. 59] and the utility 238 is fastened to drill head 228. The drill stem with utility 228 now attached is withdrawn back through the borehole to the starting point in what is called a pullback operation. It is normal practice when laying a non-metallic utility to tie several marker wires around the swivel joint in order to emplace the marker wires at the same time as the utility is emplaced. The reason several marker wires are used in that the pullback operation often causes one or more of the marker wires to break underground as they are being withdrawn to the starting point.

Figure 61:
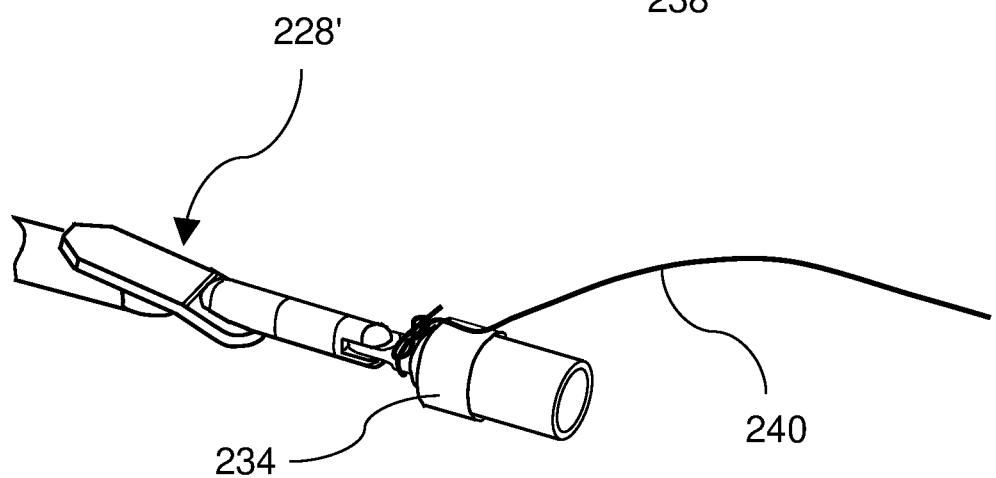
FIG. 61 illustrates the attachment of a Litz Wire Tracer wire to the drill bit for pullback.

FIG. 61 shows the inventive Litz Pull Tape 240 being tied securely to tow head 234 in preparation for a pullback operation. In order to prevent damage to the Litz wire embedded within the Litz pull tape, the Litz wire is removed from the last few feet of Litz pull tape 240 and this portion of the Litz pull tape, without any Litz wire therein. is tied to tow head 234, as shown, for pullback so that the pullback forces are transmitted directly to the high strength tape and not to the relatively low strength Litz wire.

Figure 62:
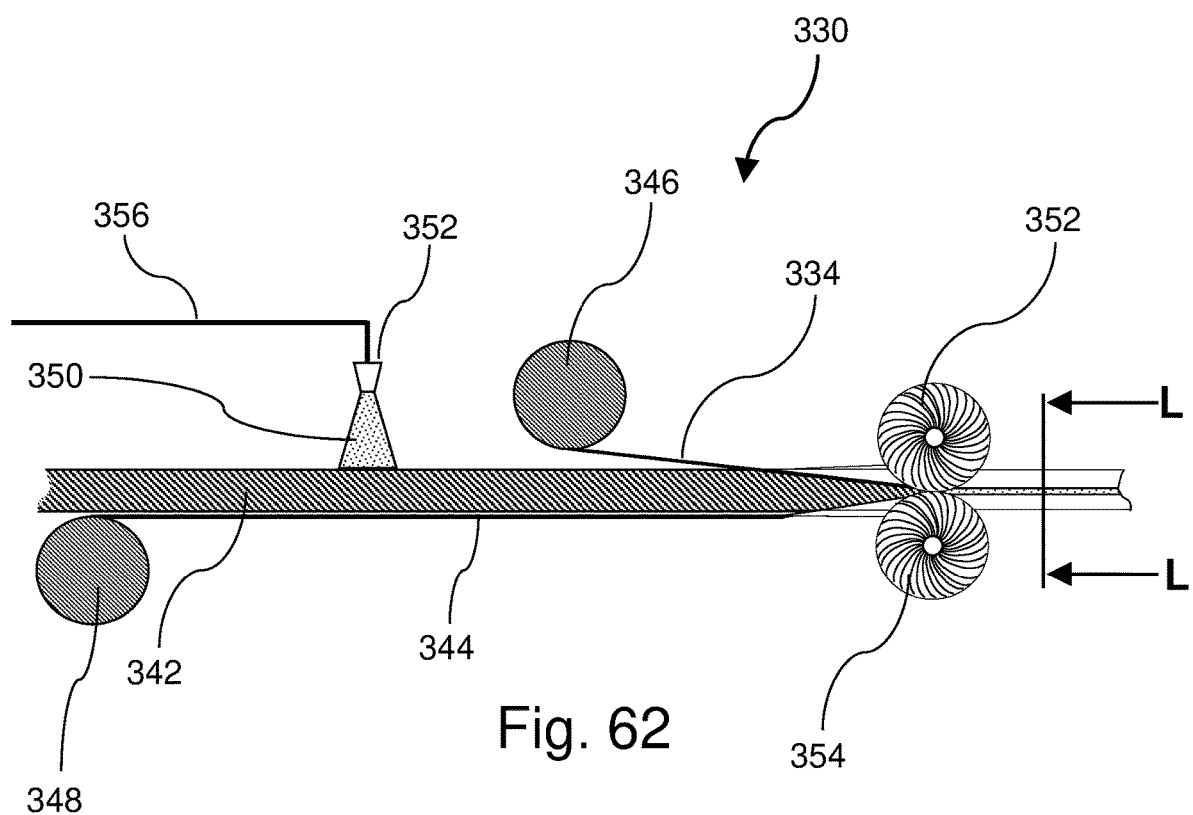
FIG. 62 illustrates the process which may be used to emplace of a larger size core material [approximately 1 inch in diameter] within Signal Tape and illustrates how the Signal Tape top and bottom protective layers are adhesively secured to a substantial portion of the core material.
Figure 63:
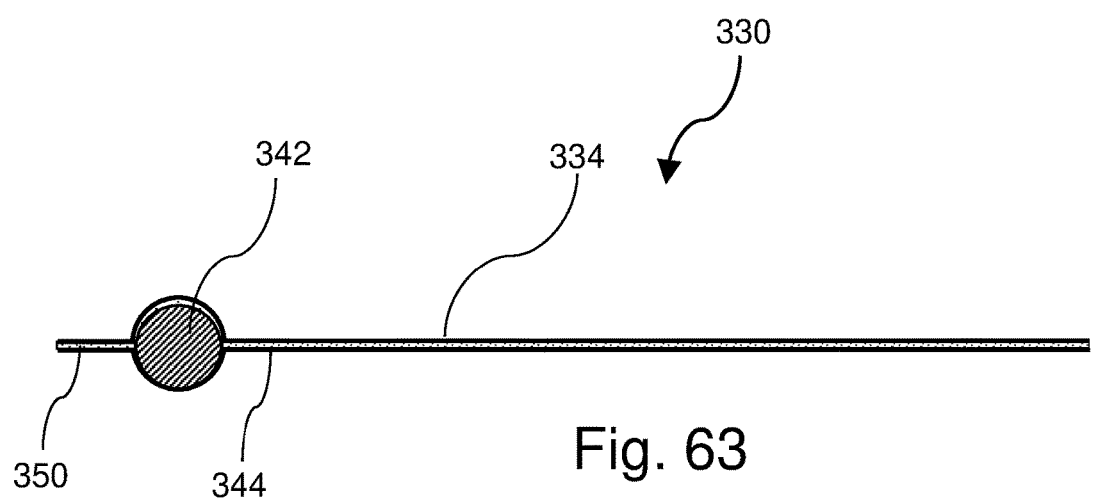
FIG. 63 illustrates how the Signal Tape assembled in FIG. 62 would look from the perspective of the section lines L-L of FIG. 62.

FIG. 62 illustrates a method for making the inventive Signal Tape 330 with a larger diameter core material 342 such as a polyester rope. The rope core material 342 is fed from the left to lay on top of lower layer 334 and travels to the right in FIG. 62 along with lower layer 344. Lower layer 344 is fed from supply roll 348 and, it too, travels to the right in FIG. 62. In the left portion of FIG. 62 an adhesive spray 350 is directed onto the assembled rope core material 342 and lower layer 344. Upper layer 334 is directed to the assembled rope core material 342 and lower layer 344 with the adhesive applied and the entire assembly is gently pressed together by brush nip wheels 352 and 354. The resulting product is shown in FIG. 63 where upper layer 334 is shown as being adhered to a substantial portion [approximately 40-50%] of the surface area of rope core material 342 by adhesive 346 which is applied to lower layer 344.

The above-described embodiments are merely illustrative of the principles of the invention. Those skilled in the art may make various modifications and changes, which will embody the principles of the invention and fall within the spirit and scope thereof.

What is claimed is:

1. An elongated signal tape comprising:
   protective material comprising;
   a top sheet of thermoplastic material having a first predetermined length, a top and a bottom surface, a side edge at each lateral portion of said top sheet, a first predetermined width; and,
   a bottom sheet of thermoplastic material having a second predetermined length, a top surface and a bottom surface, a side edge at each lateral portion of said bottom sheet, and a second predetermined width with said first and said second predetermined lengths being substantially equal and with said first and second predetermined widths being substantially equal;
   a generally non-stretchable core material positioned between said top and bottom thermoplastic sheets, said core material having;
   a predetermined length,
   an outer surface,
   a maximum lateral dimension of substantially one inch [or substantially 2.54 cm],
   a tensile strength of at least 100 $lb_f$ [or at least 445 N]; and,
   with said top sheet of thermoplastic material and said bottom sheet of thermoplastic material being laminated together at least at the side edges of said top and bottom thermoplastic sheets and with at least one of said top or bottom sheet of thermoplastic material being laminated to a substantial portion of said outer surface of said core material.

2. The elongated signal tape of claim 1 wherein said generally non-stretchable core material comprises a strip further comprising an upper surface and a lower surface with said strip having a maximum width of substantially one inch [or substantially 2.54 cm] and a maximum thickness of substantially ¼ inch [or substantially 0.635 cm].

3. The elongated signal tape of claim 1 wherein said generally non-stretchable core material comprises a rope-like material with the maximum diameter of said rope-like material being substantially one inch [or substantially 2.54 cm].

4. The elongated signal tape of claim 1 wherein said tensile strength of said core material is 400 $lb_f$ [or 1,780 N] and said predetermined
   length of said core material is substantially twice the predetermined length of said top thermoplastic sheet.

5. The elongated signal tape of claim 1 wherein said predetermined length of said core material is substantially equal to said predetermined length of said top thermoplastic sheet and said tensile strength is 6,000 $lb_f$ [or 27,000 N].

6. The elongated signal tape of claim 1 wherein said core material is positioned between said top and bottom thermoplastic sheets in a predetermined waveform pattern.

7. The elongated signal tape of claim 6 wherein said predetermined waveform pattern is sinusoidal, triangular, square or rectangular.

8. The elongated signal tape of claim 1 wherein a generally straight tracer wire having a predetermined length substantially equal to said predetermined length of said top thermoplastic sheet is positioned between said top and bottom thermoplastic sheets.

9. The elongated signal tape of claim 8 wherein said tracer wire comprises Litz wire.

10. The elongated signal tape of claim 1 wherein multiple RFID tags are positioned along the entire predetermined length of and between said top and bottom thermoplastic sheets and adhered to at least one of said top or said bottom thermoplastic sheets.

11. The elongated signal tape of claim 1 wherein multiple RFID tags are positioned along the entire predetermined length of said bottom thermoplastic sheet and adhered to the bottom surface of said bottom thermoplastic sheet.

12. The elongated signal tape of claim 11 wherein each RFID tag is contained within a thermoplastic blister package which package is also adhered to the bottom surface of said bottom thermoplastic sheet.

13. The elongated signal tape of claim 1 wherein multiple RFID tags are positioned along the entire predetermined length of said top or bottom thermoplastic sheet material with said RFID tags being adhered to said outer surface of said core material.

14. The elongated signal tape of claim 1 wherein said tensile strength of said core material is 3,000 $lb_f$ [or 13,350 N], said core material is a strip with a maximum width of substantially 1 inch [or substantially 2.54 cm] and said predetermined length of said core material is substantially 1.2 to 1.5 times the predetermined length of said top thermoplastic sheet.

15. The elongated signal tape of claim 14 wherein said core material is positioned between said top and bottom thermoplastic sheets in a predetermined waveform pattern.

16. The elongated signal tape of claim 15 wherein said predetermined waveform pattern is sinusoidal, triangular, square or rectangular.

17. The elongated signal tape of claim 10 wherein said multiple RFID tags are adhered to at least one of said top or said bottom thermoplastic sheets at substantially 96 inch [or substantially 244 cm] intervals.

18. The elongated signal tape of claim 13 wherein said multiple RFID tags are adhered to said outer surface of said core material at substantially 96 inch [or substantially 244 cm] intervals.

19. An elongated signal tape comprising:
protective material comprising:
a top sheet of thermoplastic material having;
a first predetermined length, a top and a bottom surface, a side edge at each lateral portion of said top sheet, a first predetermined width; and,
a bottom sheet of thermoplastic material having;
a second predetermined length, a top surface and a bottom surface, a side edge at each lateral portion of said bottom sheet, and a second predetermined width, with said first and said second predetermined lengths being substantially equal and with said first and second predetermined widths being substantially equal;
a stretchable core material having a non-stretched predetermined length and being positioned between said top and bottom thermoplastic sheets, with said stretchable core material being capable of being stretched, without breaking, to 1.2 to 1.5 times its non-stretched predetermined length, said core material having;
an outer surface,
a maximum lateral dimension of substantially one inch [or substantially 2.54 cm],
a tensile strength of at least 100 $lb_f$ [or at least 445 N] and,
with said top sheet of thermoplastic material and said bottom sheet of thermoplastic material being laminated together at least at the side edges of said top and bottom thermoplastic sheets and with at least one of said top or bottom sheet of thermoplastic material being laminated to a substantial portion of said outer surface of said core material.

20. The elongated signal tape of claim 19 wherein said tensile strength of said stretchable core material is at least 400 lbf [or at least 1,780 N].

21. The elongated signal tape of claim 19 wherein a generally straight tracer wire having a predetermined length substantially equal to said predetermined length of said top thermoplastic sheet is positioned between said top and bottom thermoplastic sheets.

22. The elongated signal tape of claim 21 wherein said tracer wire comprises Litz wire.

23. The elongated signal tape of claim 19 wherein multiple RFID tags are positioned along the entire predetermined length of and between said top and said bottom thermoplastic sheets and adhered to at least one of said top or said bottom thermoplastic sheets at 96 inch [or 244 cm] intervals.

24. he elongated signal tape of claim 21 wherein multiple RFID tags are positioned along the entire predetermined length of said top or bottom thermoplastic sheet material at 96 inch [or 244 cm] intervals with said RFID tags being adhered to said outer surface of said core material.

25. The elongated signal tape of claim 19 wherein multiple RFID tags are positioned along the entire predetermined length of said top or bottom thermoplastic sheet material at 96 inch [or 244 cm] intervals with said RFID tags being adhered to said outer surface of said core material.

26. The elongated signal tape of claim 19 wherein the stretchable core material, non-stretched predetermined length is substantially twice the predetermined length of said top thermoplastic sheet.

27. The elongated signal tape of claim 26 wherein said core material is positioned between said top and bottom thermoplastic sheets in a predetermined waveform pattern.

28. The elongated signal tape of claim 27 wherein said predetermined waveform pattern is sinusoidal, triangular, square or rectangular.

* * * * *